(12) United States Patent
Kitaike et al.

(10) Patent No.: US 8,137,803 B2
(45) Date of Patent: Mar. 20, 2012

(54) MULTILAYER STRUCTURE POLYMER AND RESIN COMPOSITION TOGETHER WITH ACRYLIC RESIN FILM MATERIAL, ACRYLIC RESIN LAMINATE FILM, PHOTOCURABLE ACRYLIC RESIN FILM OR SHEET, LAMINATE FILM OR SHEET AND LAMINATE MOLDING OBTAINED BY LAMINATING THEREOF

(75) Inventors: Yukio Kitaike, Hiroshima (JP); Yoshinori Abe, Hiroshima (JP); Junichi Abe, Hiroshima (JP); Koichiro Kitashima, Toyama (JP); Shogo Okazaki, Hiroshima (JP); Hideyuki Fujii, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/831,436

(22) Filed: Jul. 7, 2010

(65) Prior Publication Data

US 2010/0273019 A1  Oct. 28, 2010

Related U.S. Application Data

(62) Division of application No. 10/541,729, filed as application No. PCT/JP03/16951 on Dec. 26, 2003, now Pat. No. 7,781,062.

(30) Foreign Application Priority Data

| Jan. 10, 2003 | (JP) | 2003-004427 |
|---|---|---|
| Feb. 19, 2003 | (JP) | 2003-041212 |
| Mar. 4, 2003 | (JP) | 2003-057335 |
| Mar. 5, 2003 | (JP) | 2003-058554 |
| Mar. 5, 2003 | (JP) | 2003-058690 |
| Mar. 5, 2003 | (JP) | 2003-058692 |
| Mar. 12, 2003 | (JP) | 2003-066645 |
| Mar. 14, 2003 | (JP) | 2003-069915 |

(51) Int. Cl.
*B32B 27/30* (2006.01)

(52) U.S. Cl. ...... 428/327; 264/46.4; 264/46.6; 264/46.8; 264/510; 264/511; 264/513; 264/516; 428/421; 428/422; 428/520; 428/522

(58) Field of Classification Search ............... 264/46.4, 264/46.6, 46.8, 510, 511, 513, 516; 428/327, 428/421, 422, 520, 522
See application file for complete search history.

(56) References Cited

U.S. PATENT DOCUMENTS

| 4,508,875 A | 4/1985 | Kishida et al. ............ 525/308 |
|---|---|---|
| 4,526,920 A | 7/1985 | Sakashita et al. ............ 522/78 |
| 5,006,415 A | 4/1991 | Matsumaru et al. .......... 428/522 |
| 6,326,086 B1 * | 12/2001 | Mori et al. ................. 428/516 |
| 6,509,097 B1 | 1/2003 | Hatakeyama et al. ........ 428/412 |
| 2002/0013405 A1 | 1/2002 | Sakaguchi et al. ............ 524/833 |
| 2002/0136853 A1 | 9/2002 | Koyama et al. ............. 428/41.5 |
| 2003/0032722 A1 | 2/2003 | Kitaike et al. ................ 525/8 |

FOREIGN PATENT DOCUMENTS

| CN | 1270612 A | 10/2000 |
|---|---|---|
| CN | 1375517 A | 10/2002 |
| EP | 1 060 878 A1 | 12/2000 |
| EP | 1 092 736 A1 | 4/2001 |
| EP | 1 249 339 A1 | 10/2002 |
| JP | 59-038056 | 3/1984 |
| JP | 62-19309 | 4/1987 |
| JP | 63-8983 | 2/1988 |
| JP | 3-288640 | 12/1991 |
| JP | 4-166334 | 6/1992 |
| JP | 5-140244 | 6/1993 |
| JP | 7-238202 | 9/1995 |
| JP | 8-267500 | 10/1996 |
| JP | 8-323934 | 12/1996 |
| JP | 9-263614 | 10/1997 |
| JP | 10-139973 | 5/1998 |
| JP | 2808251 | 7/1998 |
| JP | 10-237261 | 9/1998 |
| JP | 11-60876 | 3/1999 |
| JP | 11-80487 | 3/1999 |
| JP | 11-147237 | 6/1999 |
| JP | 11-335511 | 12/1999 |
| JP | 2000-86853 | 3/2000 |
| JP | 2000-225672 | 8/2000 |
| JP | 2000-317976 | 11/2000 |
| JP | 2001-1465 | 1/2001 |
| JP | 2001-81266 | 3/2001 |
| JP | 2001-122932 | 5/2001 |
| JP | 2001-181357 | 7/2001 |
| JP | 2001-232660 | 8/2001 |
| JP | 2001-334609 | 12/2001 |
| JP | 2001-354819 | 12/2001 |
| JP | 2002-3620 | 1/2002 |
| JP | 2002-60439 | 2/2002 |
| JP | 2002-79621 | 3/2002 |
| JP | 2002-80550 | 3/2002 |
| JP | 2002-80678 | 3/2002 |
| JP | 2002-80679 | 3/2002 |
| JP | 2002-86551 | 3/2002 |
| JP | 2002-241445 | 8/2002 |
| JP | 2002-292808 | 10/2002 |
| JP | 2002-347185 | 12/2002 |
| JP | 2002-361712 | 12/2002 |
| JP | 2003-128734 | 5/2003 |
| WO | 97/28950 | 8/1997 |

\* cited by examiner

*Primary Examiner* — D. S. Nakarani
(74) *Attorney, Agent, or Firm* — Oblon, Spivak, McClelland, Maier & Neustadt, L.L.P.

(57) ABSTRACT

An acrylic resin film material comprising at least a multilayer structure polymer with a particular structure prevent a molded item from being whitened during insert- or in-mold molding and meet the requirement for surface hardness, heat resistance, and transparency or matting performance for vehicle applications. It is also possible to use an acrylic resin film material exhibiting a difference of 30% or less between haze values as determined in accordance with the testing method of JIS K7136 (haze measurement method) after and before a tensile test where a test piece with a width of 20 mm is pulled under the conditions of an initial inter-chuck distance of 25 mm, a rate of 50 mm/min and a temperature of 23° C. until an end-point inter-chuck distance becomes 33 mm as well as having a pencil hardness of 2 B or higher as determined in accordance with JIS K5400.

6 Claims, No Drawings

MULTILAYER STRUCTURE POLYMER AND RESIN COMPOSITION TOGETHER WITH ACRYLIC RESIN FILM MATERIAL, ACRYLIC RESIN LAMINATE FILM, PHOTOCURABLE ACRYLIC RESIN FILM OR SHEET, LAMINATE FILM OR SHEET AND LAMINATE MOLDING OBTAINED BY LAMINATING THEREOF

This is a divisional application of U.S. application Ser. No. 10/541,729, filed Jul. 11, 2005, which is a 371 of PCT/JP03/16951 filed on Dec. 26, 2003.

TECHNICAL FIELD

This invention relates to a multilayer structure polymer and a resin composition as well as an acrylic resin film material, an acrylic resin laminate film, a photocurable acrylic resin film or sheet, a laminate film or sheet and a laminate molding obtained by lamination thereof.

BACKGROUND ART

The methods which draw a design on a formed article at low cost include insert- and in-mold molding techniques. In the insert molding, a film or sheet such as a polyester, a polycarbonate and an acrylic resin which has been decorated by, for example, printing, is preformed into a given three-dimensional shape by, for example, vacuum molding to remove an unnecessary part of the film or the sheet and then transferred into a mold for injection molding before it is combined with a resin to be a base by injection molding to give an integrated molded item. On the other hand, in in-mold molding, a film or sheet such as a polyester, a polycarbonate and an acrylic resins which has been decorated by, for example, printing, is placed in a mold for injection molding and then vacuum molded before in the same mold, it is combined with a base resin to be a base by injection molding to give an integrated molded item.

As an acrylic resin film material having good surface hardness and heat resistance which can be used in insert- or in-mold molding, there have been disclosed an acrylic resin film material prepared by mixing a rubber-containing polymer having a particular composition with a thermoplastic polymer having a particular composition in a particular ratio (See, for example, Japanese Patent Application Laid-open Nos. 8-323934, 11-147237, 2002-800678 and 2002-80679). Such acrylic resin film materials can provide a molded item with decorativeness as well as act as an alternate material for clear painting.

Furthermore, there have been disclosed an acrylic resin film material containing a rubber-containing polymer having a particular composition and a thermoplastic polymer having a particular composition in a particular ratio or containing a rubber-containing polymer having a particular composition, a thermoplastic polymer having a particular composition and a matting agent in a particular ratio (See, for example, Japanese Patent Application Laid-open Nos. 10-237261 and 2002-361712). Such an acrylic resin film material can provide a molded item with decorativeness as well as act as an alternate material for mat painting.

There have been suggested an acrylic resin laminate film prepared by laminating an acrylic resin layer substantially free from rubber particles at least one side of an acrylic resin layer containing rubber particles for providing an acrylic resin film exhibiting good surface hardness and excoriation resistance which can be used in in-mold- or insert molding (See, for example, Japanese Patent Application Laid-open Nos. 4-166334 and 2002-292808).

Similarly, addition of rubber particles may cause deterioration in weather resistance and/or chemical resistance. Therefore, there have been also suggested a laminate film prepared by laminating a fluororesin such as a vinylidene fluoride exhibiting good weather resistance and chemical resistance and good adhesiveness to an acrylic resin, on at least one side of an acrylic resin layer containing rubber particles (See, for example, Japanese Patent Application Laid-open No. 3-288640).

Furthermore, there have been disclosed a photocurable film or sheet applicable to in-mold or insert molding, comprising, on their surface, a photocurable resin exhibiting good abrasion resistance, weather resistance and chemical resistance without stickiness as well as good processability and storage stability, which can be advantageously used for manufacturing a molded item with a good design (See Japanese Patent Application Laid-open Nos. 2002-80550 and 2002-79621). Such a photocurable film or sheet may provide a molded item with decorativeness and also act as an alternate material for painting.

There have been also disclosed a laminate film or sheet prepared by laminating an acrylic resin film or sheet as an acrylic resin layer, which can be suitably used in insert- or in-mold molding (See, for example, Japanese Patent Application Laid-open Nos. 2000-86853, 2001-232660, 2001-334609 and 2002-3620).

There have been also disclosed an acrylic resin film material consisting of a multilayer structure polymer containing a rubber component exhibiting good processability and flexibility, which can be used in in-mold molding (See, for example, Japanese Patent Application Laid-open No. 8-267500).

Since an acrylic resin film material consisting of a rubber-containing acrylic resin have good properties such as transparency, weather resistance, flexibility and processability, they have been used as a surface material, a marking film and a film for coating a high-intensity reflector in, for example, vehicle internals and externals and construction material applications such as furniture, door materials, window frames, base boards and bath internals, by laminating it on the surface of a variety of resin molded items, wood products and metal molded items.

Various resin compositions have been suggested and practically used as a starting material for acrylic resin film material used in the above applications. Among others, multilayer structure polymers having a particular structure comprising, as the polymer components, an alkyl acrylate, an alkyl methacrylate and a graft crosslinker are particularly known as a starting material for an acrylic resin film material exhibiting good weather resistance, transparency and stress-whitening resistance such as bending-whitening resistance (See, for example, Japanese Patent Publication Nos. 62-19309 and 63-8983). Furthermore, there have been disclosed multilayer structure polymers as an acrylic resin film material exhibiting comparable properties (See, for example, Japanese Patent Application Laid-open Nos. 11-60876, 11-335511 and 2001-81266). There have been additionally disclosed thermoplastic resin compositions consisting of a multilayer structure polymer having a particular structure and a hydroxy-containing straight-chain polymer as a thermoplastic resin composition providing an acrylic resin film material exhibiting good matting performance (See, for example, Japanese Patent Application Laid-open No. 7-238203).

Recently, a member having an acrylic resin film material layer in its surface layer, which is formed by insert- or in-mold molding has been used as a component for vehicle applications.

An acrylic resin film material exhibiting good surface hardness, heat resistance and moldability can be obtained by adding a rubber-containing polymer having a particular average particle size (See, for example, Japanese Patent Application Laid-open No. 8-323934). An acrylic resin film material as a paint alternate exhibiting good transparency can be obtained by using a rubber-containing polymer having an average particle size of less than 0.2 μm (See, for example, Japanese Patent Application Laid-open No. 2002-80678). An acrylic resin film material as a paint alternate exhibiting both plasticizer-whitening resistance and moldability can be obtained without deterioration in surface hardness and heat resistance, by using a rubber-containing polymer having a particular structure (See, for example, Japanese Patent Application Laid-open No. 2002-80679). There has been suggested an acrylic resin film material from a rubber-containing polymer having a hard core structure with a Tg of about 105° C., which can provide an acrylic resin film material exhibiting good surface hardness (See, for example, Japanese Patent Application Laid-open No. 11-147237). An acrylic resin film material exhibiting good matting performance, surface hardness, heat resistance and moldability can be obtained by using a matting agent and a particular amount of a rubber-containing polymer having a particular average particle size (See, for example, Japanese Patent Application Laid-open No. 10-237261). There has been prepared an acrylic resin film material exhibiting good printability, matting performance, surface hardness, heat resistance and moldability and having a particular film surface glossiness (See, for example, Japanese Patent Application Laid-open No. 2002-361712). These acrylic resin film materials, however, exhibit insufficient molding-whiting resistance.

Specifically, (1) when punching for removing, in insert molding, a laminate sheet prepared by laminating an acrylic resin film material or acrylic resin film material after vacuum molding, or for removing, in in-mold molding, an acrylic resin film material protruding from a base resin, whitening is caused at the end of a molded item, leading to deterioration in a design in the molded item; (2) whitening occurs during removing a molded item having an undercut design from a mold; (3) when using a mold having convexes or concaves for forming a molded item having an irregular design such as a character, an acrylic resin film material in the concaves or convexes fails to follow the mold even after vacuum or pressure molding and a base resin must be injection-molded at an acrylic resin film material temperature of less than Tg, so that film extension by a resin pressure may cause whitening and sometimes breakage.

Because of the above problem related to molding whitening resistance of an acrylic resin film material, the material requires removing a protruding film manually instead of punching, has restrictions in its design and sometimes requires the step of removing whiteness by re-heating a whitened part, and therefore, has not been industrially useful.

For example, there have been obtained acrylic resin film materials exhibiting good weather resistance, solvent resistance, stress-whitening resistance, water-whitening resistance and transparency or matting performance (See, for example, Japanese Patent Publication Nos. 62-19309 and 63-8983, and Japanese Patent Application Laid-open Nos. 11-60876, 11-335511, 2001-81266 and 7-238202). These documents have not described insert molding or in-mold molding of an acrylic resin film material obtained, or surface hardness or heat resistance thereof. The acrylic resin film materials having the compositions described in Examples therein have insufficient level of surface hardness or heat resistance required for vehicle applications. There has been described an acrylic resin film material exhibiting good processability and flexibility and in-mold molding thereof (See, for example, Japanese Patent Application Laid-open No. 8-267500), but as is in the above acrylic resin film material, its surface hardness or heat resistance is inadequate to vehicle applications.

An acrylic resin laminate film exhibiting good excoriation resistance can be prepared by laminating a resin layer comprising an alkyl methacrylate having an alkyl group having 1 to 4 carbon atoms as a main component and having a Rockwell hardness of 90 or higher in M scale on at least one side of an acrylic resin layer containing rubber particles (See, for example, Japanese Patent Application Laid-open No. 4-166334).

However, the acrylic resin layer containing rubber particles as described in the document has lower surface hardness, so that there is room for improving surface hardness (excoriation resistance) of the final acrylic resin laminate film for using in vehicle applications. For the acrylic resin laminate film described in Examples therein, the process conditions for preparing a satisfactory molded item have narrower allowance and thus depending on the process conditions, there may occur cracks, rupture, peeling in a laminating part and the like in the acrylic resin layer. Specifically, there are restrictions to a process temperature of an acrylic resin laminate film, an injection speed of a base resin and the like, leading to lower industrial usefulness.

Furthermore, an acrylic resin laminate film which exhibits proper surface hardness and flexibility when applying to a molding process comprising bending or pulling and can provide a molded item with less molding whitening can be obtained by laminating a hard layer consisting of an acrylic resin having a bend elastic constant of 1600 MPa or more on at least one side of a soft layer consisting of an acrylic resin containing rubber particles and having a bend elastic constant of 1500 MPa or less (See, for example, Japanese Patent Application Laid-open No. 2002-292808).

The document has described molding whitening resistance, which is evaluated by conducting a tensile test in accordance with JIS K7113-1995 "Tensile test procedure for plastics" and determining a haze of a ruptured part before and after the rupture. In evaluation of molding whitening resistance in the tensile test, a haze after the test considerably varies, depending on the test conditions such as a tensile rate, a temperature condition, an inter-chuck distance and an inter-chuck distance at an end point. However, there are no descriptions of the test conditions in the document and thus, evaluation of molding whitening resistance therein is ambiguous.

In addition, there are no specific descriptions of a composition of the two-layer structure acrylic rubber used in an acrylic resin laminate film described in Examples therein.

Thus, we have prepared an acrylic resin laminate film described in Examples therein using a well-known two-layer structure acrylic rubber (See, for example, Japanese Patent Application Laid-open No. 2002-80678) having an average particle size of about 75 nm when being mixed in an acrylic resin and then conducted insert- or in-mold molding, and have observed molding whitening but not cracks, rupture or peeling in a laminating part in the acrylic resin laminate film in Example 1 therein in which an acrylic resin containing rubber particles is used as a hard layer.

In the acrylic resin laminate films in Examples 2 to 4 therein prepared by using an acrylic resin containing no rubber particles as a hard layer, cracks, rupture and peeling have generated in a laminating part in an acrylic resin layer, depending on the process conditions. Specifically, there are restrictions to a process temperature of an acrylic resin laminate film, an injection speed of a base resin and the like, leading to lower industrial usefulness.

The document has stated that molding whitening resistance can be improved by using a hard layer consisting of an acrylic resin having a bend elastic constant of 1600 MPa or more which is substantially free from rubber particles. However, molding whitening during the above insert- or in-mold molding occurs in a soft layer as a major part of the acrylic resin laminate film and therefore, whitening can be observed even in a woodgrain printing pattern in which molding whitening is relatively obscured, leading to lower industrial usefulness.

It is because a practically satisfactory level of molding whitening resistance cannot be achieved without using rubber particles exhibiting good stress whitening resistance and having, for example, a particular taper or graft structure, as rubber particles contained in an acrylic resin film (See, for example, Japanese Patent Application Laid-open Nos. 10-237261 and 2002-361712).

However, although an improved molded item without noticeable molding whitening can be provided by using rubber particles exhibiting good stress whitening resistance and having a particular taper or graft structure which is now well-known, it is difficult to obtain a molded item exhibiting adequate surface hardness required in vehicle applications as described above.

In the acrylic resin laminate film in Example 5 in the document, its surface hardness (excoriation resistance) and heat resistance are at an inadequate level for vehicle applications.

A laminate film exhibiting good transparency, stress whitening resistance, water whitening resistance and interlayer adhesiveness can be obtained by laminating a vinylidene fluoride polymer layer exhibiting good weather resistance, solvent resistance and adhesiveness to an acrylic resin layer with an acrylic resin layer having a particular multilayer structure polymer (See, for example, Japanese Patent Application Laid-open No. 3-288640). The document has not, however, described insert- or in-mold molding of the laminate film thus obtained. Furthermore, it has not described surface hardness (excoriation resistance) or heat resistance.

There is room for improving both surface hardness (excoriation resistance) and heat resistance in the laminate films in Examples therein for using in vehicle applications.

There has been obtained a photocurable film or sheet comprising a surface photocurable resin exhibiting good abrasion resistance, weather resistance, chemical resistance, non-stickiness, processability and storage stability (Japanese Patent Application Laid-open Nos. 2002-80550 and 2002-79621).

For example, when using an acrylic resin film exhibiting good surface hardness, heat resistance and moldability as a base film or sheet for preparing a photocurable film or sheet (See, for example, Japanese Patent Application Laid-open No. 8-323934), such an acrylic resin film may have inadequate molding whitening resistance and thus the photocurable film or sheet prepared may also inadequate molding whitening resistance.

Furthermore, when using an acrylic resin film exhibiting good weather resistance, solvent resistance, stress whitening resistance, water whitening resistance, and transparency as a base film or sheet (See, for example, Japanese Patent Publication Nos. 62-19309 and 63-8983), such an acrylic resin film has inadequate heat resistance, so that in a drying step for removing a solvent after applying a photocurable resin composition to a film, the photocurable resin composition and/or the acrylic resin film are extended, leading to deterioration in excoriation resistance and surface hardness after curing. When using such an acrylic resin film, the drying conditions may be optimized to minimize an extent of extension of the acrylic resin film, but it results in a larger apparatus in the drying step and also a reduced production efficiency, leading to lower industrial usefulness. Furthermore, since a drying temperature cannot be elevated, the amount of a residual organic solvent in the photocurable resin layer cannot be reduced as described later, and thus various problems tend to be caused by the residual solvent. Surface hardness in the photocurable film or sheet after photocuring is strongly influenced by surface hardness of a film or sheet to be a base, so that surface hardness is lower in the photocurable film or sheet after photocuring when using such an acrylic resin film as a base.

There has been obtained a laminate film or sheet which can be suitably used in insert- or in-mold molding, by laminating an acrylic resin film material or sheet as an acrylic resin layer (See, for example, Japanese Patent Application Laid-open Nos. 2000-86853, 2001-232660, 2001-334609 and 2002-3620). However, there have been no descriptions of importance or a solution in terms of molding whitening resistance in a laminate film or sheet having such an acrylic resin layer.

Laminate films or sheets used for surface decoration of exterior construction members such as a sash for an opening including a window, an entrance sliding door and an entrance door (hereinafter, referred to as a "construction laminate film or sheet") are mainly those having a structure that a surface protective layer consisting of an acrylic resin exhibiting good weather resistance is laminated on the surface of a base sheet consisting of a thermoplastic resin such as polyvinyl chloride resins. These construction laminate films or sheets have a property that the acrylic resin as a surface protective layer is resistant to degradation such as oxidation or decomposition by ultraviolet rays, as well as exhibit good compatibility with, for example, benzotriazole or benzophenone ultraviolet absorbers. Thus, it can have adequate weather resistance to protect a picture layer generally formed in a base sheet or its surface from ultraviolet rays contained in sunlight and to be satisfactorily used in exterior applications.

There have been disclosed construction laminate films or sheets where an acrylic resin film or sheet is laminated on a surface protective layer laminated by a well-known lamination method (See, for example, Japanese Patent Application Laid-open Nos. 2000-225672, 2001-1465 and 2002-347185).

Laminate films or sheets for the above applications must have the functions described below.

(1) Matte-Reduction Resistance

A construction laminate film or sheet tends to encounter gloss change in its surface during manufacturing, processing or the use. Specifically, the surface of a construction laminate film or sheet is generally treated by an appropriate method such as squeezing, adding a gloss adjusting agent and forming a gloss adjusting layer to be in a desired gloss state. However, in the construction laminate film or sheet, even when a gloss state in the surface is properly adjusted during a process for manufacturing the construction laminate film or sheet, the surface tends to be glossier during a process for gluing it on the surface of a variety of bases such as an aluminum sash base and a steel door base by, for example, wrapping, or during practically using the various members thus processed after being mounted in a building such as a house, leading to design defects such as shining and uneven gloss. Such design defects are caused by softening of a thermoplastic resin layer in a surface protective layer due to elevation of a temperature of the surface of the laminate film or sheet by heating during the above processing or during the use as a construction member. Specifically, matte-reduction resistance required for the laminate film or sheet corresponds to heat resistance of the thermoplastic resin layer in the surface protective layer.

(2) Secondary Processing Suitability

A construction laminate film or sheet is generally used after gluing on a variety of bases including wood bases such as a plywood and a particle board; woody bases such as a medium density fiber board (MDF); inorganic bases such as a calcium silicate board, a slate board and a cement excelsior plate; and synthetic resin bases such as a fiber-reinforced plastic (FRP). It may be glued not only simply on a flat base, but also after being three-dimensionally formed on the surface of an uneven base by an appropriate method including a folding process such as V-cutting and wrapping or vacuum molding. In particular, decorative members having various types of particular three-dimensional shape have been demanded because of diversification of consumers' preference, and thus a construction laminate film or sheet has been increasingly demanded to have secondary processing suitability such as folding processability and three-dimensional moldability. For example, in a cold region, when folding a base on which a laminate film or sheet is laminated, when folding a base after forming a V-shape groove in it (V-cutting), or when conducting folding along an uneven surface of a long base (wrapping), defects such as whitening, cracks and rupture may be generated in a turned part if stress relaxation is inadequate in the surface acrylic resin layer.

(3) Excoriation Resistance

In the light of eliminating appearance defects due to excoriation during a process for producing a laminate molded item and further extending its applications to members where excoriation more frequently occurs, including a sash in an opening such as a window, an entrance sliding door and an entrance door, there has been strongly needed to provide a construction laminate film or sheet exhibiting good excoriation resistance. As a measure of excoriation resistance, an acrylic resin layer as the surface of a laminate molded item is required to have a pencil hardness of 2 B or higher. For an acrylic resin layer with a pencil hardness of 2 B or higher, a laminate molded item prepared by using the construction laminate film or sheet exhibits practically acceptable excoriation resistance, and furthermore, appearance defects due to excoriation may be reduced during the process for preparing a laminate molded item, so that it can be used in various exterior construction members such as a sash in an opening such as a window, an entrance sliding door and an entrance door.

Although Japanese Patent Application Laid-open Nos. 2000-225672, 2001-1465 and 2002-347185 have described a construction laminate film or sheet comprising an acrylic resin film in its surface protective layer, there have been no descriptions of importance of concomitantly having these properties, i.e., excoriation resistance, matte-reduction resistance and molding whitening resistance or a solution therefor. For example, Japanese Patent Application Laid-open Nos. 2000-225672 and 2001-1465 have described molding whitening resistance, but not matte-reduction resistance.

Japanese Patent Application Laid-open No. 2002-347185 has described matte-reduction resistance, but not excoriation resistance or molding whitening resistance.

Specifically, there has been described that an acrylic resin film having a glass-transition temperature of 90° C. can be used as a surface protective layer to provide a laminate film or sheet minimizing gloss variation such as matte reduction even when the surface of the laminate film or sheet is exposed to an elevated temperature of 60° C. However, the document has not specifically described a composition of the acrylic resin film or a method for determining a glass-transition temperature. Furthermore, it has not specifically described individual processes for preparing a laminate molded item or a reason for "a surface temperature of 60° C. or higher of a laminate film or sheet" which presumably takes a practical application after mounting in a building into account. Furthermore, it has not detailed processing for preparing a laminate molded item.

For using a laminate film or sheet comprising an acrylic resin film as a surface protective layer in a part demanding the highest level of heat resistance such as an external wall including a siding, a fence, a roof, a roof deck and a balcony among the applications, it is desirable that gloss variation such as matte reduction does not occur even when holding a laminate film or sheet under the atmosphere of a surface temperature of 90° C. for 24 hours.

However, the acrylic resin film (Mitsubishi Rayon Co. Ltd., HBS006 (trade name)) described in Example in the document cannot meet the requirement for heat resistance in the above applications, thus gloss change such as matte reduction occurs when holding a laminate film or sheet at a surface temperature of 90° C. for 24 hours occur, to be restrictions to use.

Furthermore, when preparing a laminate molded item having a three-dimensional shape by three-dimensionally laminating a laminate film or sheet (Mitsubishi Rayon Co. Ltd., HBS006 and HBS027 (trade name)) prepared using the acrylic resin film described in Examples in the document on a three-dimensional polyester resin base with a curvature radius of 0.5 at a temperature of 80° C., a laminate film or sheet from HBS006 showed some whitening while a laminate film or sheet from HBS027 showed whitening. Therefore, there have been restrictions to a molding temperature, processing conditions, and the like.

These examples indicate that in a construction laminate film or sheet comprising an acrylic resin film as a surface protective layer described in Japanese Patent Application Laid-open No. 2002-347185, there is room for improving molding whitening resistance and matte-reduction resistance.

There have been furthermore disclosed that a particular resin composition can be used to improve flexibility of an acrylic resin film, which exhibits so good processability that it can be used in, for example, bending with a small curvature radius and bending at a higher deformation rate (See, for example, Japanese Patent Application Laid-open No. 11-80487). There has been disclosed that a particular resin composition can be used to provide an acrylic resin film exhibiting good low-temperature processability (See, for example, Japanese Patent Application Laid-open Nos. 2002-241445 and 2003-128734). However, Japanese Patent Application Laid-open Nos. 1999-80487, 2002-241445 and 2003-128734 have not described matte-reduction resistance in the acrylic resin film. Furthermore, in an acrylic resin film prepared by using a resin composition described in Example thereof as a starting material, its expected matte-reduction resistance is inadequate to any construction application and thus it is not suitable as a construction laminate film or sheet.

When using an acrylic resin film exhibiting good heat resistance (See, for example, Japanese Patent Application Laid-open Nos. 8-323934, 11-147237, 2002-80678 and 2002-80679), an item obtained exhibits good matte-reduction resistance, but is not suitable as a construction laminate film or sheet because of its inadequate molding whitening resistance.

REFERENCES

1. Japanese Patent Application Laid-open No. 8-323934
2. Japanese Patent Application Laid-open No. 11-147237
3. Japanese Patent Application Laid-open No. 2002-80678
4. Japanese Patent Application Laid-open No. 2002-80679
5. Japanese Patent Application Laid-open No. 10-237261
6. Japanese Patent Application Laid-open No. 2002-361712
7. Japanese Patent Application Laid-open No. 8-267500
8. Japanese Patent Publication No. 62-19309
9. Japanese Patent Publication No. 63-8983
10. Japanese Patent Application Laid-open No. 11-60876
11. Japanese Patent Application Laid-open No. 11-335511
12. Japanese Patent Application Laid-open No. 2001-81266
13. Japanese Patent Application Laid-open No. 7-238202
14. Japanese Patent Application Laid-open No. 4-166334
15. Japanese Patent Application Laid-open No. 2002-292808
16. Japanese Patent Application Laid-open No. 3-288640
17. Japanese Patent Application Laid-open No. 2002-80550
18. Japanese Patent Application Laid-open No. 2002-79621
19. Japanese Patent Application Laid-open No. 2000-86853
20. Japanese Patent Application Laid-open No. 2001-232660
21. Japanese Patent Application Laid-open No. 2001-334609
22. Japanese Patent Application Laid-open No. 2002-3620
23. Japanese Patent Application Laid-open No. 2000-225672
24. Japanese Patent Application Laid-open No. 2001-1465
25. Japanese Patent Application Laid-open No. 2002-347185
26. Japanese Patent Application Laid-open No. 11-80487
27. Japanese Patent Application Laid-open No. 2002-241445
28. Japanese Patent Application Laid-open No. 2003-128734
29. Japanese Patent No. 2808251
30. WO 97/28950
31. Polymer H and Book (J. Brandrup, Interscience, 1989)

DISCLOSURE OF THE INVENTION

An objective of this invention is to provide an acrylic resin film material or acrylic resin laminate film exhibiting such surface hardness, heat resistance, and transparency or matting performance that a molded item is not whitened during insert- or in-mold molding and is allowed to be used in vehicle applications. Another objective of this invention is to provide a photocurable acrylic resin film or sheet or laminate film or sheet exhibiting such heat resistance, excoriation resistance and surface hardness that a molded item is not whitened during insert- or in-mold molding and is allowed to be used in vehicle applications. A further objective of this invention is to provide a construction laminate film or sheet which is not whitened during processing such as V-cutting and wrapping in a cold region and meets requirement for excoriation resistance and matte-reduction resistance. Another objective of this invention is to provide a laminate molded item prepared by laminating it on a base.

Another objective of this invention is to provide a multilayer structure polymer suitable for providing the above acrylic resin film material, and a resin composition containing the multilayer structure polymer.

The above objectives can be achieved by the followings.

[1] A multilayer structure polymer (I) prepared by sequentially polymerizing (1) an innermost layer polymer (I-A), (2) an intermediate layer polymer (I-B) with a glass-transition temperature of 25 to 100° C. having a composition different from that of the innermost layer polymer (I-A), and (3) an outermost layer polymer (I-C), which are comprised of the following monomer component:

(1) monomer component for the innermost layer polymer (I-A):
  (I-A1) an alkyl acrylate in 50 to 99.9 wt %,
  (I-A2) an alkyl methacrylate in 0 to 49.9 wt %,
  (I-A3) another monomer having a copolymerizable double bond in 0 to 20 wt %,
  (I-A4) a multifunctional monomer in 0 to 10 wt %, and
  (I-A5) a graft crosslinker in 0.1 to 10 wt %;

(2) monomer component for the intermediate layer polymer (I-B):
  (I-B1) an alkyl acrylate in 9.9 to 90 wt %,
  (I-B2) an alkyl methacrylate in 9.9 to 90 wt %,
  (I-B3) another monomer having a copolymerizable double bond in 0 to 20 wt %,
  (I-B4) a multifunctional monomer in 0 to 10 wt %, and
  (I-B5) a graft crosslinker 0.1 to 10 wt %;

(3) monomer component for the outermost layer polymer (I-C):
  (I-C1) an alkyl methacrylate in 80 to 100 wt %,
  (I-C2) an alkyl acrylate in 0 to 20 wt %, and
  (I-C3) another monomer having a copolymerizable double bond in 0 to 20 wt %.

[2] A resin composition (III) comprising the multilayer structure polymer (I) as described in [1] and a thermoplastic polymer (II) containing an alkyl methacrylate as a main component.

[3] A resin composition (IV) comprising the multilayer structure polymer (I) as described in [1] or the resin composition (III) as described in [2] in 100 parts by weight and a matting agent in 0.1 to 40 parts by weight.

[4] An acrylic resin film material (A) consisting of one selected from the group consisting of the multilayer structure polymer (I) as described in [1], the resin composition (III) as described in [2] and the resin composition (IV) as described in [3].

[5] An acrylic resin film material (A) exhibiting a difference of 30% or less between haze values as determined in accordance with the testing method of JIS K7136 (haze measurement method) after and before a tensile test where a test piece with a width of 20 mm is pulled under the conditions of an initial inter-chuck distance of 25 mm, a rate of 50 mm/min and a temperature of 23° C. until an end-point inter-chuck distance becomes 33 mm as well as having a pencil hardness of 2 B or higher as determined in accordance with JIS K5400.

[6] The acrylic resin film material (A) as described in [4] or [5], wherein at least one side has a 60° surface glossiness of 100% or less.

[7] The acrylic resin film material (A) as described in any one of [4] to [6], wherein a heat distortion temperature as determined in accordance with ASTM D648 is 80° C. or higher.

[8] The acrylic resin film material (A) as described in any one of [4] to [7], comprising a decorative layer in at least one side.

[9] An acrylic resin laminate film comprising the acrylic resin film material (A) as described in any one of [4] to [7] and further comprising another acrylic resin film material (A') or fluororesin film material (A").

[10] The acrylic resin laminate film as described in [9], further comprising a decorative layer in at least one side.

[11] A photocurable acrylic resin film or sheet comprising the acrylic resin film material (A) as described in any one of [4] to [7] or the acrylic resin laminate film as described in [9], and a photocurable resin composition (Z) layer which comprises a thermoplastic resin having a radical polymerizable unsaturated group in a side chain (z-1) and photoinitiator (z-2).

[12] The photocurable acrylic resin film or sheet as described in [11], further comprising a decorative layer in at least one side.

[13] A laminate film or sheet comprising one selected from the group consisting of the acrylic resin film material (A) as described in any one of [4] to [7], the acrylic resin laminate film as described in [9] and the photocurable acrylic resin film or sheet as described in [11], as well as a thermoplastic resin layer (C).

[14] The laminate film or sheet as described in [13], further comprising a decorative layer.

[15] A construction laminate film or sheet consisting of the laminate film or sheet as described in [13] or [14].

[16] A laminate molded item wherein on a base (E) is laminated one selected from the group consisting of the acrylic resin film material (A) as described in any one of [4] to [8], the acrylic resin laminate film as described in [9] or [10], the photocurable acrylic resin film or sheet as described in [11] or [12], the laminate film or sheet as described in [13] or [14] and the construction laminate film or sheet as described in [15].

[17] The laminate molded item as described in [16] prepared by vacuum- or press molding one selected from the group consisting of the acrylic resin film material (A) as described in any one of [4] to [8], the acrylic resin laminate film as described in [9] or [10], the photocurable acrylic resin film or sheet as described in [11] or [12], the laminate film or sheet as described in [13] or [14] and the construction laminate film or sheet as described in [15] in an injection mold, and then in the injection mold, combining it with a resin to be the base (E) by injection-molding.

[18] The laminate molded item as described in [16] prepared by vacuum- or press molding one selected from the group consisting of the acrylic resin film material (A) as described in any one of [4] to [8], the acrylic resin laminate film as described in [9] or [10], the photocurable acrylic resin film or sheet as described in [11] or [12], the laminate film or sheet as described in [13] or [14] and the construction laminate film or sheet as described in [15], and then placing the molding in an injection mold, and injection-molding a resin to be the base (E) in the injection mold.

An acrylic resin film material (A) prepared by using one selected from the group consisting of a multilayer structure polymer (I), a resin composition (III) and a resin composition (IV), or an acrylic resin film material (A) exhibiting a difference of 30% or less between haze values as determined in accordance with the testing method of JIS K7136 (haze measurement method) after and before a tensile test where a test piece with a width of 20 mm is pulled under the conditions of an initial inter-chuck distance of 25 mm, a rate of 50 mm/min and a temperature of 23° C. until an end-point inter-chuck distance becomes 33 mm as well as having a pencil hardness of 2 B or higher as determined in accordance with JIS K5400 according to this invention, can be used to provide an acrylic resin film material (A) and an acrylic resin laminate film which can prevent a molded item from being whitened during insert- or in-mold molding and can meet the requirement for surface hardness, heat resistance, and transparency or matting performance for vehicle applications. Furthermore, there can be provided a photocurable acrylic resin film or sheet and laminate film or sheet which can prevent a molded item from being whitened during insert- or in-mold molding and exhibits sufficient heat resistance, excoriation resistance, surface hardness to be used in vehicle applications. Furthermore, there can be provided a construction laminate film or sheet which is not whitened during processing such as V-cutting and wrapping in a cold region and meets requirement for excoriation resistance and matte-reduction resistance. There can be also provided a laminate molded item prepared by laminating it on a base.

In particular, one selected from the group consisting of an acrylic resin film material (A), an acrylic resin laminate film, a photocurable acrylic resin film or sheet and a laminate film or sheet according to this invention can be used to eliminate a step of manually removing a protruding film instead of punching, restrictions in a design and a step of removing whitening by re-heating the whitened part. The acrylic resin film material (A), the acrylic resin laminate film, the photocurable acrylic resin film or sheet, and the laminate film or sheet of this invention are industrially very useful and may dramatically extend their applications.

BEST MODE FOR CARRYING OUT THE INVENTION

Multilayer Structure Polymer (I)

A multilayer structure polymer (I) is formed by polymer layers, i.e., an innermost layer polymer (I-A), an intermediate layer polymer (I-B) having a composition different from that of the innermost layer polymer (I-A) and an outermost layer polymer (I-C) comprising the following monomer component:

monomer component for the innermost layer polymer (I-A):
   (I-A1) an alkyl acrylate in 50 to 99.9 wt %,
   (I-A2) an alkyl methacrylate in 0 to 49.9 wt %,
   (I-A3) a monomer other than (I-A1) or (I-A2) having a copolymerizable double bond in 0 to 20 wt %,
   (I-A4) a multifunctional monomer in 0 to 10 wt %, and
   (I-A5) a graft crosslinker in 0.1 to 10 wt %;

monomer component for the intermediate layer polymer (I-B):
   (I-B1) an alkyl acrylate in 9.9 to 90 wt %,
   (I-B2) an alkyl methacrylate in 9.9 to 90 wt %,
   (I-B3) a monomer other than (I-B1) or (I-B2) having a copolymerizable double bond in 0 to 20 wt %,
   (I-B4) a multifunctional monomer in 0 to 10 wt %, and
   (I-B5) a graft crosslinker 0.1 to 10 wt %;

monomer component for the outermost layer polymer (I-C):
   (I-C1) an alkyl methacrylate in 80 to 100 wt %,
   (I-C2) an alkyl acrylate in 0 to 20 wt %, and
   (I-C3) a monomer other than (I-C1) or (I-C2) having a copolymerizable double bond in 0 to 20 wt %.

The phrase "different composition" as used herein means that in each polymer, the type and/or the amount of at least one monomer component.

The intermediate layer polymer (I-B) alone comprising the above components has a Tg of 25 to 100° C.

The alkyl acrylate, Component (I-A1) contained in the monomer component for the innermost layer polymer (I-A) may be straight or branched. Examples thereof include, methyl acrylate, ethyl acrylate, propyl acrylate, n-butyl acrylate, 2-ethylhexyl acrylate and n-octyl acrylate, which can be used alone or in combination of two or more. Among others, n-butyl acrylate is particularly preferable.

The alkyl methacrylate, Component (I-A2) contained, as necessary, in the monomer component for the innermost layer polymer (I-A) may be straight or branched. Examples thereof include methyl methacrylate, ethyl methacrylate, propyl methacrylate and n-butyl methacrylate, which can be used alone or in combination of two or more. Among others, methyl methacrylate is particularly preferable.

The monomer other than (I-A1) or (I-A2) having a copolymerizable double bond, Component (I-A3) contained, as necessary, in the monomer component for the innermost layer polymer (I-A) may be, for example, acrylic monomers such as lower alkoxy acrylates, cyanoethyl acrylate, acrylamide, acrylic acid and methacrylic acid; styrene; alkyl-substituted styrenes; acrylonitrile; and methacrylonitrile, which can be used alone or in combination of two or more.

The multifunctional monomer, Component (I-A4), contained, as necessary, in the monomer component for the innermost layer polymer (I-A) is defined as a monomer having two or more double bonds in one molecule which are comparably copolymerizable. Preferable examples thereof include alkyleneglycol dimethacrylates such as ethyleneglycol dimethacrylate, 1,3-butyleneglycol dimethacrylate, 1,4-butyleneglycol dimethacrylate and propyleneglycol dimethacrylate. Furthermore, polyvinylbenzenes such as divinylbenzene and trivinylbenzene may be used. These can be used alone or in combination of two or more. 1,3-Butyleneglycol dimethacrylate is particularly preferable. Even when the multifunctional monomer (I-A4) is not effective at all, a considerably stable multilayer structure polymer (I) can be obtained as long as the graft crosslinker (I-A5) is present. For example, when hot strength is strictly required, they can be appropriately added depending on their application.

The graft crosslinker (I-A5) contained in a monomer component for the innermost layer polymer (I-A) is defined as a monomer having two or more double bonds in one molecule which have differently copolymerizable. Preferable examples thereof include copolymerizable allyl, methallyl or crotyl ester of $\alpha,\beta$-unsaturated carboxylic acid or dicarboxylic acid; particularly preferably allyl esters of acrylic, methacrylic, maleic or fumaric acids. Among others, allyl methacrylate is preferable because of its excellent effects. Furthermore, triallyl cyanurate and triallyl isocyanurate are also effective. These can be used alone or in combination of two or more. In the graft crosslinker (I-A5), mainly a conjugated unsaturated bond therein reacts significantly faster than an allyl, methallyl or crotyl group, to form a chemical bond, while substantially most of the allyl, methallyl or crotyl group effectively functions during polymerization of a next layer to form a graft bond between adjacent two layers.

Polymerization may be conducted in the presence of a chain transfer agent.

A content of the alkyl acrylate (I-A1) in the monomer component for the innermost layer polymer (I-A) is 50 to 99.9 wt %. In the light of molding whitening resistance of an acrylic resin film material (A) obtained, it is preferably 55 wt % or more, more preferably 60 wt % or more. In the light of surface hardness and heat resistance (for a construction material application, matte-reduction resistance) of an acrylic resin film material (A) obtained, it is preferably 79.9 wt % or less, more preferably 69.9 wt % or less.

A content of the alkyl methacrylate (I-A2) in the monomer component for the innermost layer polymer (I-A) is 0 to 49.9 wt %, preferably 20 wt % or more, more preferably 30 wt % or more, while being preferably 44.9 wt % or less, more preferably 39.9 wt % or less.

A content of the monomer (I-A3) other than (I-A1) or (I-A2) having a copolymerizable double bond in the monomer component for the innermost layer polymer (I-A) is 0 to 20 wt %, preferably 15 wt % or less.

A content of the multifunctional monomer (I-A4) in the monomer component for the innermost layer polymer (I-A) is 0 to 10 wt %. In the light of molding whitening resistance of an acrylic resin film material (A) obtained, it is preferably 0.1 wt % or more, more preferably 3 wt % or more, while in the light of achieving adequate flexibility and toughness, being preferably 6 wt % or less, more preferably 5 wt % or less.

A content of the graft crosslinker (I-A5) in the monomer component for the innermost layer polymer (I-A) is 0.1 to 10 wt %. A content of 0.1 wt % or more allows an acrylic resin film material (A) obtained to exhibit good molding whitening resistance and can be molded without deterioration of optical properties such as transparency. It is preferably 0.5 wt % or more. A content of 10 wt % or less can endow an acrylic resin film material (A) obtained with adequate flexibility and toughness. It is preferably 5 wt % or less, more preferably 2 wt % or less.

A Tg of the innermost layer polymer (I-A) alone is preferably, but not limited to, 10° C. or lower, more preferably 0° C. or lower. A Tg of 10° C. or lower is preferable because it allows a multilayer structure polymer (I) obtained to exhibit suitable impact resistance. A Tg can be calculated from FOX's equation, using the values described in Polymer H and Book (J. Brandrup, Interscience, 1989).

A content of the innermost layer polymer (I-A) in the multilayer structure polymer (I) is preferably 15 to 50 wt %. A content of 15 wt % or more can endow an acrylic resin film material (A) obtained with molding whitening resistance, and with both film-formability and adequate toughness for insert- and in-mold molding. A content of 50 wt % or less is preferable because it can provide a film having adequate surface hardness and also heat resistance (in the case of a construction application, matte-reduction resistance) for vehicle applications. It is more preferably 35 wt % or less.

The innermost layer polymer (I-A) may be monolayered or multilayered; more preferably two-layered. Monomer ratios in these two layers the innermost layer polymer (I-A) are preferably, but not limited to, different.

When the innermost layer polymer (I-A) consists of two layers, a Tg of the inner layer (I-A1) is preferably lower than that of the outer layer (I-A2) in the light of molding whitening resistance, impact resistance, heat resistance (in the case of a construction application, matte-reduction resistance) and surface hardness of the acrylic resin film material (A). Specifically, a Tg of the inner layer (I-A1) is lower than –30° C. in the light of molding whitening resistance and impact resistance while a Tg of the outer layer (I-A2) is –15° C. to –10° C. in the light of surface hardness and heat resistance (in the case of a contraction application, matte-reduction resistance). Furthermore, in the light of surface hardness and heat resistance (in the case of a construction application, matte-reduction resistance), a content of the inner layer (I-A1) in the innermost layer polymer (I-A) is preferably 1 to 20 wt %, while a content in the outer layer (I-A2) is preferably 80 to 99 wt %.

The alkyl acrylate, Component (I-B1) contained in the monomer component for the intermediate layer polymer (I-B) may be straight or branched. Examples thereof include methyl acrylate, ethyl acrylate, propyl acrylate, n-butyl acrylate, 2-ethylhexyl acrylate and octyl acrylate, which can be used alone or in combination of two or more. Among others, methyl acrylate and n-butyl acrylate are preferable.

The alkyl methacrylate, Component (I-B2) contained in the monomer component for the intermediate layer polymer (I-B) may be straight or branched. Examples thereof include methyl methacrylate, ethyl methacrylate, propyl methacrylate and n-butyl methacrylate, which can be used alone or in combination of two or more. Among others, methyl methacrylate is preferable.

The monomer other than (I-B1) or (I-B2) having a copolymerizable double bond, Component (I-B3) contained, as necessary, in the monomer component for the intermediate layer polymer (I-B) may be, for example, acrylic monomers such as lower-alkoxy acrylate, cyanoethyl acrylate, acrylamide, acrylic acid and methacrylic acid; styrene; alkyl-substituted styrenes; acrylonitrile; and methacrylonitrile, which can be used alone or in combination of two or more.

The multifunctional monomer, Component (I-B4) contained, as necessary, in the monomer component for the intermediate layer polymer (I-B) may be preferably alkylenediglycol methacrylates such as ethyleneglycol dimethacrylate, 1,3-butyleneglycol dimethacrylate, 1,4-butyleneglycol dimethacrylate and propyleneglycol dimethacrylate. Furthermore, polyvinylbenzenes such as divinylbenzene and trivinylbenzene may be used. Among others, 1,3-butyleneglycol dimethacrylate is preferable. These can be used alone or in combination of two or more. Even when the multifunctional monomer (I-B4) is not effective at all, a considerably stable multilayer structure polymer (I) can be obtained as long as the graft crosslinker (I-B5) is present. For example, when hot strength is strictly required, they can be appropriately added depending on their application.

The graft crosslinker (I-B5) contained as a monomer component for the intermediate layer polymer (I-B) may be, for example, copolymerizable allyl, methallyl or crotyl ester of α,β-unsaturated carboxylic acid or dicarboxylic acid; particularly preferably allyl esters of acrylic, methacrylic, maleic or fumaric acids. Among others, allyl methacrylate is preferable because of its excellent effects. Furthermore, triallyl cyanurate and triallyl isocyanurate are also effective. These can be used alone or in combination of two or more. In the graft crosslinker (I-B5), mainly a conjugated unsaturated bond therein reacts significantly faster than an allyl, methallyl or crotyl group, to form a chemical bond, while substantially most of the allyl, methallyl or crotyl group effectively functions during polymerization of a next layer to form a graft bond between adjacent two layers.

Polymerization may be conducted in the presence of a chain transfer agent.

A content of the alkyl acrylate (I-B1) in the monomer component for the intermediate layer polymer (I-B) is 9.9 to 90 wt %. In the light of molding whitening resistance and surface hardness and heat resistance (in the case of a construction application, matte-reduction resistance) of an acrylic resin film material (A) obtained, it is preferably 19.9 wt % or more, more preferably 29.9 wt % or more while being preferably 60 wt % or less, more preferably 50 wt % or less.

A content of the alkyl methacrylate (I-B2) in the monomer component for the intermediate layer polymer (I-B) is 9.9 to 90 wt %. In the light of molding whitening resistance, surface hardness and heat resistance (in the case of a construction application, matte-reduction resistance) of an acrylic resin film material, it is preferably 39.9 wt % or more, more preferably 49.9 wt % or more while being preferably 80 wt % or less, more preferably 70 wt % or less.

A content of the monomer (I-B3) other than (I-B1) or (I-B2) having a copolymerizable double bond in the monomer component for the intermediate layer polymer (I-B) is 0 to 20 wt %, preferably 15 wt % or less.

A content of the multifunctional monomer (I-B4) in the monomer component for the intermediate layer polymer (I-B) is 0 to 10 wt %. In the light of endowing an acrylic resin film material (A) obtained with adequate flexibility and toughness, it is preferably 6 wt % or less, more preferably 3 wt % or less.

A content of the graft crosslinker (I-B5) in the monomer component for the intermediate layer polymer (I-B) is 0.1 to 10 wt %. A content of 0.1 wt % or more allows an acrylic resin film material (A) obtained to exhibit good molding whitening resistance and can be molded without deterioration of optical properties such as transparency. It is preferably 0.5 wt % or more. A content of 10 wt % or less can endow an acrylic resin film material (A) obtained with adequate flexibility and toughness. It is preferably 5 wt % or less, more preferably 2 wt % or less.

A Tg of the intermediate layer polymer (I-B) alone must be within the range of 25 to 100° C. A Tg of 25° C. or higher can endow an acrylic resin film material (A) obtained with adequate level of surface hardness and heat resistance (in the case of a construction application, matte-reduction resistance) for vehicle or construction applications. It is preferably 40° C. or higher, more preferably 50° C. or higher. A Tg of 100° C. or lower can give an acrylic resin film material (A) exhibiting good molding whitening resistance and film-formability. It is preferably 80° C. or lower, more preferably 70° C. or lower.

As described above, the intermediate layer polymer (I-B) exhibiting a particular composition and a particular Tg can be used to provide an acrylic resin film material (A) exhibiting both molding whitening resistance and surface hardness and heat resistance (in the case of a construction application, matte-reduction resistance), which were difficult to be achieved.

A preferable content of the intermediate layer polymer (I-B) in the multilayer structure polymer (I) is preferably, but not limited to, 5 to 35 wt %. A content within these limits is preferable because it may allow the intermediate layer polymer (I-B) to perform an important function for achieving both molding whitening resistance, surface hardness and heat resistance (in the case of a construction application, matte-reduction resistance) as described above, as well as can endow an acrylic resin film material (A) obtained with other properties such as film-formability and adequate toughness for insert- and in-mold molding. It is more preferably 20 wt % or less.

The intermediate layer polymer (I-B) is generally a monolayer, but may be of two or more layers.

The alkyl methacrylate, Component (I-C1) contained in the monomer component for the outermost layer polymer (I-C) may be straight or branched. Examples thereof include methyl methacrylate, ethyl methacrylate, propyl methacrylate and n-butyl methacrylate, which can be used alone or in combination of two or more. Among others, methyl methacrylate is preferable.

The alkyl acrylate, Component (I-C2) contained, as necessary, in the monomer component for the outermost layer polymer (I-C) may be straight or branched. Examples thereof include methyl acrylate, ethyl acrylate, propyl acrylate, n-butyl acrylate, 2-ethylhexyl acrylate and n-octyl acrylate, which can be used alone or in combination of two or more. Among others, methyl acrylate and n-butyl acrylate are preferable.

The monomer other than (I-C1) or (I-C2) having a copolymerizable double bond, Component (I-C3) contained, as necessary, in the monomer component for the outermost layer polymer (I-C) may be, for example, acrylic monomers such as lower-alkoxy acrylate, cyanoethyl acrylate, acrylamide, acrylic acid and methacrylic acid; styrene; alkyl-substituted styrenes; acrylonitrile; methacrylonitrile; unsaturated dicarboxylic anhydrides such as maleic anhydride and itaconic anhydride; N-phenylmaleimide and N-cyclohexylmaleimide, which can be used alone or in combination of two or more.

A content of the alkyl methacrylate (I-C1) in the monomer component for the outermost layer polymer (I-C) is 80 to 100 wt %. In the light of surface hardness and heat resistance (in the case of a construction application, matte-reduction resistance) of the acrylic resin film material (A), it is preferably 90 wt % or more, more preferably 93 wt % or more, while being preferably 99 wt % or less.

A content of the alkyl acrylate (I-C2) in the monomer component for the outermost layer polymer (I-C) is 0 to 20 wt %, preferably 1 wt % or more, while being preferably 10 wt % or less, more preferably 7 wt % or less.

A content of the monomer (I-C3) other than (I-C1) or (I-C2) having a copolymerizable double bond in the monomer component for the outermost layer polymer (I-C) is 0 to 20 wt %, preferably 15 wt % or less.

A molecular weight of the outermost layer polymer (I-C) may be adjusted by using, but not limited to, a chain transfer agent during polymerizing for the outermost layer polymer (I-C). The chain transfer agent may be preferably selected from those generally used for radical polymerization. Examples thereof include alkyl mercaptans having 2 to 20 carbon atoms, mercaptoacids, thiophenol and carbon tetrachloride, which can be used alone or in combination of two or more. A content of the chain transfer agent is preferably 0.01 to 5 parts by weight, more preferably 0.2 parts by weight or more, most preferably 0.4 parts by weight or more to 100 parts by weight of the polymer (I-C) monomers ((I-C1) to (I-C3)).

A Tg of the outermost layer polymer (I-C) alone is preferably, but not limited to, 60° C. or higher. A Tg of 60° C. or higher is preferable because it can provide an acrylic resin film material (A) surface hardness and heat resistance (in the case of a construction application, matte-reduction resistance) for vehicle applications. It is more preferably 80° C. or higher, most preferably 90° C. or higher.

A content of the outermost layer polymer (I-C) in the multilayer structure polymer (I) is preferably, but not limited to, 15 to 80 wt %. A content of 15 wt % or more is preferable in the light of surface hardness and heat resistance (in the case of a construction application, matte-reduction resistance). It is more preferably 45 wt % or more. A content of 80 wt % or less is preferable because a film obtained can be endowed with molding whitening resistance and adequate toughness for insert- and in-mold molding.

The outermost layer polymer (I-C) is generally a monolayer, but may be of two or more layers.

The multilayer structure polymer (I) suitably used for the acrylic resin film material (A) of this invention consists of the polymer layers, i.e., the innermost layer polymer (I-A), the intermediate layer polymer (I-B) and the outermost layer polymer (I-C) as described above.

A gel content of the multilayer structure polymer (I) is 50% or more, more preferably 60% or more in the light of obtaining more improved molding whitening resistance. The term "gel content" as used herein refers to a calculated value in accordance with the following equation after extracting a given amount (pre-extraction weight) of the multilayer structure polymer (I) in a refluxed acetone solvent, removing the processing solvent by centrifugation, drying the material insoluble in acetone and then weighing the residue (post-extraction weight).

Gel content(%)=post-extraction weight(g)/pre-extraction weight(g)×100.

A gel content as large as possible is preferable in the light of molding whitening resistance, whereas a certain amount of free polymer must be present in the light of easy moldability. Thus, a gel content is preferably 80% or less.

A weight-average particle size of the multilayer structure polymer (I) is preferably within the range of 0.03 µm to 0.3 µm. In the light of mechanical properties of an acrylic resin film material (A) obtained, it is more preferably 0.07 µm or more, most preferably 0.09 µm or more. In the light of molding whitening resistance and transparency, it is more preferably 0.15 µm or less, most preferably 0.13 µm or less. A weight-average particle size can be determined by dynamic light scattering with a light scattering photometer DLS-700 (trade name; Otsuka Electronics Co., Ltd.).

The multilayer structure polymer (I) can be most suitably prepared by, but not limited to, sequential multistage polymerization using emulsion polymerization. It can be, however, prepared by, for example, emulsion-suspension polymerization where a reaction is converted into a suspension polymerization system during polymerizing for the outermost layer polymer (I-C) after emulsion polymerization.

When preparing the multilayer structure polymer (I) by emulsion polymerization, the polymerization can be preferably conducted by, but not limited to, placing in a reactor an emulsion prepared by preliminarily mixing the monomer component for the innermost layer polymer (I-A) in the multilayer structure polymer (I), water and a surfactant, polymerizing the reaction mixture, and then sequentially adding the monomer or the monomer component for the intermediate layer polymer (I-B), and the monomer or the monomer component for the outermost layer polymer (I-C) into the reactor.

Placing the emulsion prepared by preliminarily mixing the monomer component for the innermost layer polymer (I-A) in the multilayer structure polymer (I), water and a surfactant, and then polymerizing the reaction mixture can easily provide the multilayer structure polymer (I) for which, particularly when being dispersed in acetone, the number of particles with a diameter of 55 µm or more in the dispersion is 0 to 50 per 100 g of the multilayer structure polymer (I). An acrylic resin film material (A) prepared using the multilayer structure polymer (I) thus obtained has a characteristic of less fish eyes in the film. It is particularly preferable because it exhibits higher level of printability with less printing defects even when conducting contact gravure printing such as pale color woodgrain pattern under a lower printing pressure and metallic and jet-black printing where printing defects particularly tend to occur.

The surfactant used for preparing an emulsion may be selected from anionic, cationic and nonionic surfactants, particularly preferably anionic surfactants. Examples of the anionic surfactant include carboxylates such as rosin soap, potassium oleate, sodium stearate, sodium myristate and sodium N-lauroylsarcosine and dipotassium alkenyl succinate; sulfates such as sodium lauryl sulfate; sulfonates such as sodium dioctyl sulfosuccinate, sodium dodecylbenzene sulfonate and sodium alkyl diphenyl ether disulfonate; phosphate salts such as sodium polyoxyethylene alkyl phenyl ether phosphate; and phosphate salts such as sodium polyoxyethylene alkyl ether phosphate, preferably phosphate salts such as sodium polyoxyethylene alkyl ether phosphate. Preferable specific examples of the surfactant include NC-718 from Sanyo Chemical Industries, Ltd.; Phosphanol LS-529, Phosphanol RS-610NA, Phosphanol RS-620NA, Phosphanol RS-630NA, Phosphanol RS-640NA, Phosphanol RS-650NA, Phosphanol RS-660NA from Toho Chemical Industry Co., Ltd.; and Latemul P-0404, Latemul P-0405, Latemul P-0406, Latemul P-0407 from Kao Corporation, which are all trade names.

An emulsion can be prepared, for example, by charging monomer component in water and then adding a surfactant; charging a surfactant and then adding monomer component; charging a surfactant in monomer component and then adding water. Among others, a multilayer structure polymer (I) is preferably prepared by charging monomer component in water and then adding a surfactant, and charging a surfactant in water and then adding a monomer component.

Examples of a mixer for preparing an emulsion by mixing the monomer component for the innermost layer polymer (I-A), water and a surfactant include a stirrer equipped with a stirring blade, a variety of forced emulsifying apparatuses such as a homogenier and a homomixer and a film emulsifying apparatus.

A prepared emulsion may have any dispersion structure of a W/O type where water droplets are dispersed in an oil of a monomer component, and of an O/W type where oil droplets of a monomer component are dispersed in water. Particularly preferable is an O/W type where oil droplets of a monomer component are dispersed in water and a diameter of oil droplets in a dispersion phase is 100 μm or less.

A polymerization initiators used for forming the innermost layer polymer (I-A), intermediate layer polymer (I-B) and outermost layer polymer (I-C) constituting the multilayer structure polymer (I) may be selected from well-known initiators, which can be added to either an aqueous or monomer layer, or both of these. Particularly preferable initiators include peroxides, azo initiators and redox initiators as a combination of an oxidizing and a reducing agents. It is preferably a redox initiator, particularly preferably a sulfoxylate initiator as a combination of ferrous sulfate, disodium ethylenediamine tetraacetate, Rongalit, andhydroperoxide.

A polymerization initiator can be added to either an aqueous or monomer layer, or both of these.

The amount of the polymerization initiator may be appropriately determined, depending on, for example, polymerization conditions.

Preferably, the multilayer structure polymer (I) can be prepared particularly by warming an aqueous solution of ferrous sulfate, disodium ethylenediamine tetraacetate and Rongalit in a reactor to a polymerization temperature, blending the monomer component for the innermost layer polymer (I-A) containing a polymerization initiator such as a peroxide with water and a surfactant to prepare an emulsion, transferring the emulsion in a reactor and then conducting polymerization, adding the monomer component of the intermediate layer polymer (I-B) containing a polymerization initiator such as a peroxide to the reactor and then conducting polymerization, and subsequently adding the monomer component for the outermost layer polymer (I-C) containing a polymerization initiator such as a peroxide to the reactor and then conducting polymerization.

A polymerization temperature may vary, depending on the type and the amount of a polymerization initiator used, but is preferably 40° C. or higher, more preferably 60° C. or higher while being preferably 120° C. or lower, more preferably 95° C. or lower.

A polymer latex containing a preferable multilayer structure polymer (I) thus prepared can be, as necessary, treated with a filtering device equipped with a filter material. The filtering is for removing scale formed during polymerization from the latex and removing impurities present in polymerization materials or from external sources during polymerization, and thus is more preferable for obtaining the multilayer structure polymer (I).

Examples of the filtering device equipped with a filter material thus used include GAF filter system from ISP Filters PTE Limited utilizing a bag type mesh filter; a centrifugation type filtering device where a cylindrical filter material is placed on the inner surface of a cylindrical filtering chamber and a stirring blade is placed in the filter material; and a vibration type filtering device where a filter material moves in rotation and piston movement horizontally and vertically, respectively, to the filter material plane.

The multilayer structure polymer (I) can be obtained by recovering it from the polymer latex thus prepared. The multilayer structure polymer (I) from the polymer latex can be recovered by, but not limited to, salting out or acid-precipitating coagulation, spray drying and freeze drying, as a powder.

Among others, when salting-out is conducted using a metal salt, it is preferable that the amount of a residual metal in the finally-obtained multilayer structure polymer (I) is 800 ppm or less. In particular, when using a highly hydrophilic metal salt such as magnesium and sodium salts as a salting-out agent, the amount of a residual metal is reduced as much as possible. Otherwise, there may be caused a practically significant problem that whitening occurs when immersing an acrylic resin film material (A) from the multilayer structure polymer (I) into a boiling water. Calcium or sulfate coagulation tends to give relatively good results, but in any case, it is necessary to reduce the amount of a residual metal to 800 ppm or less, preferably as low as possible, for achieving good water whitening resistance.

Although the multilayer structure polymer (I) may be used alone in this invention, a resin composition (III) as a combination with a thermoplastic polymer (II) as described below may be used.

Thermoplastic Polymer (II)

The thermoplastic polymer (II) preferably contains an alkyl methacrylate (II-A) unit as a main component. Specifically, it is preferably a polymer obtained by polymerizing a monomer component including the alkyl methacrylate (II-A) having 1 to 4 carbon atoms in 50 to 100 wt % and, as necessary, at least one of the alkyl acrylate (II-B) in 0 to 50 wt % and the monomer (II-C) other than (II-A) or (II-B) having a copolymerizable double bond in 0 to 50 wt %, in which a reduction viscosity is 0.15 L/g as determined for a solution of 0.1 g of a polymer in 100 mL of chloroform at 25° C. By combining such a thermoplastic polymer (II), surface hardness and heat resistance (in the case of a construction application, matte-reduction resistance) can be improved. Therefore, a glass-transition temperature is preferably 80° C. or higher, more preferably 90° C. or higher.

The alkyl methacrylate (II-A) contained in the monomer component for the thermoplastic polymer (II) may be, for example, methyl methacrylate, ethyl methacrylate, propyl methacrylate and n-butyl methacrylate, preferably methyl methacrylate, which can be used alone or in combination of two or more.

The alkyl acrylate (II-B) contained, as necessary, in the monomer component for the thermoplastic polymer (II) may be, for example, methyl acrylate, ethyl acrylate, propyl acrylate and n-butyl acrylate, preferably methyl acrylate, which can be used alone or in combination of two or more.

The monomer (II-C) other than (II-A) or (II-B) having a copolymerizable double bond contained, as necessary, in the monomer component for the thermoplastic polymer (II) may be selected from known monomers, including aromatic vinyl compounds such as styrene, cyanovinyl monomers such as acrylonitrile, unsaturated dicarboxylic anhydrides such as maleic anhydride and itaconic anhydride; N-phenylmaleimide; and N-cyclohexylmaleimide, which can be used alone or in combination of two or more.

A content of the alkyl methacrylate (II-A) in the monomer component for the thermoplastic polymer (II) is preferably 50 to 100 wt %, more preferably 80 wt % or more while more preferably being 99.9 wt % or less, in the light of surface hardness and heat resistance (in the case of a construction application, matte-reduction resistance) of an acrylic resin film material (A) obtained.

A content of the alkyl acrylate (II-B) in the monomer component for the thermoplastic polymer (II) is 0 to 50 wt %, preferably 0.1 wt % or more while preferably being 20 wt % or less, in the light of film-formability and adequate toughness for insert- and in-mold molding of an acrylic resin film material (A) obtained.

A content of the monomer (II-C) other than (II-A) or (II-B) having a copolymerizable double bond in the monomer component for the thermoplastic polymer (II) is preferably 0 to 50 wt %.

A reduction viscosity of the thermoplastic polymer (II) as determined for a solution of 0.1 g of the polymer in 100 mL of chloroform is preferably 0.15 L/g or less, more preferably 0.1 L/g in the light of insert moldability, in-mold moldability and film-formability of an acrylic resin film material (A) obtained, while being preferably 0.01 L/g or more, more preferably 0.03 L/g or more in the light of film-formability.

The thermoplastic polymer (II) can be prepared by polymerization, including, but not limited to, usual suspension polymerization, emulsion polymerization and block polymerization.

Resin Composition (III)

The resin composition (III) suitably used in an acrylic resin film material (A) of this invention comprises the multilayer structure polymer (I) and the thermoplastic polymer (II). It preferably consists of the multilayer structure polymer (I) in 1 to 99 wt % and the thermoplastic polymer (II) in 1 to 99 wt %. In the light of molding whitening resistance of an acrylic resin film material (A) obtained, a content of the multilayer structure polymer (I) in the resin composition (III) is more preferably 50 wt % or more, most preferably 70 wt % or more. A content of the thermoplastic polymer (II) in the resin composition (III) is more preferably 50 wt % or less, most preferably 30 wt % or less.

A gel content in the resin composition (III) is preferably 10 to 80%, more preferably 20% or more, most preferably 40% or more being more preferably 75% or less, most preferably 70% or less in the light of molding whitening resistance and film-formability.

Resin Composition (IV)

In this invention, an acrylic resin film material (A) exhibiting matting performance can be obtained from the above multilayer structure polymer (I) or resin composition (III), and preferably from the resin composition (IV) containing a matting agent in 0.1 to 40 parts by weight to 100 parts of the multilayer structure polymer (I) or resin composition (III). The matting agent can be used to further reduce unmatting of an acrylic resin film material (A) due to heat during secondary molding.

The matting agent may be selected from, whether organic or inorganic, various known matting agents, which can be used alone or in combination of two or more. The matting agent is preferably, for example, spherical particles made of a crosslinked resin containing PMMA as a main component and having a weight-average particle size of 2 to 15 μm in the light of transparency. Furthermore, in the light of transparency, matting performance, film-formability and moldability, the hydroxy-containing polymer (V) and/or the hydroxy-containing polymer (VI) is preferable.

When using the hydroxy-containing polymer (V) and/or the hydroxy-containing polymer (VI) as a matting agent, properties of an acrylic resin film material (A) such as ductility are not substantially deteriorated. Thus, an acrylic resin film material (A) prepared using the hydroxy-containing polymer (V) and/or the hydroxy-containing polymer (VI) as a matting agent can be more suitably used without problems such as film breakage even in, for example, in-mold molding requiring preliminary vacuum molding of the film.

Hydroxy-Containing Polymer (V)

The hydroxy-containing polymer (V) can be prepared by copolymerizing 100 part by weight of a monomer component consisting of a hydroxyalkyl (meth)acrylate having an alkyl group with 1 to 8 carbon atoms in 1 to 80 parts by weight, an alkyl methacrylate having an alkyl group with 1 to 13 carbon atoms in 10 to 99 parts by weight, and an alkyl acrylate having an alkyl group with 1 to 8 carbon atoms in 0 to 79 parts by weight.

The hydroxyalkyl (meth)acrylate having alkyl with 1 to 8 carbon atoms may be, for example, 2-hydroxyethyl methacrylate, 2-hydroxypropyl methacrylate, 2,3-dihydroxypropyl methacrylate, 2-hydroxyethyl acrylate and 4-hydroxybutyl acrylate, which can be used alone or in combination of two or more. The hydroxyalkyl (meth)acrylate having an alkyl with 1 to 8 carbon atoms is particularly preferably 2-hydroxyethyl methacrylate.

A content of the hydroxyalkyl (meth)acrylate having alkyl with 1 to 8 carbon atoms in the monomer component for the hydroxy-containing polymer (V) is within the range of 1 to 80 wt %. A content of the hydroxyalkyl (meth)acrylate having alkyl with 1 to 8 carbon atoms can be 1 wt % or more to further improve matting effect. A content of the hydroxyalkyl (meth) acrylate having alkyl with 1 to 8 carbon atoms can be 80 wt % or less to further improve dispersibility of the particles, resulting in further improved film-formability. A content of the hydroxyalkyl (meth)acrylate having alkyl with 1 to 8 carbon atoms in the monomer component for the hydroxy-containing polymer (V) is preferably 5 wt % or more, more preferably 20 wt % or more in the light of matting performance, while being preferably 50 wt % or less in the light of film-formability.

In vehicle interior applications, an interior member is generally required to be chemical resistant because aromatic substances and hair dressings may become attached to interior parts. In the light of adequate resistance to these agents of the acrylic resin film material (A), a content of the hydroxyalkyl (meth)acrylate having alkyl with 1 to 8 carbon atoms in the monomer component for the hydroxy-containing polymer (V) is preferably 5 wt % or more, more preferably 25 wt % or less. In the light of achieving both matting performance and chemical resistance, a content of the hydroxyalkyl (meth) acrylate having alkyl with 1 to 8 carbon atoms in the monomer component for the hydroxy-containing polymer (V) is preferably 10 wt % or more while being preferably 20 wt % or less.

The alkyl methacrylate having alkyl with 1 to 13 carbon atoms may be, for example, lower-alkyl methacrylates such as methyl methacrylate, ethyl methacrylate and butyl methacrylate, which can be used alone or in combination of two or more.

A content of the alkyl methacrylate having alkyl with 1 to 13 carbon atoms in the monomer component for the hydroxy-containing polymer (V) is within the range of 10 to 99 wt %. A content of the alkyl methacrylate having alkyl with 1 to 13 carbon atoms in the monomer component for the hydroxy-containing polymer (V) is preferably 30 wt % or more, while a content of the alkyl methacrylate having alkyl with 1 to 13 carbon atoms in the monomer component for the hydroxy-containing polymer (V) being preferably 90 wt % or less.

The alkyl acrylate having alkyl with 1 to 8 carbon atoms include lower-alkyl arylates such as methyl acrylate, ethyl acrylate, butyl acrylate and 2-ethylhexyl acrylate, which can be used alone or in combination of two or more.

A content of the alkyl acrylate having alkyl with 1 to 8 carbon atoms in the monomer component for the hydroxy-containing polymer (V) is within the range of 0 to 79 wt %. A content of the alkyl acrylate having alkyl with 1 to 8 carbon atoms in the monomer component for the hydroxy-containing polymer (V) is preferably 0.5 wt % or more, more preferably 5 wt % or more, while a content of the alkyl acrylate having alkyl with 1 to 8 carbon atoms in the monomer component for the hydroxy-containing polymer (V) being preferably 40 wt % or less, more preferably 25 wt % or less.

A glass-transition temperature of the hydroxy-containing polymer (V) is preferably 80° C. or higher, more preferably 90° C. or higher in the light of chemical resistance. Here, a content of the alkyl acrylate having alkyl with 1 to 8 carbon atoms in the monomer component for the hydroxy-containing polymer (V) is within the range of more than 0 wt % and 5 wt % or less, more preferably more than 0 wt % and 2 wt % or less.

An intrinsic viscosity of the hydroxy-containing polymer (V) is preferably within the range of 0.05 to 0.3 L/g in the light of effective matting and an appearance. An intrinsic viscosity of the hydroxy-containing polymer (V) is more preferably 0.06 L/g or more, while being more preferably 0.15 L/g or less.

For adjusting a molecular weight within the above range, it is preferable to use a polymerization adjusting agent such as mercaptans, including n-octyl mercaptan, n-dodecyl mercaptan and t-dodecylmercaptan, but without being limited to these, various well-known mercaptans may be used.

Hydroxy-Containing Polymer (VI)

The hydroxy-containing polymer (VI) can be prepared by copolymerizing 100 part by weight of a monomer component consisting of a hydroxyalkyl (meth)acrylate having an alkyl group with 1 to 8 carbon atoms in 5 to 80 parts by weight, an alkyl methacrylate having an alkyl group with 1 to 13 carbon atoms in 10 to 94 parts by weight, and an aromatic vinyl monomer in 1 to 80 parts by weight.

The hydroxyalkyl (meth)acrylate having alkyl with 1 to 8 carbon atoms is as described for the hydroxy-containing polymer (V) and preferable examples are also as described therefor and they can be used alone or in combination of two or more.

A content of the hydroxyalkyl (meth)acrylate having alkyl with 1 to 8 carbon atoms in the monomer component for the hydroxy-containing polymer (VI) is within the range of 5 to 80 wt %. A content of the hydroxyalkyl (meth)acrylate having alkyl with 1 to 8 carbon atoms can be 1 wt % or more to further improve matting effect. A content of the hydroxyalkyl (meth)acrylate having alkyl with 1 to 8 carbon atoms can be 80 wt % or less to further improve dispersibility of the particles, resulting in further improved film-formability. A content of the hydroxyalkyl (meth)acrylate having alkyl with 1 to 8 carbon atoms in the monomer component for the hydroxy-containing polymer (VI) is preferably 5 wt % or more, more preferably 10 wt % or more in the light of matting performance, while a content of the hydroxyalkyl (meth)acrylate having alkyl with 1 to 8 carbon atoms in the monomer component for the hydroxy-containing polymer (VI) being preferably 50 wt % or less, more preferably 20 wt % or less in the light of film-formability.

The alkyl methacrylate having alkyl with 1 to 13 carbon atoms is as described for the hydroxy-containing polymer (V) and preferable examples are also as described therefor and they can be used alone or in combination of two or more.

A content of the alkyl methacrylate having alkyl with 1 to 13 carbon atoms in the monomer component for the hydroxy-containing polymer (VI) is within the range of 10 to 94 wt %.

A content of the alkyl methacrylate having alkyl with 1 to 13 carbon atoms in the monomer component for the hydroxy-containing polymer (VI) is preferably 50 wt % or more, while a content of the alkyl methacrylate having alkyl with 1 to 13 carbon atoms in the monomer component for the hydroxy-containing polymer (VI) being preferably 90 wt % or less.

The aromatic vinyl monomer may be selected from those well-known in the art, including styrene and α-styrene, which can be used alone or in combination of two or more. Among others, the aromatic vinyl monomer is particularly preferably styrene. Using the aromatic vinyl monomer, chemical resistance of a film material can be further improved.

A content of the aromatic vinyl monomer in the monomer component for the hydroxy-containing polymer (VI) is within the range of 1 to 80 wt %. A content of the aromatic vinyl monomer in the monomer component for the hydroxy-containing polymer (VI) is preferably 5 wt % or more while a content of the aromatic vinyl monomer in the monomer component for the hydroxy-containing polymer (VI) being preferably 40 wt % or less, more preferably 20 wt % or less.

A glass-transition temperature of the hydroxy-containing polymer (VI) is preferably 80° C. or higher, more preferably 90° C. or higher in the light of chemical resistance.

An intrinsic viscosity of the hydroxy-containing polymer (VI) is preferably within the range of 0.05 to 0.3 L/g in the light of effective matting and an appearance. An intrinsic viscosity of the hydroxy-containing polymer (VI) is more preferably 0.06 L/g or more, while being more preferably 0.15 L/g or less.

For adjusting a molecular weight within the above range, it is preferable to use a polymerization adjusting agent such as mercaptans, including n-octylmercaptan, n-dodecylmercaptan and t-dodecylmercaptan, but without being limited to these, various well-known mercaptans may be used.

The hydroxy-containing polymer (V) and the hydroxy-containing polymer (VI) can be preferably prepared by, but not limited to, suspension polymerization, emulsion polymerization or the like.

An initiator for suspension polymerization may be selected from various well-known initiators, including organic peroxides and azo compounds, which can be used alone or in combination of two or more.

The amount of the initiator may be appropriately determined, depending on the polymerization conditions.

A suspension stabilizer may be selected from various well-known suspension stabilizers, including organic colloidal polymers, inorganic colloidal polymers, inorganic particles and any combination of a surfactant with them, which can be used alone or in combination of two or more.

The amount of the suspension stabilizer may be appropriately determined, depending on the polymerization conditions.

Suspension polymerization is generally conducted by suspending monomers and a polymerization initiator in an aqueous medium in the presence of a suspension stabilizer. Alternatively, suspension polymerization can be conducted using a solution of a polymer soluble in a monomer in the monomer.

The resin composition (IV) preferably contains a matting agent such as the hydroxy-containing polymer (V) and the hydroxy-containing polymer (VI) described above in 0.1 to 40 parts by weight to 100 parts by weight of the multilayer structure polymer (I) or the resin composition (III).

A content of the matting agent in the resin composition (IV) can be 0.1 parts by weight or more to 100 parts by weight of the multilayer structure polymer (I) or the resin composition (III), to achieve excellent matting effect. A content of the matting agent in the resin composition (IV) is more preferably 2 parts by weight or more, most preferably 5 parts by weight to 100 parts by weight of the multilayer structure polymer (I) or the resin composition (III) in the light of achieving further improved matting performance, while being preferably 40 parts by weight or less, more preferably 20 parts by weight or less, most preferably 15 parts by weight or less for achieving good film-formability.

A gel content of the resin composition (IV) of this invention is preferably 10 to 80 wt % in the light of molding whitening resistance and film-formability. It is more preferably 20% or more, most preferably 40% or more while being more preferably 75% or less, most preferably 70% or less.

An acrylic resin film material (A) of this invention which meets the requirement for molding whitening resistance, surface hardness, heat resistance and transparency or matting performance, can be prepared from the multilayer structure polymer (I), the resin composition (III) consisting of the multilayer structure polymer (I) and the thermoplastic polymer (II) containing an alkyl methacrylate as main component, or the resin composition (IV) containing a matting agent in 0.1 to 40 parts by weight to 100 parts by weight of the multilayer structure polymer (I) or the resin composition (III).

In this invention, in addition to the above thermoplastic polymer (II), a thermoplastic polymer (VII) having a reduction viscosity of more than 0.15 L/g as determined for a solution of 0.1 g of the polymer in 100 mL of chloroform at 25° C. A specific example of the thermoplastic polymer (VII) is that prepared by polymerizing methyl methacrylate in 50 to 100 wt % and another monomer having a double bond copolymerizable therewith in 0 to 50 wt %. Such monomers having a double bond copolymerizable with methyl methacrylate therewith can be used alone or in combination of two or more. The thermoplastic polymer (VII) can improve film-formability and further matting performance when using the hydroxy-containing polymer (V) or (VI).

The thermoplastic polymer (VII) is preferably used in the amount of more than 0 part by weight and 20 parts by weight or less to 100 parts by weight of the multilayer structure polymer (I), the resin composition (III) or the resin composition (IV). The amount is preferably within the range of 1 to 10 parts by weight in the light of film film-formability.

An acrylic resin film material (A) of this invention can contain, as necessary, common additives such as stabilizers, lubricants, processing aids, plasticizers, anti-impact agents, foaming agents, fillers, antibacterial agents, fungicides, mold releases, antistatic agents, coloring agents, ultraviolet absorbers and photostabilizers.

In the light of protection of a base, it is preferable to add an ultraviolet absorber for endowing it with weather resistance. The ultraviolet absorber may be selected from those known in the art and may be of a copolymer type. The ultraviolet absorber used has a molecular weight of preferably 300 or more, more preferably 400 or more. An ultraviolet absorber with a molecular weight of 300 or more can be used to prevent a mold from being contaminated due to vaporization of the ultraviolet absorber during vacuum- or press molding in an injection mold. Generally, an ultraviolet absorber with a higher molecular weight can more significantly minimize long-term bleed-out after processing into a film and allow UV-absorbing performance to be maintained for a longer time than that with a lower molecular weight. Furthermore, an ultraviolet absorber with a molecular weight of 300 or more can reduce vaporization of the ultraviolet absorber in the period from extrusion of the acrylic resin film material (A) from a T-die to cooling by a cooling roll. Therefore, there may remain an adequate amount of the ultraviolet absorber to exhibit good performance. It can eliminate the problem that the vaporized ultraviolet absorber is recrystallized and grown over time on a chain suspending the T-die over the T-die and on an exhaust hood, and finally dropped on a film, leading to defects in its appearance.

The type of the ultraviolet absorber is not particularly restricted, but preferably may be benzotriazoles with a molecular weight of 400 or more, or triazines with a molecular weight of 400 or more. Examples of the former include Tinuvin 234 (trade name) from Ciba Specialty Chemicals and ADEKA STAB LA-31 (trade name) from Asahi Denka Co., Ltd. Examples of the latter include Tinuvin 1577 (trade name) from Ciba Specialty Chemicals.

When using an acrylic resin film material (A) of this invention in vehicle applications, it is required to have the properties of hair dressing resistance and aromatic substance resistance in automobile specifications of various automobile manufacturers. In the light of these properties, an ultraviolet absorber used preferably has a melting point of 180° C. or lower. Such an ultraviolet absorber is particularly preferably Tinuvin 234, Tinuvin 329 and Tinuvin 1577 (trade names) from Ciba Specialty Chemicals which are little crystallized during applying a hair dressing or an aromatic substance on an acrylic resin film material (A). Such an ultraviolet absorber can be used without variation in an appearance when a hair dressing or an aromatic substance adheres to it, and thus it is extremely useful in industrial applications.

The amount of the ultraviolet absorber is preferably within the range of 0.1 to 10 parts by weight. In the light of improving weather resistance, the amount is more preferably 0.5 parts by weight, most preferably 1 part by weight or more. In the light of roll contamination during film forming, chemical resistance and transparency, the amount is preferably 5 parts by weight or less, most preferably 3 parts by weight or less.

The photostabilizer may be selected from those well-known in the art, but for improving not only light stability but also chemical resistance of the acrylic resin film material (A), a radical scavenger such as a hindered amine photostabilizer is preferably used. For example, in the case of adhesion of a hair dressing, appearance variation can be significantly improved, resulting in higher industrial utility.

The amount of the hindered amine photostabilizer is preferably within the range of 0.01 to 5 parts by weight. In the light of improving light stability and chemical resistance, the amount is more preferably 0.1 parts by weight, most preferably 0.2 parts by weight or more. In the light of roll contamination during film forming, the amount is preferably 2 parts by weight or less, most preferably 1 part by weight or less.

These particular ultraviolet absorber and the hindered amine photostabilizer can be combined to provide an acrylic resin film material (A) particularly suitable for vehicle applications.

In the resin composition (IV), it is particularly preferable to use a phosphorous compound in 0.01 to 3 parts by weight to 100 parts by weight of the resin composition (IV) when using the hydroxy-containing polymer (V) and/or the hydroxy-containing polymer (VI) as a matting agent. The amount of the phosphorous compound in 0.01 parts by weight or more to 100 parts by weight of the resin composition (IV) can further improve matting performance. The amount of the phosphorous compound in 3 parts by weight or less to 100 parts by weight of the resin composition (IV) is preferable in the light of roll contamination during film forming and economical efficiency. The amount of the phosphorous compound is more preferably 0.1 parts by weight or more to 100 parts by weight of the resin composition (IV), while the amount of the phosphorous compound being more preferably 1 part by weight or less to 100 parts by weight of the resin composition (IV).

Examples of the phosphorous compound include phosphite compounds such as trialkylphosphites, alkylarylphosphites, arylphosphites, nonylphenylphosphite and alkylnonylphenylphosphite; phosphate compounds such as trialkylphosphates, tripolyoxyethylene alkyl ether phosphates, dialkyl phosphates and their metal salts, dipolyoxyethylene alkyl ether phosphates and their metal salts, alkyl phosphate and their metal salts, and polyoxyethylene alkyl ether phosphates and their metal salts; and phosphonate compounds such as dialkylalkyl phosphonates, alkylalkyl phosphonates and their metal salts. A phosphorous compound is preferably a phosphite compound among others in the light of effective matting. Among the phosphite compounds, those without a bulky substituent around a phosphite group is more preferable in the light of effective matting. In the light of hydrolysis resistance (roll contamination during film forming), a trialkylphosphite is preferable.

Such additives can be added by feeding them together with a component comprising the multilayer structure polymer (I), the resin composition (III) or the resin composition (IV) in an extruder for forming an acrylic resin film material (A), or by kneading a mixture preliminarily prepared by adding the additives to a component comprising the multilayer structure polymer (I), the resin composition (III) or the resin composition (IV) in any of various kneaders. Examples of a kneader used in the latter procedure include common single screw extruders, twin screw extruders, banbury mixers and roll kneaders.

Acrylic Resin Film Material (A)

An acrylic resin film material (A) of this invention which can be used may be one exhibiting a difference of 30% or less between haze values as determined in accordance with the testing method of JIS K7136 (haze measurement method) after and before a tensile test where a test piece with a width of 20 mm is pulled under the conditions of an initial inter-chuck distance of 25 mm, a rate of 50 mm/min and a temperature of 23° C. until an end-point inter-chuck distance becomes 33 mm. The difference is preferably 10% or less, more preferably 5% or less. The above difference corresponds to molding whitening generated in the process for insert- or in-mold molding an acrylic resin film material (A) as well as an acrylic resin laminate film, a photocurable acrylic resin film or sheet and a laminate film or sheet therewith. The above difference also corresponds to molding whitening generated in the processing such as V-cutting or wrapping in a cold region when being used in construction applications.

When using an acrylic resin film material (A) with the above difference of 30% or less, molding whitening generated in the process of insert- or in-mold molding can be made less significant, to provide a laminate molded item without losing a printing pattern or deterioration in a design. When a laminate film or sheet comprising the acrylic resin film material (A) is used in construction applications, molding whitening generated in the processing such as V-cutting and wrapping in a cold region can be made less significant, to provide a molded item without losing a printing pattern or deterioration in a design.

It is preferable that a difference between haze values as determined in accordance with the testing method of JIS K7136 (haze measurement method) after and before a tensile test where a test piece with a width of 20 mm is pulled under the conditions of an initial inter-chuck distance of 25 mm, a rate of 300 mm/min and a temperature of 15° C. until an end-point inter-chuck distance becomes 33 mm is 10% or less. When the difference under this condition is 10% or less, molding whitening can be made less significant in a jet-black printing pattern in which whitening is further emphasized in comparison with a common woodgrain or metallic pattern, resulting in extremely higher industrial utility. The difference determined by the above test method under the conditions is more preferably 5% or less, most preferably 1% or less.

An acrylic resin film material (A) according to this invention has a pencil hardness of 2 B or higher as determined in accordance with JIS K5400. It is more preferably HB or higher, most preferably F or higher.

An acrylic resin film material (A) with a pencil hardness of 2 B or higher can be used to prevent damages to the acrylic resin film material (A) as well as an acrylic resin laminate film, a photocurable acrylic resin film or sheet and a laminate film or sheet therewith during the process of insert- or in-mold molding, and to improve excoriation resistance of the molded item.

When being used in vehicle applications, an acrylic resin film material (A) of this invention preferably has a pencil hardness of HB or higher. A laminate molded item produced using an acrylic resin film material (A) as well as an acrylic resin laminate film, a photocurable acrylic resin film or sheet and a laminate film or sheet therewith can be suitably used in a variety of vehicle members such as a door waist gurnish, a front control panel, a power winder switching panel and an air-bag cover. It is industrially very useful in the light of extending applications.

When a pencil hardness is F or higher, damages may become insignificant even when scratching with a rough-surface cloth such as a gauze, and excoriation resistance practically comparable to a molded item from an acrylic resin film material (A) with a pencil hardness of 2H can be achieved. Thus, it is extremely useful in industrial applications.

An acrylic resin film material (A) of this invention having a pencil hardness of 2 B or higher can be used to prepare an acrylic resin laminate film. Although such an acrylic resin laminate film of this invention will be described later, its surface hardness is resistant to deterioration, not only when the acrylic resin film material (A) constitutes the uppermost layer in the acrylic resin laminate film, but also when an acrylic resin layer (A'-a) with a pencil hardness of 2H or more is in the uppermost layer in the acrylic resin laminate film (i.e., the upper layer in the acrylic resin film material (A)). The acrylic resin laminate film can be used to prevent damages during insert- or in-mold molding, and thus to give a molded item with good excoriation resistance. HB or higher is preferable, and F or higher is more preferable.

An acrylic resin film material (A) of this invention having a pencil hardness of 2 B or higher can be used to prepare a photocurable acrylic resin film or sheet. Although such a photocurable acrylic resin film or sheet of this invention will be described later, the photocurable acrylic resin film or sheet is resistant to damages during insert- or in-mold molding. Furthermore, since a pencil hardness of the photocurable acrylic resin film or sheet after photocuring is also significantly influenced by a pencil hardness of the acrylic resin film material (A) as a base, the acrylic resin film material (A) must have a hardness of 2 B or higher. It is preferably HB or higher, more preferably F or higher.

An acrylic resin film material (A) of this invention having a pencil hardness of 2 B or higher can be used to prepare, for example, a laminate film or sheet for construction. Although such a construction laminate film or sheet of this invention will be described later, the construction laminate film or sheet is resistant to damages during processing such as V-cutting and wrapping and further can provide a molded item with good excoriation resistance.

In construction applications, an acrylic resin film material (A) of this invention preferably has a pencil hardness of HB or higher. When the acrylic resin film material (A) has a pencil hardness of HB or higher, a molded item prepared using the construction laminate film or sheet comprising the acrylic resin film material (A) can be suitably used various construction members such as a sash in an opening such as a window, an entrance sliding door and an entrance door. It is very useful in industrial applications, in the light of extending applications.

When using an acrylic resin film material (A) of this invention as an alternate to clear painting, it is preferable that a haze value of the acrylic resin film material (A) as determined in accordance with JIS K7136 is 2% or less. Such an acrylic resin film material (A) is preferable because a picture layer looks clear and true without being influenced by the acrylic resin film material (A) even when forming a blackish picture layer with, for example, jet-black tone. Such an acrylic resin film material (A) shows an appearance comparable to that in clear painting. The value is more preferably 1% or less, further preferably 0.5% or less, most preferably 0.4% or less.

When an acrylic resin film material (A) of this invention is combined with a picture layer with, for example, metallic tone, it is preferable that at least one side has a 60° surface glossiness of 100% or less. The surface glossiness is more preferably 50% or less, particularly preferably 20% or less. An acrylic resin film material (A), at least one side of which has a 60° surface glossiness of 100% or less exhibits good design and matted appearance.

An acrylic resin film material (A) of this invention preferably has a heat distortion temperature (as determined in accordance with ASTM D648) of 80° C. or higher. When the heat distortion temperature is 80° C. or higher, whitening or tarnish is eliminated from the surface of the acrylic resin film material (A) after long-term exposure to an elevated temperature, resulting in its higher utility in industrial applications. When a heat distortion temperature of the acrylic resin film material (A) is 80° C. or higher in vehicle applications, a laminate molded item produced using the acrylic resin film material (A) as well as acrylic resin laminate film, a photocurable acrylic resin film or sheet and a laminate film or sheet therewith can be used in parts such as a front control panel, which in an automobile is exposed to direct light. In the light of further extending applications, a heat distortion temperature is more preferably 90° C. or higher. The heat distortion temperature is determined for a test piece for a heat distortion temperature prepared by molding a starting pellet of the acrylic resin film material (A) in an injection molding and then annealing it at 60° C. for 4 hours, and a heat distortion temperature determined is generally considered to be a heat distortion temperature of the acrylic resin film material (A).

For an acrylic resin film material (A) having at least one side with a 60° surface glossiness of 100% or less, matting performance in the surface of the acrylic resin film material (A) is little varied during long-term exposure to an elevated temperature when a heat distortion temperature is 80° C. or higher. Thus, an acrylic resin film material (A) with a heat distortion temperature of 80° C. or higher is further useful in industrial applications. When a heat distortion temperature is 90° C. or higher, the material can be suitably used in parts such as a front control panel, which in an automobile is exposed to direct light. Thus, in the light of further extending applications, a heat distortion temperature is more preferably 90° C. or higher.

When being used as a photocurable acrylic resin film or sheet, an acrylic resin film material (A) of this invention preferably has a heat distortion temperature (as determined in accordance with ASTM D648) of 80° C. or higher. When the heat distortion temperature is 80° C. or higher, a photocurable resin composition or an acrylic resin film can be resistant to extension during drying for removing a solvent after applying the photocurable resin composition to the film, to minimize deterioration in excoriation resistance or surface hardness after curing. Furthermore, since a drying temperature can be elevated, drying can be effectively conducted with a minimum drying facility. Furthermore, an elevated drying temperature can reduce the amount of a residual organic solvent in a photocurable resin (Z) layer as described later, and thus can eliminate various problems due to a residual solvent. A heat distortion temperature of the acrylic resin film is more preferably 85° C. or higher, most preferably 90° C. or higher.

When using a laminate film or sheet comprising an acrylic resin film material (A) in construction applications, the acrylic resin film material (A) preferably has a heat distortion temperature (as determined in accordance with ASTM D648) of 80° C. or higher. When the heat distortion temperature is 80° C. or higher, a laminate film or sheet can be prepared, which is resistant to gloss variation such as unmatting during processing such as gluing by wrapping on the surface of a variety of bases, or during practically using various processed members for a long period after incorporating in a building such as a house. It is, therefore, very useful in industrial applications. In construction applications, particularly practical exterior and semi-exterior applications including a door material, a window frame material, an exterior wall material, a fence, a roof, a roof deck, a balcony and a rain door where the surface of a laminate film or sheet may be exposed to a high temperature, a heat distortion temperature is preferably 90° C. or higher in the light of further extending applications.

An acrylic resin film material (A) which can be used in this invention can be prepared by any known method including melt extrusion processes such as melt flow casting, T-die casting and inflation casting as well as calendering. In an economical sense, T-die casting is preferable.

When molding an acrylic resin film material (A) by T-die casting, a film can be formed by sandwiching a plurality of rolls or belts selected from metal rolls, non-metal rolls and metal belts to improve smoothness of the surface of an acrylic resin film material (A) and to prevent printing defects during printing on the acrylic resin film material (A). Examples of such metal rolls include metal mirror touch rolls; and rolls used in a sleeve-touch manner which consist of a metal sleeve described in Japanese Patent No. 2808251 or WO 97/28950 and molding rolls. Examples of non-metal rolls include touch rolls made of, for example, silicon rubber. Examples of a metal belt include a metal endless belt. A plurality of these metal rolls, non-metal rolls and metal belts may be used in combination.

In film forming by sandwiching between a plurality of rolls or belts selected from metal rolls, non-metal rolls and metal belts as described above, it is preferable that a component containing the multilayer structure polymer (I), the resin composition (III) or the resin composition (IV) after melt extrusion (hereinafter, sometimes referred to as "acrylic resin composition") is sandwiched substantially without a bank (resin deposit) and is plane-transferred substantially without rolling to form a film. When forming a film without forming a bank (resin deposit), an acrylic resin composition is plane-transferred in the course of cooling without rolling, so that a heat shrinkage ratio of the acrylic resin film material (A) thus formed can be reduced.

When conducting melt extrusion by T-die casting, it is also preferable to filtrate a molten acrylic resin through a screen mesh with 200 mesh or more while extruding it.

When matting an acrylic resin film material (A), it is preferable that immediately after an acrylic resin composition is melt-extruded into a film shape by T-die casting, it is molded into a film by sandwiching it between a mirror roll and a rubber roll or an embossed roll. In particular, film forming by sandwiching a mirror roll and a rubber roll is more preferable because it can give a film with a relatively smaller thickness by about 50 μm in comparison with that in a film prepared by sandwiching between a mirror roll and an embossed roll.

In calendering, a film can be formed, replacing one of two mirror rolls between which a film is sandwiched, with a rubber roll or embossed roll in the last step. Alternatively, a film can be formed by one shaping an acrylic resin film material (A) into a film by a known method, heating it again to a temperature higher than its glass-transition temperature and finally sandwiching between a mirror roll and a rubber roll or embossed roll.

The mirror roll can be selected from those well-known in the art. The mirror roll is, among others, preferably a chrome-plated roll with a surface roughness of 0.5 S or less.

At a higher mirror roll temperature during film forming, followingness to a rubber roll or embossed roll can be further improved to endow a film surface contacting the rubber roll or the embossed roll with good matting performance, and also to further improve mirror transferability to the acrylic resin film material (A) from the mirror roll to improve smoothness in the surface contacting the mirror roll, resulting in tendency to further reduction of printing defects. However, if a temperature of the mirror roll is too high, the acrylic resin film material (A) may be less peelable from the mirror roll or the acrylic resin film material (A) may twist around the roll. If a temperature of the mirror roll is too low, mirror transferability from the mirror roll to the acrylic resin film material (A) may be deteriorated, leading to insufficient reduction of printing defects and a film with wrinkles. Although it depends on a glass-transition temperature of the acrylic resin, a cooling roll is preferably controlled within a temperature range of 20 to 140° C. A temperature of the cooling roll is more preferably 50° C. or higher, particularly preferably 60° C. or higher, while being more preferably 120° C. or lower, particularly preferably 100° C. or lower.

The rubber roll may be selected from those well-known in the art. Among others, the rubber roll is preferably a silicone rubber in the light of heat resistance. In the light of achieving good matting performance, it is preferably a silicone rubber containing alumina. In the acrylic resin film material (A), a preferred matted appearance varies depending on its application. Thus, a particle size and the amount of alumina added to a silicone rubber can be appropriately determined depending on its application. Specifically, for example, a silicone rubber roll comprising alumina with an average particle size of 40 μm in 50 wt % can be used.

Alternatively, in place of a rubber roll may be used an embossed roll, which can be selected from various known embossed rolls.

When conducting melt extrusion, it is also preferable to filtrate a molten acrylic resin through a screen mesh with 200 mesh or more while extruding it, in the light of reducing FEs (fish eyes) in the film.

A difference in surface glossiness in the acrylic resin film material (A) thus obtained [an absolute value of (a 60° surface glossiness in the film surface contacting the mirror roll side)–(a 60° surface glossiness in the film surface not contacting the mirror roll side)] can be controlled by selecting the film-forming conditions and the type of the non-mirror roll such as a rubber roll or embossed roll. The difference in a surface glossiness is preferably 5% or more in the light of printing defect formability and matting performance, more preferably 10% or more, particularly preferably 15% or more.

Since a mirror is transferred to the film surface contacting the mirror roll side, surface protrusion which may cause printing defects can be significantly reduced. Therefore, when printing is conducted for the surface contacting the mirror roll side, printing defects can be significantly reduced.

A 60° surface glossiness of the film surface not contacting the mirror roll side can be controlled by selecting the type of the non-mirror roll such as a rubber roll or an embossed roll. A 60° surface glossiness of the film surface not contacting the mirror roll is preferably 100% or less in the light of design and a matted appearance. A 60° surface glossiness of the film surface not contacting the mirror roll is more preferably 50% or less.

Based on comparison among films having comparable surface glossiness, a higher heat distortion temperature of an acrylic resin film material (A) achieves less significant unmatting during insert- or in-mold molding. Therefore, in the light of unmatting during insert- or in-mold molding, a higher heat distortion temperature of an acrylic resin film material (A) is preferable. In the light of peelability from a mirror roll described above, followingness to a rubber roll or embossed roll and unmatting during molding, a heat distortion temperature of an acrylic resin film material (A) is preferably within the range of 85° C. to 105° C., more preferably 90° C. or higher, while being preferably 100° C. or lower.

A thickness of an acrylic resin film material (A) of this invention is preferably 10 to 500 μm. A thickness of 500 μm or less of an acrylic resin film material (A) can provide rigidity suitable for insert- and in-mold molding, resulting in more stable film forming. A thickness of 10 μm or more of an acrylic resin film material (A) can protect a base and can endow a molded item obtained with adequate deepness. A thickness of an acrylic resin film material (A) is more preferably 30 μm or more, most preferably 50 μm or more, while being more preferably 300 μm or less, most preferably 200 μm or less.

For forming a coating film having an adequate thickness on a molded item by painting, ten and several times of recoating may be sometimes necessary, leading to a higher cost and a lower yield. On the other hand, for a laminate molded item according to this invention, an acrylic resin film material (A) itself acts as a coating film and thus can easily provide a very thick coating film, resulting in higher industrial utility.

Acrylic Resin Laminate Film

An acrylic resin laminate film of this invention comprises an acrylic resin film material (A) of this invention and further comprises another acrylic resin film material (A') or fluororesin film material (A").

When in an acrylic resin laminate film of this invention an acrylic resin film material (A) is used as a base and an acrylic resin film material (A') is used as a surface layer, it is preferable to use an acrylic resin film material (A'-a) having higher surface hardness than the acrylic resin film material (A). Specifically, it is preferable to use an acrylic resin film material (A'-a) with a pencil hardness (as determined in accordance with JIS K5400) of 2H or higher. The acrylic resin film material (A) of this invention used as a base and the acrylic resin film material (A'-a) having a pencil hardness of 2H or higher used a surface layer can advantageously provide an acrylic resin laminate film exhibiting all of molding whitening resistance, surface hardness (excoriation resistance) and heat resistance in comparison with a known acrylic resin laminate film.

The acrylic resin film material (A'-a) can be formed by a thermoplastic resin containing an alkyl methacrylate as a main component, and may be comprised of a resin composition comprising the thermoplastic resin and a rubber-containing polymer, but not limited to them. When insert- or in-mold molding an acrylic resin laminate film, stress relaxation in the acrylic resin film material (A'-a) is inadequate. Thus, in the light of avoiding generation of defects such as cracks, rupture and peeling in a laminating part, it is preferably formed from a resin composition prepared by adding a small amount of a rubber-containing polymer to a thermoplastic resin comprising an alkyl methacrylate as a main component.

When a pencil hardness is 2H or higher, it is particularly preferable to use an acrylic resin film material (A'-a) having a different content of the multilayer structure polymer (I) from that in the acrylic resin film material (A).

Other preferable examples of a resin composition may be those containing (I) and (ii) described below.

(i) Thermoplastic resin comprising an alkyl methacrylate as a main component:
a thermoplastic resin consisting of an alkyl methacrylate in 50 to 100 wt %, an alkyl acrylate in 0 to 50 wt % and another vinyl monomer copolymerizable therewith in 0 to 49 wt %.

(ii) Rubber-containing polymer:
(ii-a) a rubber-containing polymer with an average particle size of less than 0.2 μm having a two-layer structure which consists of a hard polymer prepared by graft-polymerization of an alkyl methacrylate monomer in the presence of an alkyl acrylate elastic polymer.

(ii-b) a rubber-containing polymer having an average particle size of 0.2 to 0.4 μm having a three-layer structure consisting of an innermost layer polymer prepared by polymerizing an alkyl methacrylate and an alkyl acrylate monomers having a Tg of 0° C. or higher and less than 25° C.; an intermediate layer elastic polymer prepared by polymerizing an alkyl acrylate monomer having a Tg of less than 0° C.; and an outermost layer polymer prepared from an alkyl methacrylate monomer.

More specifically, the following resin compositions can be listed.

(a) A resin composition for an acrylic resin film described in Japanese Patent Application Laid-open No. 2002-80678:
a resin composition comprising a thermoplastic resin (i) in 20 to 94.5 parts by weight and a rubber-containing polymer (ii-a) in 5.5 to 80 parts by weight, wherein the amount of an alkyl acrylate elastic polymer in the rubber-containing polymer (ii-a) is 5 to 72 parts by weight [the total amount of Components (i) and (ii) is 100 parts by weight].

(b) A resin composition for an acrylic resin film described in Japanese Patent Application Laid-open No. 2002-80679:
a resin composition comprising a thermoplastic resin (i) in 75 to 94.5 parts by weight and a rubber-containing polymer (ii-b) in 5.5 to 25 parts by weight, wherein the amount of an elastic polymer consisting of an innermost layer polymer and an intermediate layer elastic polymer in the rubber-containing polymer (ii-b) is 5 to 18 parts by weight [the total amount of Components (i) and (ii) is 100 parts by weight].

The acrylic resin film material (A'-a) used in this invention may contain, as necessary, common additives such as stabilizers, lubricants, processing aids, plasticizers, anti-impact agents, foaming agents, fillers, antibacterial agents, fungicides, mold releases, antistatic agents, coloring agents, matting agents, ultraviolet absorbers and photostabilizers.

In particular, in the light of protecting a base, a colored pattern in a print and a coloring agent, it is preferable to add an ultraviolet absorber for providing weather resistance. A molecular weight of the ultraviolet absorber used is preferably 300 or more, more preferably 400 or more. An ultraviolet absorber with a molecular weight of 300 or more can be used to prevent mold contamination with the vaporized ultraviolet absorber during vacuum- or press molding in an injection mold. Generally, an ultraviolet absorber with a higher molecular weight can more significantly minimize long-term bleed-out after processing into an acrylic resin laminate film and allow UV-absorbing performance to be maintained for a longer time than that with a lower molecular weight.

Such additives can be added by feeding them together with the material for the acrylic resin film material (A'-a) for the acrylic resin film material (A'-a) of this invention into an extruder, or by kneading a mixture preliminarily prepared by adding the additives to the material for the acrylic resin film material (A'-a) in a variety of kneaders. Examples of a kneader used in the latter procedure include common single screw extruders, twin screw extruders, banbury mixers and roll kneaders.

As necessary, gloss of an acrylic resin film material (A'-a) of this invention can be further reduced by a known method. Specifically, it can be conducted by kneading it with an inorganic filler or crosslinking polymer particles, by copolymerizing an epoxy-containing monomer, by using a hydroxy-containing straight polymer, or by emboss processing. Alternatively, a colored acrylic resin film material (A'-a) of this invention may be used.

Here, a thickness of the acrylic resin film material (A) in the acrylic resin laminate film of this invention is preferably 10 to 500 μm, more preferably 30 μm or more and 200 μm or less. It is preferably 500 μm or less because the acrylic resin laminate film finally obtained can have rigidity suitable for insert- and in-mold molding and a film can be stably formed when shaping the acrylic resin film material (A) into a film material. It is preferably 10 μm or more because of protection of a base and endowing a laminate molded item obtained with deepness.

A thickness of the acrylic resin film material (A'-a) in the acrylic resin laminate film of this invention is preferably 1 to 30 μm, more preferably 3 μm or more and 20 μm or less. It is preferably 30 μm or less because the acrylic resin laminate film of this invention can have improved surface hardness (excoriation resistance) and heat resistance, and a laminate molded item can be obtained without deterioration in a design and with less significant cracks, rupture, peeling in a laminating part or whitening in the acrylic resin film material (A'-a) when the laminate film is subjected to insert- or in-mold molding. It is preferably 1 μm or more because an acrylic resin film material (A'-a) can be obtained with an even film thickness while maintaining the effects of improving surface hardness (excoriation resistance) and heat resistance in the acrylic resin laminate film of this invention. Furthermore, for forming a coating film having an adequate thickness on a molded item by painting, ten and several times of recoating are necessary, leading to a higher cost and an extremely lower yield. On the other hand, for a laminate molded item according to this invention, an acrylic resin film material itself acts as a coating film and thus can easily provide a very thick coating film, resulting in higher industrial utility.

On both surface and rear sides in the acrylic resin laminate film where the acrylic resin film material (A) of this invention is a base and the acrylic resin film material (A'-a) having a pencil hardness of 2H or higher is used as a surface layer, the acrylic resin film material (A'-a) having a pencil hardness of 2H or higher may be laminated in the light of surface hardness (excoriation resistance) and heat resistance. In the light of weather resistance and solvent resistance, a fluororesin film material (A") can be laminated.

Furthermore, the acrylic resin film material (A'-b) having a pencil hardness of F or lower in the base side of the acrylic resin laminate film in the light of providing processability. Thus, a three-dimensional molded item can be prepared not only by vacuum molding such as insert- or in-mold molding, but also by another processing such as wrapping, resulting in higher industrial utility.

When in the acrylic resin laminate film of this invention an acrylic resin film material (A') is used as a base and the acrylic resin film material (A) is used as a surface layer, it is preferable to use the acrylic resin film material (A'-b) having lower surface hardness than the acrylic resin film material (A). Specifically, it is preferable to use the acrylic resin film material (A'-b) having a pencil hardness (as determined in accordance with JIS K5400) of F or lower, more preferably HB or lower, further preferably 3 B or lower.

By using the acrylic resin film material (A'-b) having a pencil hardness of F or lower as a base and the acrylic resin film material (A) of this invention as a surface layer, an acrylic resin laminate film exhibiting very good molding whitening resistance and good surface hardness (excoriation resistance) and heat resistance can be advantageously obtained in comparison with known acrylic resin (laminate) films.

Here, the acrylic resin film material (A'-b) is preferably made of a resin composition consisting of a multilayer structure polymer having a particular structure alone or, as necessary, a mixture thereof with a thermoplastic resin comprising an alkyl methacrylate as a main component.

Specifically, a resin component comprising the following (iii) and (iv) can be listed.

(iii) Thermoplastic resin comprising an alkyl methacrylate as a main component:

(iii-a) a thermoplastic resin consisting of a homopolymer of a vinyl monomer or vinylidene monomer having a general formula of $CH_2=CHX$ or $CH_2=CXY$, or made of two or more of these monomers, wherein X and Y, which may be different or the same, are independently H, Cl, F, Br, $CH_3$, COOH, $COOCH_3$, CN, $OCOCH_3$, $C_6H_5$, O-lower-alkyl, $COCH_3$ or $SO_3H$.

(iii-b) a thermoplastic made of an alkyl methacrylate having 1 to 4 carbon atoms in 50 to 100 wt %, an alkyl acrylate in 0 to 50 wt %, and at least one of other copolymerizable vinyl monomers in 0 to 50 wt %, wherein the polymer has a glass-transition temperature of less than 70° C. and a weight average molecular weight is 100,000 to 300,000.

(iv) Multilayer structure polymer (rubber-containing polymer) having a particular structure:

(iv-a) a multilayer structure polymer having a basic structural unit consisting of an innermost layer polymer (iv-aa) having a composition of, (iv-aa1) an alkyl acrylate having 1 to 8 carbon atoms and/or an alkyl methacrylate having 1 to 4 carbon atoms in 80 to 100 wt %, (iv-aa2) another monomer having a double bond copolymerizable with Component (iv-aa1) in 0 to 20 wt %, (iv-aa3) a multifunctional monomer in 0 to 10 wt %, and a graft crosslinker in 0.1 to 5 parts by weight to the total amount of 100 parts by weight of (iv-aa1) to (iv-aa3); a crosslinked elastic polymer (iv-ab) having a composition of, (iv-ab1) an alkyl acrylate having 1 to 8 carbon atoms and/or an alkyl methacrylate having 1 to 4 carbon atoms in 80 to 100 wt %, (iv-ab2) another monomer having a double bond copolymerizable with Component (iv-ab1) in 0 to 20 wt %, (iv-ab3) a multifunctional monomer in 0 to 10 wt %, and a graft crosslinker in 0.1 to 5 parts by weight to the total amount of 100 parts by weight of (iv-ab1) to (iv-ab3); and the outermost layer polymer (iv-ac) having a composition of, (iv-ad) an alkyl methacrylate having 1 to 4 carbon atoms in 51 to 100 wt %, and (iv-ac2) a monomer having a copolymerizable double bond in 0 to 49 wt % which has a glass-transition temperature of at least 60° C.; wherein between the polymer (iv-ab) layer and the polymer (iv-ac) layer, there is disposed an intermediate layer (iv-ad) having a composition of, (iv-ad1) an alkyl acrylate having 1 to 8 carbon atoms in 10 to 90 wt %, (iv-ad2) an alkyl methacrylate having 1 to 4 carbon atoms in 90 to 10 wt %, (iv-ad3) another monomer having a double bond copolymerizable with Components (iv-ad1) and (iv-ad2) in 0 to 20 wt %, (iv-ad4) a multifunctional monomer in 0 to 10 wt %, and a graft crosslinker in 0.1 to 5 parts by weight to the total amount of 100 parts by weight of (iv-ad1) to (iv-ad4).

(iv-b) in the presence of 100 parts by weight of an elastic copolymer consisting of an alkyl acrylate in 50 to 99.9 wt %, another copolymerizable vinyl monomer in 0 to 49.9 wt % and a copolymerizable crosslinking monomer in 0.1 to 10 wt %, a multilayer structure polymer prepared by polymerizing 10 to 400 parts by weight of a monomer or monomer mixture consisting of an alkyl methacrylate in 40 to 100 wt % and a vinyl monomer copolymerizable therewith in 0 to 60 wt %.

Specific examples are, for example, the following resin compositions.

(1) Resin composition for an acrylic resin film described in Japanese Patent Publication No. 63-8983:
a resin composition consisting of a thermoplastic resin (iii-a) in 1 to 99 parts by weight and a rubber-containing polymer (iv-a) in 1 to 99 parts by weight.

(2) Resin composition for an acrylic resin film described in Japanese Patent Application Laid-open No. 11-80487:
a resin composition consisting of a thermoplastic resin (iii-b) in 5 to 30 parts by weight and a rubber-containing polymer (iv-b) in 75 to 95 parts by weight.

The acrylic resin film material (A'-b) used in this invention may, as necessary, comprise common additives such as stabilizers, lubricants, processing aids, plasticizers, anti-impact agents, foaming agents, fillers, antibacterial agents, fungicides, mold releases, antistatic agents, coloring agents, matting agents, ultraviolet absorbers and photostabilizers.

Such additives can be added by feeding them together with the material for the acrylic resin film material (A'-b) for the acrylic resin film material (A'-b) of this invention into an extruder, or by kneading a mixture preliminarily prepared by adding the additives to the material for the acrylic resin film material (A'-b) in a variety of kneaders. Examples of a kneader used in the latter procedure include common single screw extruders, twin screw extruders, banbury mixers and roll kneaders.

As necessary, gloss of an acrylic resin film material (A'-b) of this invention can be further reduced by a known method. Specifically, it can be conducted by kneading it with an inorganic filler or crosslinking polymer particles, by copolymerizing an epoxy-containing monomer, by using a hydroxy-containing straight polymer, or by emboss processing. Alternatively, a colored acrylic resin film material (A'-b) of this invention may be used.

Here, a thickness of the acrylic resin film material (A'-b) in the acrylic resin laminate film of this invention is preferably 10 to 500 μm, more preferably 30 μm or more and 200 μm or less. It is preferably 500 μm or less because the acrylic resin laminate film finally obtained can have rigidity suitable for insert- and in-mold molding and a film can be stably formed when preliminarily shaping the acrylic resin film material (A) into a film material. It is preferably 10 μm or more because of protection of a base and endowing a laminate molded item obtained with deepness.

Here, a thickness of the acrylic resin film material (A'-b) in the acrylic resin laminate film of this invention is preferably 10 to 500 μm, more preferably 30 μm or more and 200 μm or less. It is preferably 500 μm or less because the acrylic resin laminate film finally obtained can have rigidity suitable for insert- and in-mold molding and a film can be stably formed when preliminarily shaping the acrylic resin film material (A) into a film material. It is preferably 10 μm or more because of protection of a base and endowing a laminate molded item obtained with deepness.

A thickness of the acrylic resin film material (A) in the acrylic resin laminate film of this invention is preferably 1 to 30 μm, more preferably 3 μm or more and 20 μm or less. It is preferably 30 μm or less because the acrylic resin laminate film of this invention can have improved surface hardness (excoriation resistance) and heat resistance, and a laminate molded item can be obtained without whitening when the laminate film is subjected to insert- or in-mold molding. It is preferably 1 μm or more because an acrylic resin film material (A) can be obtained with an even film thickness while maintaining the effects of improving surface hardness (excoriation resistance) and heat resistance in the acrylic resin laminate film of this invention. Furthermore, for forming a coating film having an adequate thickness on a molded item by painting, ten and several times of recoating are necessary, leading to a higher cost and an extremely lower yield. On the other hand, for a laminate molded item according to this invention, an acrylic resin film material itself acts as a coating film and thus can easily provide a very thick coating film, resulting in higher industrial utility.

On the surface layer side in an acrylic resin laminate film in which the acrylic resin film material (A'-b) is used as a base and the acrylic resin film material (A) of this invention is used as a surface layer, the acrylic resin film material (A'-a) layer having a pencil hardness of 2H or higher can be laminated, in the light of surface hardness (excoriation resistance) and heat resistance. A fluororesin film material (A") can be laminated in the light of weather resistance and solvent resistance.

In the acrylic resin laminate film of this invention, an acrylic resin film material (A) can be used as a base while a fluororesin film material (A") can be used as a surface material.

The fluororesin constituting the fluororesin film material (A") may be any of known fluororesins without particular restrictions. Examples thereof include vinylidene fluoride polymers; a copolymer of a vinylidene fluoride and a fluorine compound such as vinyl fluoride and tetrafluoroethylene or an acrylic monomer such as an alkyl acrylate and an alkyl methacrylate; a resin composition comprising a vinylidene fluoride polymer as a main component.

There are no particular restrictions to a position where the fluororesin film material (A") is disposed. However, the fluororesin film material (A") is preferably disposed on the upper layer of the acrylic resin film material (A) (i.e., the uppermost layer of the fluororesin film material (A")) in the light of weather resistance and solvent resistance of the acrylic resin laminate film.

The fluororesin film material (A") used in this invention may, as necessary, contain common additives such as stabilizers, lubricants, processing aids, plasticizers, anti-impact agents, foaming agents, fillers, antibacterial agents, fungicides, mold releases, antistatic agents, coloring agents, matting agents, ultraviolet absorbers and photostabilizers.

In particular, in the light of protecting a base, a colored pattern in a print and a coloring agent, it is preferable to add an ultraviolet absorber for providing weather resistance. A molecular weight of the ultraviolet absorber used is preferably 300 or more, more preferably 400 or more. An ultraviolet absorber with a molecular weight of 300 or more can be used to prevent mold contamination with the vaporized ultraviolet absorber during vacuum- or press molding in an injection mold. Generally, an ultraviolet absorber with a higher molecular weight can more significantly minimize long-term bleed-out after processing into an acrylic resin laminate film and allow UV-absorbing performance to be maintained for a longer time than that with a lower molecular weight.

Furthermore, an ultraviolet absorber with a molecular weight of 300 or more can reduce vaporization of the ultraviolet absorber in the period from extrusion of the film material from a T-die to cooling by a cooling roll when the fluororesin film material (A") is shaped into a film material. Therefore, there may remain an adequate amount of the ultraviolet absorber to exhibit good performance. It can eliminate the problem that the vaporized ultraviolet absorber is recrystallized and grown over time on a chain suspending the T-die over the T-die and on an exhaust hood, and finally dropped on a film, leading to defects in its appearance.

The type of the ultraviolet absorber is not particularly restricted, but preferably may be benzotriazoles with a molecular weight of 400 or more, or triazines with a molecular weight of 400 or more. Examples of the former include Tinuvin 234 (trade name) from Ciba Specialty Chemicals and ADEKA STAB LA-31 (trade name) from Asahi Denka Co., Ltd. Examples of the latter include Tinuvin 1577 (trade name) from Ciba Specialty Chemicals.

Such additives can be added by feeding them together with the material for the fluororesin film material (A") for the fluororesin film material (A") of this invention into an extruder, or by kneading a mixture preliminarily prepared by adding the additives to the material for the fluororesin film material (A") in a variety of kneaders. Examples of a kneader used in the latter procedure include common single screw extruders, twin screw extruders, banbury mixers and roll kneaders.

As necessary, gloss of a fluororesin film material (A") of this invention can be further reduced by a known method. Specifically, it can be conducted by kneading it with an inorganic filler or crosslinking polymer particles, by copolymerizing an epoxy-containing monomer, by using a hydroxy-containing straight polymer, or by emboss processing. Alternatively, a colored fluororesin film material (A") of this invention may be used.

Here, a thickness of the acrylic resin film material (A) in the acrylic resin laminate film of this invention is preferably 10 to 500 μm, more preferably 30 μm or more and 200 μm or less. It is preferably 500 μm or less because the acrylic resin laminate film finally obtained can have rigidity suitable for insert- and in-mold molding and a film can be stably formed when preliminarily shaping the acrylic resin film material (A) into a film material. It is preferably 10 μm or more because of protection of a base and endowing a laminate molded item obtained with deepness.

A thickness of the fluororesin film material (A") in the acrylic resin laminate film of this invention is preferably 1 to 30 μm, more preferably 3 μm or more and 20 μm or less. It is preferably 30 μm or less because when the acrylic resin laminate film is formed, a cost is not significantly increased and the acrylic resin laminate film obtained can be endowed with weather resistance and solvent resistance without deterioration in surface hardness and excoriation resistance. It is preferably 1 μm or more because a fluororesin film material (A") can be obtained with an even film thickness while maintaining the effects of improving weather resistance and solvent resistance in the acrylic resin laminate film of this invention. Furthermore, for forming a coating film having an adequate thickness on a molded item by painting, ten and several times of recoating are necessary, leading to a higher cost and an extremely lower yield. On the other hand, for a laminate molded item according to this invention, an acrylic resin film material itself acts as a coating film and thus can easily provide a very thick coating film, resulting in higher industrial utility.

Generally, the fluororesin film material (A") has surface hardness comparable with or lower than the acrylic resin film material (A). However, because of good slidability, an acrylic resin laminate film comprising the fluororesin film material (A") in its surface has relatively better excoriation resistance.

An acrylic resin laminate film of this invention can be formed, for example, by (1) conducting lamination after preforming an acrylic resin film material (A) and another acrylic resin film material (A') or fluororesin film material (A"), (2) conducting lamination while an acrylic resin film material (A) is melt-extruded to a prefomed material of another acrylic resin film material (A') or fluororesin film material (A"), (3) conducting lamination while to a preformed material of an acrylic resin film material (A) is melt-extruded another acrylic resin film material (A') or fluororesin film material (A"), or (4) conducting lamination while melt-extruding an acrylic resin film material (A) and another acrylic resin film material (A') or fluororesin film material (A").

An acrylic resin film material (A), another acrylic resin film material (A') and a fluororesin film material (A") can be molded into a preformed film material by any known method including melt extrusion processes such as melt flow casting, T-die casting and inflation casting as well as calendering. In an economical sense, T-die casting is preferable for film forming.

Lamination after preforming an acrylic resin film material (A) and another acrylic resin film material (A') or fluororesin film material (A") as described in (1) above, may be dry lamination, wet lamination, hot-melt lamination. When heat-sealing is practicable, lamination can be also conducted by heat-press lamination.

When preforming an acrylic resin film material (A) and another acrylic resin film material (A') or fluororesin film material (A"), it is preferable to forming a film by sandwiching the material between a plurality of rolls or belts selected from metal rolls, non-metal rolls and metal belts.

Lamination while an acrylic resin film material (A) is melt-extruded to a pre-formed material of another acrylic resin film material (A') or fluororesin film material (A") as described in (2) above, may be extrusion lamination where the acrylic resin material (A) is melt-extruded as a film to the preformed acrylic resin film material (A') or fluororesin film material (A") by a T-die.

When preforming another acrylic resin film material (A') or fluororesin film material (A"), it is preferable to forming a film by sandwiching the material between a plurality of rolls or belts selected from metal rolls, non-metal rolls and metal belts.

Lamination while to a preformed material of an acrylic resin film material (A) is melt-extruded another acrylic resin film material (A') or fluororesin film material (A") as described in (3) above may be extrusion lamination where to the preformed acrylic resin film material (A), the acrylic resin film material (A') or fluororesin film material (A") is melt-extruded as a film by a T-die.

When preforming the acrylic resin film material (A), it is preferable to forming a film by sandwiching the material between a plurality of rolls or belts selected from metal rolls, non-metal rolls and metal belts.

Lamination while melt-extruding an acrylic resin film material (A) and another acrylic resin film material (A') or fluororesin film material (A") as described in (4) above, may be conducted by co-extrusion processes such as a feed block method where gluing is conducted before a die, a multi-manifold method where gluing is conducted within a die and a multislot method where gluing is conducted outside of a die.

Among others, in the light of reducing the steps for producing an acrylic resin laminate film, is preferred the lamination while melt-extruding an acrylic resin film material (A) and another acrylic resin film material (A') or fluororesin film material (A") as described in (4) above, but not limited to it.

When laminating an acrylic resin laminate film by T-die casting, a film can be formed by sandwiching the material between a plurality of rolls or belts selected from metal rolls, non-metal rolls and metal belts to improve surface smoothness of an acrylic resin laminate film obtained and to prevent printing defects when printing on the acrylic resin laminate film.

Examples of metal rolls include metal mirror touch rolls; and rolls used in a sleeve touch manner consisting of a metal sleeve (metal film pipe) and a molding roll, described in Japanese Patent No. 2808251 or WO 97/28950. Examples of non-metal rolls include touch rolls made of, for example, silicon rubber. Examples of a metal belt include a metal endless belt. A plurality of these metal rolls, non-metal rolls and metal belts may be used in combination.

In film forming by sandwiching between a plurality of rolls or belts selected from metal rolls, non-metal rolls and metal belts as described above, it is preferable that an acrylic resin composition after melt extrusion is sandwiched substantially without a bank (resin deposit) and is plane-transferred substantially without rolling to form a film. When forming a film without forming a bank (resin deposit), an acrylic resin composition is plane-transferred in the course of cooling without rolling, so that a heat shrinkage ratio of the acrylic resin laminate film thus formed can be reduced.

Photocurable Acrylic Resin Film or Sheet

A photocurable acrylic resin film or sheet of this invention comprises an acrylic resin film material (A) of this invention or an acrylic resin laminate film of this invention, and a photocurable resin composition (Z) layer comprising a thermoplastic resin having a radical polymerizable unsaturated group in its side chain (z-1) and a photoinitiator (z-2).

The above photocurable resin composition (Z) preferably comprises a thermoplastic resin having a radical polymerizable unsaturated group in its side chain (z-1) and a photoinitiator (z-2) while being substantially free from a crosslinking compound other than the thermoplastic resin (z-1). In this invention, the layer of the photocurable resin composition (Z) can be laminated on an acrylic resin film material (A) or acrylic resin laminate film, to provide a photocurable acrylic resin film or sheet. Since there is thus introduced a structure where a polymer side chain has a radical polymerizable unsaturated group, the photocurable resin composition (Z) in this invention has an advantage that a crosslinking reaction can proceed between polymer side chains to achieve significantly good abrasion resistance and excoriation resistance, to eliminate the necessity of adding a low-molecular-weight crosslinking compound having a reactive vinyl group, and thus to provide a photocurable acrylic resin film or sheet without surface adhesiveness and with good storage stability.

The thermoplastic resin having a radical polymerizable unsaturated group in its side chain (z-1) may be, for example, selected from those having a glass-transition temperature of 25 to 175° C., preferably 30 to 150° C., where the polymer has a radical polymerizable unsaturated group. Specifically, it may be a polymer prepared by polymerizing or co-polymerizing Compounds (1) to (7) described below, to which a radical polymerizable unsaturated group is introduced by the processes (a) to (f) described below. "(Meth)acrylate" as used herein refers to acrylate or methacrylate. "(Meth)acrylate" as used herein refers to acrylate or methacrylate. "(Meth)acrylic acid" as used herein refers to acrylic or methacrylic acid. "(Meth)acrylamide" as used herein refers to acrylamide or methacrylamide. "(Meth)acryloyloxy" as used herein refers to acryloyloxy or methacryloyloxy.

(1) hydroxy-containing monomers such as N-methylolacrylamide, 2-hydroxyethyl (meth)acrylate, 2-hydroxypropyl (meth)acrylate, 2-hydroxybutyl (meth)acrylate and 2-hydroxy-3-phenoxypropyl (meth)acrylate;

(2) carboxy-containing monomers such as (meth)acrylic acid and acryloyloxyethyl monosuccinate;

(3) epoxy-containing monomers such as glycidyl (meth)acrylate and 3,4-epoxycyclohexylmethyl (meth)acrylate;

(4) aziridinyl-containing monomers such as 2-aziridinylethyl (meth)acrylate and allyl 2-aziridinylpropionate;

(5) amino-containing monomers such as (meth)acrylamide, diacetone acrylamide, dimethylaminoethyl (meth)acrylate and diethylaminoethyl (meth)acrylate;

(6) sulfone-containing monomer such as 2-acrylamide and 2-methylpropanesulfonic acid;

(7) isocyanate-containing monomers such as an adduct of radical polymerizable monomers having diisocyanate and active hydrogen (e.g., an equimolar adduct of 2,4-toluene diisocyanate and 2-hydroxyethyl acrylate) and 2-isocyanatoethyl (meth)acrylate.

Furthermore, the above compound can be copolymerized with a monomer copolymerizable therewith for adjusting a glass-transition temperature of a polymer or copolymer of the compound, and for achieving well-balanced physical properties of a photocurable film or sheet. Examples of such a copolymerizable monomer include (meth)acrylates such as methyl (meth)acrylate, tricyclodecanyl (meth)acrylate and isobornyl (meth)acrylate; imide derivatives such as N-phenylmaleimide, cyclohexylmaleimide and N-butylmaleimide; olefinic monomers such as butadiene; and aromatic vinyl compounds such as styrene and α-methylstyrene.

A radical polymerizable unsaturated group can be introduced into the above polymer or copolymer by the following methods (a) to (f);

(a) for a polymer or copolymer of a hydroxy-containing monomer (1), condensation reaction of a carboxyl-containing monomer (2) such as (meth)acrylic acid;

(b) for a polymer or copolymer of a carboxyl-containing monomer (2) and a sulfone-containing monomer (6), condensation reaction of the hydroxy-containing monomer (1);

(c) for a polymer or copolymer of an epoxy-containing monomer (3), an isocyanate-containing monomer (7) or an aziridinyl-containing monomer (4), addition reaction of the hydroxy-containing monomer (1) or the carboxyl-containing monomer (2);

(d) for a polymer or copolymer of a hydroxy- or carboxyl-containing monomer, addition reaction of an equimolar adduct of an epoxy-containing monomer (3) or aziridinyl-containing monomer (4) or an isocyanate-containing monomer (7), or an diisocyanate compound with a hydroxy-containing acrylate monomer;

(e) for a polymer or copolymer of an amino-containing monomer (5), condensation reaction of the carboxyl-containing monomer (2); and (f) for a polymer or copolymer of an amino-containing monomer (5), addition reaction of the epoxy-containing monomer (3) or an acetoacetoxy-containing monomer.

These reactions are preferably effected in the presence of a polymerization inhibitor such as a trace amount of hydroquinone under a dry-air stream.

In the light of improving excoriation resistance and abrasion resistance, it is preferable that in terms of the amount of a radical polymerizable unsaturated group in a side chain of the thermoplastic resin having the radical polymerizable unsaturated group in its side chain (z-1), a double bond equivalent (an average molecular weight per one side chain radical polymerizable unsaturated group) is 3000 g/mol or less on average as a calculated value from a charge amount. A more preferable double-bond equivalent range is, on average, 1200 g/mol or less, further preferably, most preferably 800 g/mol or less.

Thus, a plurality of radical polymerizable unsaturated groups involved in crosslinking can be introduced into a thermoplastic resin to eliminate the necessity of using a low-molecular-weight crosslinking compound, and thus to efficiently improve curing properties without surface adhesiveness in long-term storage and hot forming described later.

A number average molecular weight of a thermoplastic resin having a radical polymerizable unsaturated group in its side chain (z-1) is preferably within the range of 5,000 to 2,500,000, more preferably 10,000 to 1,000,000. The number average molecular weight is preferably 5,000 or more, in the light of good mold releasability in insert- or in-mold molding of a photocurable acrylic resin film or sheet prepared using a photocurable resin composition (Z) containing the thermoplastic resin having a radical polymerizable unsaturated group in its side chain (z-1), and improving surface hardness of an insert- or in-mold molded item after photocuring. The number average molecular weight is preferably 2,500,000 or less in the light of easier synthesis, an appearance and effective adhesiveness to the acrylic resin film material (A).

In the thermoplastic resin having a radical polymerizable unsaturated group in its side chain (z-1), a glass-transition temperature is adjusted preferably to 25 to 175° C., more preferably 30 to 150° C. The glass-transition temperature is preferably 25° C. or higher in the light of improving mold releasability of a photocurable acrylic resin film or sheet in insert- or in-mold molding and improving surface hardness of an insert- or in-mold molded item after photocuring. The glass-transition temperature is preferably 175° C. or lower in the light of handling properties of the photocurable acrylic resin film or sheet.

Taking into account a glass-transition temperature of a obtained thermoplastic resin having a radical polymerizable unsaturated group in its side chain (z-1), it is preferable to use a vinyl polymerizable monomer which can give a homopolymer having a higher glass-transition temperature. Furthermore, in the light of improving weather resistance of a thermoplastic resin having a radical polymerizable unsaturated group in its side chain (z-1), it is preferable to prepare an acrylic resin using, as a main component, a (meth)acrylate as a vinyl polymerizable monomer. As described later, when adding inorganic particles (a-3) to a photocurable resin composition (Z) of this invention, there may be contained, as a part of a radically polymerizable vinyl polymerizable monomer component, a group capable of reacting with a surface functional group (hydroxy, carboxyl, silanol and the like) in the inorganic particles (a-3), e.g., a vinyl polymerizable monomer having at least one intramolecular functional group selected from the group consisting of hydroxyl, carboxyl, halogenated silyl and alkoxysilyl because such a functional group can further improve physical properties of a photocurable resin composition obtained, such as rigidity, toughness and heat resistance.

Examples of such a vinyl polymerizable monomer having an intramolecular reactive group include 2-hydroxyethyl (meth)acrylate, 2-hydroxypropyl (meth)acrylate, (meth)

acrylic acid, vinyltrichlorosilane, vinyltrimethoxysilane and γ-(meth)acryloyloxypropyltrimethoxysilane.

A photoinitiator (z-2) used in this invention may be a photo-radical polymerization initiator capable of generating a radical by light irradiation.

A photo-radical polymerization initiator may be preferably selected from known compounds including initiators without an intramolecular amino group such as, but not limited to, acetophenones, benzophenones and acylphosphine oxides in the light of yellowing during curing and deterioration by weather exposure. Preferable examples thereof include 1-(4-dodecylphenyl)-2-hydroxy-2-methyloropan-1-one,
1-hydroxycycohexyl phenyl ketone, 2-hydroxy-2-methyl-1-phenylpropan-1-one,
1-(4-isopropylphenyl)-2-hydroxy-2-methylpropan-1-one,
2,4,6-trimethylbenzoyldiphenylphosphine oxide and
bis(2,6-dimethoxybenzoyl)-2,4,4-trimethylpentylphosphine
oxide. Some of these may temporally reach to a temperature over its boiling point in some molding processes, and thus it can be appropriately selected, taking a molding process into account. For increasing surface hardness of a molded item, an additive such as N-methyldiethanolamine which prevents oxygen from inhibiting polymerization curing may be added. In addition to such a photoinitiator, various peroxides may be added in the light of curing by the use of heat during molding. When adding a peroxide to a photocurable acrylic resin film or sheet, it must be cured at about 150° C. for about 30 sec. Thus, a peroxide having a lower critical temperature is preferable, including lauroyl peroxide, t-butylperoxy-2-ethylhexanoate and 1,1-bis(t-butylperoxy)-3,3,5-trimethylcyclohexane.

The amount of the photo-radical polymerization initiator is desirably 5 wt % or less to the compound having a radical polymerizable unsaturated group in its side chain because its residual amount after curing influences weather resistance. Particularly, an amino photo-radical polymerization initiator which is involved in yellowing during curing is desirably added to 1 wt % or less.

To a photocurable resin composition (Z) of this invention, inorganic particles (a-3) can be added for further improving excoriation resistance and abrasion resistance. The inorganic particles (a-3) used in this invention may have any type, particle size or shape as long as a photocurable resin composition obtained is transparent. Examples of such inorganic particles include colloidal silica, alumina and titanium dioxide, which can be used alone or in combination of two or more. Among others, colloidal silica is particularly preferable in the light of availability, a cost and transparency and abrasion resistance of a photocurable resin composition layer obtained.

Colloidal silica can be used as a common aqueous dispersion or a dispersion in an organic solvent. It is preferable to use a dispersion of colloidal silica in an organic solvent for homogeneously and stably dispersing it with a thermoplastic resin having a radical polymerizable unsaturated group in its side chain as Component (z-1).

Examples of such an organic solvent include methanol, isopropyl alcohol, n-butanol, ethyleneglycol, xylene/butanol, ethylcellosolve, butylcellosolve, dimethylformamide, dimethylacetamide, methyl ethyl ketone, methyl isobutyl ketone and toluene. Among others, it is preferable to select an organic solvent capable of dissolving the thermoplastic resin having a radical polymerizable unsaturated group in its side chain (z-1) for homogeneously dispersing the silica together with the thermoplastic resin. As described later, these organic solvents are evaporated by heating during preparing a photocurable acrylic resin film or sheet of this invention. Thus, it is preferable to use organic solvents having a boiling point lower by 80° C. or more, preferably 30° C. or more than a glass-transition temperature of a resin component as a main component in an acrylic resin film material (A), because they do not remain in a photocurable acrylic resin film or sheet.

A colloidal silica as a dispersion in an organic solvent may be selected from commercially available ones dispersed in a dispersion medium, such as methanol silica sol MA-ST, isopropyl alcohol silica sol IPA-ST, n-butanol silica sol NBA-ST, ethyleneglycol silica sol EG-ST, xylene/butanol silica sol XBA-ST, ethylcellosolve silica sol ETC-ST, butylcellosolve silica sol BTC-ST, dimethylformamide silica sol DBF-ST, dimethylacetamide silica sol DMAC-ST, methylethyl ketone silica sol MEK-ST, methyl isobutyl ketone silica sol MIBK-ST (all of these are trade names, Nissan Chemical Industries, Ltd.).

A particle size of the inorganic particles (a-3) is generally 200 nm or less, more preferably 100 nm or less, further preferably 50 nm or less, in the light of transparency of a photocurable resin composition layer obtained.

The amount of the inorganic particles (a-3) is preferably within 5 to 400 parts by weight as solid inorganic particles, particularly preferably 10 to 200 parts by weight to 100 parts by weight of the thermoplastic resin having a radical polymerizable unsaturated group in its side chain (z-1) as a solid. If the amount of the inorganic particles is less than 5 parts by weight, abrasion resistance may not be effectively improved. If the amount is more than 400 parts by weight, storage stability of the photocurable resin composition (Z) may be deteriorated and moldability of a photocurable acrylic resin film or sheet obtained may be deteriorated.

The inorganic particles (a-3) used in this invention may be preliminarily surface-treated by a silane compound represented by structural formula (a3-1). Using surface-treated inorganic particles is preferable because storage stability of the photocurable resin composition (Z) can be further improved and surface hardness and weather resistance in a photocurable acrylic resin film or sheet obtained can be also improved.

$$SiR^1_a R^2_b (OR^3)_c \quad (a3\text{-}1)$$

wherein $R^1$ and $R^2$ independently represent a hydrocarbon residue having 1 to 10 carbon atoms, and optionally having an ether bond, ester bond, epoxy bond or carbon-carbon double bond; $R^3$ represents hydrogen or a hydrocarbon residue having 1 to 10 carbon atoms, and optionally having an ether bond, ester bond, epoxy bond or carbon-carbon double bond; a and b independently represent an integer of 0 to 3; and c is an integer of 1 to 4 which is 4-a-b.

Among the silane compounds represented by structural formula (a3-1), silane compounds represented by structural formulas (a3-2) to (a3-7) are preferable.

$$SiR^4_a R^5_b (OR^6)_c \quad (a3\text{-}2)$$

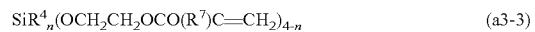

$$SiR^4_n (OCH_2CH_2OCO(R^7)C=CH_2)_{4-n} \quad (a3\text{-}3)$$

$$CH_2=C(R^7)COO(CH_2)_p SiR^8_n (OR^6)_{3-n} \quad (a3\text{-}4)$$

$$CH_2=CHSiR^8_n (OR^6)_{3-n} \quad (a3\text{-}5)$$

$$HS(CH_2)_p SiR^8_n (OR^6)_{3-n} \quad (a3\text{-}6)$$

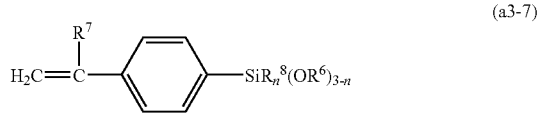

(a3-7)

wherein $R^4$ and $R^5$ independently represent a hydrocarbon residue having 1 to 10 carbon atoms, and optionally having an ether bond, ester bond or epoxy bond; $R^6$ represents hydrogen or a hydrocarbon residue having 1 to 10 carbon atoms; $R^7$ represents hydrogen or methyl; $R^8$ represents alkyl having 1 to 3 carbon atoms or phenyl; a and b independently represent an integer of 0 to 3; c is an integer of 1 to 4 which is 4-a-b; n is an integer of 0 to 2; and p is an integer of 1 to 6.

Examples of the silane compounds represented by structural formula (a3-2) include tetramethoxysilane, tetraethoxysilane, tetrapropoxysilane, tetrabutoxysilane, methyltrimethoxysilane, methyltriethoxysilane, ethyltrimethoxysilane, ethyltriethoxysilane, phenyltrimethoxysilane, phenyltriethoxysilane, dimethyldimethoxysilane, diphenyldimethoxysilane, methylethyldiethoxysilane, methylphenyldimethoxysilane, trimethylethoxysilane, methoxyethyltriethoxysilane, acetoxyethyltriethoxysilane, diethoxyethyldimethoxysilane, tetraacetoxysilane, methyltriacetoxysilane, tetrakis(2-methoxyethoxy)silane, γ-glycidoxypropyltrimethoxysilane, γ-glycidoxypropylmethyldiethoxysilane and β-(3,4-epoxycyclohexyl) ethyltrimethoxysilane.

Examples of the silane compounds represented by structural formula (a3-3) include tetrakis(acryloyloxyethoxy)silane, tetrakis(methacryloyloxyethoxy)silane, methyltris (acryloyloxyethoxy)silane and methyltris (methacryloyloxyethoxy)silane.

Examples of the silane compounds represented by structural formula (a3-4) include β-acryloyloxyethyldimethoxymethylsilane, γ-acryloyloxypropylmethoxydimethylsilane, γ-acryloyloxypropyltrimethoxysilane, β-methacryloyloxyethyldimethoxymethylsilane and γ-methacryloyloxypropyltrimethoxysilane.

Examples of the silane compounds represented by structural formula (a3-5) include vinylmethyldimethoxysilane, vinyltrimethoxysilane and vinyltriethoxysilane.

Examples of the silane compounds represented by structural formula (a3-6) include γ-mercaptopropyldimethoxymethylsilane and γ-mercaptopropyltrimethoxysilane.

Examples of the silane compounds represented by structural formula (a3-7) include p-vinylphenylmethyldimethoxysilane and p-vinylphenyltrimethoxysilane.

Such a silane compound is preferably used in an amount of 0 to 3 molar parts to 1 molar part of the inorganic particles (a-3) as a solid. If the amount of the silane compound is more than 3 molar parts, abrasion resistance of a photocurable acrylic resin film or sheet obtained may be deteriorated. The term "molar part" as used herein refers to a value calculated by dividing the amount of the inorganic particles or the silane compound in parts by weight by its molecular formula weight. For example, 100 parts by weight of solid colloidal silica ($SiO_2$) as the inorganic particles correspond to 100/60=1.666 molar parts.

The inorganic particles surface-treated with a silane compound can be commercially available or obtained by, for example, surface-treatment of the inorganic particles by a known method such as stirring with heating a silane compound and the inorganic particles in the presence of a small amount of water.

The inorganic particles (a-3) may be added to the thermoplastic resin having a radical polymerizable unsaturated group in its side chain (z-1) by an appropriate method such as mixing the inorganic particles with the preformed thermoplastic resin having a radical polymerizable unsaturated group in its side chain (z-1), and polymerizing a mixture of the inorganic particles and a vinyl polymerizable monomer as a constituent for the thermoplastic resin having a radical polymerizable unsaturated group in its side chain (z-1).

The photocurable resin composition (Z) used in this invention may, in addition to the thermoplastic resin having a radical polymerizable unsaturated group in its side chain (z-1) and a photoinitiator (z-2) as the essential components and the above inorganic particle (a-3) as an optional component, and further other additives such as sensitizers, modifying resins, dyes, pigments, leveling agents, anti-repellents, ultraviolet absorbers, photostabilizers, oxidation stabilizers, as necessary.

A sensitizer promotes a photocuring reaction, including benzophenone, benzoin isopropyl ether and thioxanthone.

However, the photocurable resin composition (Z) should be substantially free from a crosslinking compound other than the thermoplastic resin having a radical polymerizable unsaturated group in its side chain (z-1). Particularly, it must be substantially free from a crosslinking monomer or oligomer being liquid at 40° C. or a crosslinking monomer or oligomer having a lower molecular weight of 2000 or less. In particular, if it contains a crosslinking monomer or oligomer being liquid at 40° C. or a crosslinking monomer or oligomer having a lower molecular weight of 2000 or less, surface adhesiveness may be caused furing long-term storage or hot molding, leading to problems in a printing process or contamination of a mold during insert- or in-mold molding. It must be substantially free from a crosslinking monomer or oligomer being liquid at more preferably 50° C., further preferably 60° C.

In this invention using the above photocurable resin composition (Z), even when a photocurable acrylic resin film or sheet is formed by laminating a photocurable resin composition on an acrylic resin film material (A) or an acrylic resin laminate film, it can prevent surface adhesiveness in the photocurable acrylic resin film or sheet and phenomena such as over-time variation in adhesiveness of the surface, resulting in good storage stability as a roll.

By having the above configuration, the photocurable acrylic resin film or sheet of this invention is a photocurable acrylic resin film or sheet having well-balanced properties in a high level such as good moldability and storage stability before photocuring and good surface properties (hardness, weather resistance, etc.) after photocuring. As described later, the photocurable acrylic resin film or sheet of this invention is generally prepared by coating an acrylic resin film material (A) or acrylic resin laminate film with the solution obtained by mixing and dissolving a photocurable resin composition (Z) in a solvent such as an organic solvent by various coating methods, and then drying it by heating for removing the solvent. If there remains a large amount of the solvent in the photocurable acrylic resin film or sheet in this process, the surface of the photocurable resin composition (Z) layer before light irradiation becomes sticky, leading to reduction of an yield in a printing process, deterioration in storage stability as a roll, or more significant mold contamination during insert- or in-mold molding. Furthermore, when photocuring an insert- or in-molded item prepared by insert- or in-mold molding of the photocurable acrylic resin film or sheet, surface properties such as excoriation resistance, chemical resistance and weather resistance may be deteriorated. For solving these problems, it is preferable to reduce a solvent in the photocurable acrylic resin film or sheet as much as possible.

A photocurable acrylic resin film or sheet of this invention comprising an acrylic resin film material (A) or acrylic resin laminate film and a photocurable resin composition (Z) layer can be prepared by, for example, fully dissolving with stirring the photocurable resin composition (Z) comprising the thermoplastic resin having a radical polymerizable unsaturated group in its side chain (z-1) and a photoinitiator (z-2) as the essential components and the inorganic particles (a-3) as an optional component in an organic solvent; coating the acrylic resin film material (A) with the solution by a known printing method such as gravure printing, screen printing and offset printing, or by a known coating method such as flow coating, spray coating, bar coating, gravure coating, roll coating, blade coating, rod coating, roll doctor coating, air-knife coating, comma roll coating, reverse roll coating, transfer roll coating, kiss roll coating, curtain coating and dipping coating; and then drying it by heating for removing the solvent to give a laminate film or sheet. It is preferable to use an organic solvent having a boiling point lower by 80° C. or more, preferably 30° C. or more than a glass-transition temperature because it does not remain in a photocurable acrylic resin film or sheet.

A solvent for dissolving with stirring the photocurable resin composition (Z) may be preferably selected from those which can dissolve or homogeneously disperse each components in the photocurable resin composition (Z), has no practically significant adverse influence on the properties of the acrylic resin film material (A) or the acrylic resin laminate film (mechanical strength, transparency and then like), and is volatile with a boiling point lower by 80° C. or more, preferably 30° C. or more than a glass-transition temperature of the resin component as a main constituent of the acrylic resin film material (A) or the acrylic resin laminate film. Such a solvent can be selected from various known solvents including alcohol solvents such as methanol, ethanol, isopropyl alcohol, n-butanol and ethyleneglycol; aromatic solvents such as xylenes, toluene and benzene; aliphatic hydrocarbon solvents such as hexane and pentane; halogenated hydrocarbon solvents such as chloroform and carbon tetrachloride; phenol solvents such as phenol and cresol; ketone solvents such as methyl ethyl ketone, methyl isobutyl ketone and acetone; ether solvents such as diethyl ether, methoxytoluene, 1,2-dimethoxyethane, 1,2-dibutoxyethane, 1,1-dimethoxymethane, 1,1-dimethoxyethane, 1,4-dioxane and THF; aliphatic acid solvents such as formic acid, acetic acid and propionic acid; acid anhydride solvents such as acetic anhydride; ester solvents such as ethyl acetate, butyl acetate and butyl formate; nitrogen-containing solvents such as ethylamine, toluidine, dimethylformamide and dimethylacetamide; sulfur-containing solvents such as thiophene and dimethyl sulfoxide; two- or more functional solvents such as diacetone alcohol, 2-methoxyethanol (methylcellosolve), 2-ethoxyethanol (ethylcellosolve), 2-butoxyethanol (butylcellosolve), diethyleneglycol, 2-aminoethanol, acetocyanohydrin, diethanolamine and morpholine; and water.

For eliminating the problems caused by a residual solvent in the photocurable acrylic resin film or sheet and forming a photocurable acrylic resin film or sheet in a shorter time for improving a production efficiency with a lower cost, it is necessary to select more strict heating/drying conditions for solvent removal. However, when the photocurable acrylic resin film or sheet is heated/dried at a temperature higher than a heat distortion temperature of the acrylic resin film material (A) or the acrylic resin laminate film for 20 sec or more in a row, the photocurable acrylic resin film or sheet may be elongated with a small tension, leading to a thinner photocurable resin composition (Z) layer, acrylic resin film material (A) or acrylic resin laminate film and deterioration in excoriation resistance and surface hardness of the photocurable resin composition (Z) after photocuring.

In terms of the heating/drying conditions for the photocurable acrylic resin film or sheet, it may be heated/dried at a temperature equal to or lower than a heat distortion temperature of the acrylic resin film material (A) or the acrylic resin laminate film, or alternatively, when drying it at a temperature higher than a heat distortion temperature of the acrylic resin film material (A) or the acrylic resin laminate film, it may be dried at a temperature higher by +15° C. or less, preferably +10° C. or less than a heat distortion temperature of the acrylic resin film material (A) or the acrylic resin laminate film for 20 sec or less, preferably 10 sec or less, further preferably 5 sec or less.

When using an inflammable organic solvent as a solvent, an oven equipped with an air heating type heat source by steam in the light of safety can be used. Heating may be conducted by contacting the material with countercurrent hot air in the oven or by blowing hot air to the photocurable acrylic resin film or sheet from a nozzle. The oven can have any known shape such as an arch and a flat shapes, depending on an application.

Acrylic Resin Film Material (A), Acrylic Resin Laminate Film and Photocurable Acrylic Resin Film or Sheet Comprising a Decorative Layer (B)

An acrylic resin film material (A), an acrylic resin laminate film and a photocurable acrylic resin film or sheet of this invention may comprise a decorative layer (B) for endowing various bases with a design. For example, a decorative layer which is printed by an appropriate printing process as necessary, can be used. Here, preferably a material selected from the group consisting of an acrylic resin film material (A), an acrylic resin laminate film and a photocurable acrylic resin film or sheet is printed in one side for being used as a film with a decorative layer (B) in one side. For molding, the decorative layer (B) is preferably disposed in a surface adhering to a base resin in the light of protection of the decorative surface and giving posh feeling. The decorative layer (B) can be formed by any known process, but preferably formed as a print layer by printing or vapor-deposition layer by vapor deposition.

A print layer as a decorative layer (B) becomes a pattern or letter in the surface of an insert- or in-molded item. The printing pattern, which is optional, may be, for example, a grain, a rift, a cloth pattern, a sand pattern, a geometric pattern, letter(s) and a plain pattern. Examples of a binder material for the print layer include polyvinyl resins such as vinyl chloride/vinyl acetate copolymers; polyamide resins; polyester resins; polyacrylic resins; polyurethane resins; polyvinyl acetal resins; polyester urethane resins; cellulose ester resins; alkyd resins; and chlorinated polyolefin resins. For a polyacrylic resin, for example, a multilayer structure polymer (I), a resin composition (III) or a resin composition (IV) can be used as a binder material. In the print layer, a colored ink further comprising a pigment or dye of a proper color as a coloring agent can be used.

Pigments for an ink used for the print layer may include the followings. In general, examples of an pigment include, asan yellow pigment, azo pigments such as polyazos, organic pigments such as isoindolinone and inorganic pigments such as chrome yellow; as a red pigment, azo pigments such as polyazos, organic pigments such as quinacridone and inorganic pigments such as red oxide; as a blue pigment, organic pigments such as phthalocyanine blue and inorganic pigments such as cobalt blue; as a black pigment, organic pigments such as aniline black; and, as a white pigment, inorganic pigments such as titanium dioxide.

A dye in an ink used for the print layer may be any known ink as long as it does not deteriorate the effects of this invention.

The print layer can be formed by a known printing method such as offset printing, gravure rotary printing and screen printing, or a known coating method such as roll coating and spray coating, or flexographic printing. A thickness of the print layer can be appropriately determined as necessary, but generally about 0.5 to 30 μm. In the photocurable acrylic resin film or sheet of this invention, a photocurable resin composition allowing crosslinking between polymers is used instead of using a crosslinking compound with a low molecular weight, resulting in a nonsticky surface, less problems in printing and a higher yield.

A vapor-deposition layer may be disposed as a decorative layer (B), in one selected from the group consisting of an acrylic resin film material (A), an acrylic resin laminate film and a photocurable acrylic resin film or sheet, or alternatively, both print and vapor-deposition layers may be disposed. The vapor-deposition layer may be made of at least one metal selected from the group consisting of aluminum, nickel, gold, platinum, chromium, iron, copper, indium, tin, silver, titanium, lead and zinc and alloys or compounds thereof. The vapor-deposition layer can be formed by, for example, vacuum deposition, sputtering, ion plating and plating. These print and vapor-deposition layers for decoration may have an appropriate thickness depending on a degree of extension in insert- or in-mold molding such that it gives a desired surface appearance of an insert- or in-molded item.

When printing an acrylic resin film material (A) with a 60° surface glossiness of 100% or less in at least one side, it is preferable to print the side with a higher 60° surface glossiness of the film particularly in the light of reducing printing defects.

In the light of a design and decorativeness, the number of printing defects is preferably 10 or less/m$^2$ in the printed surface in one selected from the group consisting of an acrylic resin film material (A), an acrylic resin laminate film and a photocurable acrylic resin film or sheet. When the number of printing defects is 10 or less/m$^2$, a laminate molded item comprising the film has a good appearance. In the printed surface, the number of printing defects is more preferably 5 or less/m$^2$, particularly preferably 1 or less/m$^2$.

When a plastic base is used as an alternate to transparent painting for utilizing its color tone, it can be used as is transparent. Particularly, in applications where such color tone of a base is utilized, one selected from the group consisting of an acrylic resin film material (A), an acrylic resin laminate film and a photocurable acrylic resin film or sheet is superior to vinyl chloride film or polyester resin film in terms of transparency, deepness and posh feeling.

One selected from the group consisting of an acrylic resin film material (A), an acrylic resin laminate film and a photocurable acrylic resin film or sheet of this invention can be used after being colored.

An adhesion layer (D) may be, as necessary, disposed in one selected from the group consisting of an acrylic resin film material (A), an acrylic resin laminate film and a photocurable acrylic resin film or sheet of this invention.

The adhesion layer (D) may be made of any synthetic resin material as long as it can improve adhesiveness between the decorative layer (B) and a thermoplastic resin layer (C) described later or adhesiveness between the decorative layer (B) and a base (E) described later. For example, when the thermoplastic resin layer (C) is a polyacrylic resin, a polyacrylic resin may be used. When the thermoplastic resin layer (C) is an ABS resin (acrlonitrile-butadiene-styrene resin), an AS resin (acrylonitrile-styrene resin), a polyvinyl chloride resin, a polyphenyleneoxide-polystyrene resin, a polycarbonate resin, a styrene copolymer resin or a polystyrene blend resin, a polyacrylic resin, a polystyrene resin, a polyamide resin, an ABS resin, a polyvinyl chloride resin and the like which are compatible to these resins can be used. When the thermoplastic resin layer (C) is a polyolefin resin such as a polypropylene resin, a chlorinated polyolefin resin, a chlorinated ethylene-vinyl acetate copolymer resin, a cyclized rubber, a coumarone-indene resin, a thermosetting urethane resin using a block isocyanate and the like can be used. For reducing adhesiveness of the adhesion layer and improving heat resistance, hydrophobic silica, an epoxy resin, a petroleum resin or the like can be further added.

A cover film may be further disposed on one selected from the group consisting of an acrylic resin film material (A), an acrylic resin laminate film and a photocurable acrylic resin film or sheet of this invention. The cover film is effective for dustproof of the surface of one selected from the group consisting of an acrylic resin film material (A), an acrylic resin laminate film and a photocurable acrylic resin film or sheet, and is also effective for prevention of damages to the surface of a photocurable resin composition (Z) layer before irradiation with active energy ray.

When using the cover film in the photocurable acrylic resin film or sheet, it is required to have proper adhesiveness to the photocurable resin composition (Z) layer and good mold-releasability because it closely adheres to the photocurable resin composition (Z) layer before insert molding and is immediately peeled in insert molding. Any appropriate film which meets these conditions can be selected. Examples of such a film include polyethylene films, polypropylene films and polyester films.

Laminate Film or Sheet, and Laminate Molded Item

In this invention, one selected from the group consisting of an acrylic resin film material (A), an acrylic resin laminate film and a photocurable acrylic resin film or sheet of this invention can be laminated to a base (E) to give a laminate molded item. Alternatively, one selected from the group consisting of an acrylic resin film material (A), an acrylic resin laminate film and a photocurable acrylic resin film or sheet of this invention and a laminate film or sheet comprising a thermoplastic resin layer (C) may be laminated to a base (E) to give a laminate molded item. For example, in insert molding where it is preformed by vacuum- or press molding, the pre-molded item is inserted in another mold, and a resin as a base is injection-molded to give an acryl laminate molded item, it is preferable to use a laminate film or sheet.

The laminate film or sheet of this invention comprises one selected from the group consisting of an acrylic resin film material (A), an acrylic resin laminate film and a photocurable acrylic resin film or sheet of this invention, and a thermoplastic resin layer (C). It is preferably a construction laminate film or sheet. The construction laminate film or sheet is adequately resistant to an external force such as impact and distortion in practical handling. For example, it may generate less cracks due to impact or distortion when removing a film from a mold after vacuum molding in insert molding or mounting the vacuum molded item in a mold for injection molding, resulting in good handling properties. Alternatively, for example, for improving adhesiveness to the base (E), a thermoplastic resin layer (C) can be used. The thermoplastic resin layer (C) used further can give advantages which are, for example, to minimize propagation of surface defects in an injection molded item to one selected from the group consisting of an acrylic resin film material (A), an acrylic resin laminate film and a photocurable acrylic resin film or sheet, or to prevent loss of the decorative layer (B) in injection molding of a base (E).

For improving adhesiveness to a base (E), the thermoplastic resin layer (C) is preferably made of a material compatible to the base (E). Practically, the thermoplastic resin layer (C) is preferably made of a polymer material of the base (E), which can be a known thermoplastic resin film or sheet. Preferable examples thereof include acrylic resins; ABS resins (acrylonitrile-butadiene-styrene resin); AS resins (acrylonitrile-styrene resin), polyvinyl chloride resins; polyolefin resins such as polyethylene, polypropylene, polybutene and polymethylpentene; polyolefin copolymers such as ethylene-vinyl acetate copolymer or its saponification product and ethylene-(meth)acrylic acid ester copolymer; polyester resins such as polyethylene terephthalate, polybutylene terephthalate, polyethylene naphthalate, polyallylate and polycarbonate; polyamide resins such as 6-Nylon, 6,6-Nylon, 6,10-Nylon and 12-Nylon; polystyrene resins; cellulose derivatives such as cellulose acetate and nitrocellulose; fluororesins such as polyvinyl fluoride, polyvinylidene fluoride, polytetrafluoroethylene and ethylene-tetrafluoroethylene copolymer; and copolymers, mixtures, complexes and laminates of two, three or more of these. Among others, the thermoplastic resin layer (C) is preferably selected from acrylic resins, ABS resins, vinyl chloride resins, polyolefins and polycarbonates, in the light of formability of the decorative layer (B) and secondary moldability of the laminate film or sheet.

However, when being used in construction applications, it is preferable to use a resin free from halogen such as chlorine and fluorine, i.e., a non-halogenated resin. Among others, it is preferable to use a thermoplastic resin selected from polyolefin resins, acrylic resins and polyester resins in the light of various aspects including a price and distribution in the market, availability, proper balance between flexibility and strength, processing suitability in bending, cutting, machining and the like, surface physical properties such as abrasion resistance and solvent resistance and weather resistance.

The thermoplastic resin layer (C) can contain, as necessary, common additives such as stabilizers, antioxidants, lubricants, processing aids, plasticizers, anti-impact agents, foaming agents, fillers, antibacterial agents, fungicides, mold releases, antistatic agents, coloring agents, ultraviolet absorbers, photostabilizers, thermal stabilizers and flame retarders.

Examples of an antioxidant include phenols, sulfur compounds and phosphorous compounds; examples of an ultraviolet absorber include benzophenones, benzotriazoles, salicylates, cyanoacrylates, formamidine derivatives, oxazanides and triazines; examples of a photostabilizer include hindered amines and nickel complexes; examples of a thermal stabilizer include hindered phenols, sulfur compounds and hydrazines; examples of a plasticizer include phthalates, phosphates, aliphatic esters, aliphatic dibasic acid esters, oxybenzoates, epoxy compounds and polyesters, depending on the type of a resin; examples of a lubricant include aliphatic acid esters, aliphatic acids, metallic soaps, aliphatic amides, higher alcohols and paraffins; examples of an antistatic agent include cationic agents, anionic agents, nonionic agents and amphoteric agents; examples of a flame retarder include bromide compounds, phosphorous compounds, chloride compounds, nitrogen compounds, aluminum compounds, antimony compounds, magnesium compounds, boron compounds and zirconium compounds; examples of a filler include one or a mixture of two or more of calcium carbonate, barium sulfate, talc, agalmatolite and kaoline.

Such additives can be added by feeding them together with the thermoplastic resin for the thermoplastic resin layer (C) into an extruder, or by kneading a mixture preliminarily prepared by adding the additives to the thermoplastic resin in a variety of kneaders. Examples of a kneader used in the latter procedure include common single screw extruders, twin screw extruders, banbury mixers and roll kneaders.

A laminate film or sheet of this invention may be often required to be able to hide a color or defects generally in an adherent base. Thus, for endowing a given laminate film or sheet with adequate hiding properties, a hiding pigment can be added to a thermoplastic resin as a component of the thermoplastic resin layer to endow the thermoplastic resin layer (C) with hiding properties. Alternatively, instead of making the thermoplastic resin layer (C) hiding, there may be disposed a hiding solid-printed layer made of a printing ink composition comprising a hiding pigment in the surface or the rear surface of the thermoplastic resin layer (C). Alternatively, both of these may be combined.

The hiding pigment described above may be desirably an inorganic pigment exhibiting higher hiding power with a higher refractive index. Specific examples thereof include organic pigments such as chrome yellow, yellow iron oxide, cadmium yellow, titanium yellow, barium yellow, quinacridone, cobalt yellow, molybdate orange, cadmium red, red iron oxide, diachylum, cinnabar, Mars violet, manganese violet, cobalt blue, cerulean blue, ultramarine, iron blue, emerald green, chromium vermilion, chromium oxide, viridian, iron black and carbon black; and white pigments such as titanium dioxide (titanium white), zinc oxide (zinc flowers), basic lead carbonate, zinc sulfide, lithopone and titanox.

The thermoplastic resin layer (C) of this invention may be a laminate of a plurality of layers consisting of the same or different thermoplastic resins.

When using the thermoplastic resin layer (C) as a preformed film or sheet, it is preferably formed by melt extrusion or calendering via a polishing roll. It is preferable to extrude a molten resin while removing foreign materials through a screen mesh having 200 mesh or more during melt extrusion. Here, a film can be formed by sandwiching a plurality of rolls or belts selected from metal rolls, non-metal rolls and metal belts to improve smoothness of the surface of a film or sheet as the thermoplastic resin layer (C). Thus, fish eyes which may cause appearance defects such as printing defects can be reduced.

A thickness of the thermoplastic resin layer (C) may be appropriately determined, but is preferably 20 to 500 µm. The thermoplastic resin layer (C) must have an adequate thickness to give a fully smooth upper surface in an appearance of one selected from the group consisting of an acrylic resin film material (A), an acrylic resin laminate film and a photocurable acrylic resin film or sheet, to absorb surface defects in the base (E), or to prevent loss of the decorative layer (B) during injection molding.

For obtaining a laminate film or sheet, (1) one selected from the group consisting of an acrylic resin film material (A), an acrylic resin laminate film and a photocurable acrylic resin film or sheet; and a film or sheet as the thermoplastic resin layer (C) are laminated by a well-known method such as heat lamination, dry lamination, wet lamination and hot-melt lamination.

It may be laminated by extrusion lamination; specifically, (2) lamination while an acrylic resin film material (A) or acrylic resin laminate film is melt-extruded as a film or sheet on a film or sheet as the thermoplastic resin layer (C) by, for example, a T-die, or (3) lamination while the thermoplastic resin layer (C) is melt-extruded as a film or sheet on one selected from the group consisting of an acrylic resin film material (A), an acrylic resin laminate film and a photocurable acrylic resin film or sheet by, for example, a T-die.

Furthermore, (4) it may be formed by lamination while melt-extruding an acrylic resin film material (A) and the thermoplastic resin layer (C). Specific examples of such lamination include co-extrusion processes such as a feed block method and a multi-manifold method where gluing is conducted within a die and a method where one die has a plurality of die lips and gluing is conducted outside of the die.

Alternatively, a laminate film or sheet comprising an acrylic resin laminate film and the thermoplastic resin layer (C) can be formed by laminating while melt-extruding an acrylic resin film material (A), another acrylic resin film material (A') or fluororesin film material (A") and the thermoplastic resin layer (C). Specific examples of such lamination include co-extrusion processes such as a feed block method and a multi-manifold method where gluing is conducted within a die and a method where one die has a plurality of die lips and gluing is conducted outside of the die.

The decorative layer (B) and/or the colored layer (F) described above can be disposed between one selected from the group consisting of an acrylic resin film material (A), an acrylic resin laminate film and a photocurable acrylic resin film or sheet; and the thermoplastic resin layer (C).

When preforming one selected from the group consisting of an acrylic resin film material (A), an acrylic resin laminate film and a photocurable acrylic resin film or sheet; and the thermoplastic resin layer (C) as described in (1), the decorative layer (B) can be formed on one of these films or sheets. Here, the decorative layer (B) is preferably formed on one side of the film or sheet. For preparing a laminate film or sheet, it is also preferable to dispose the decorative layer (B) surface in a non-superficial surface in the light of protection of the decorative layer (B) and achieving posh feeling.

When conducting lamination after preforming the thermoplastic resin layer (C) into a film or sheet as described in (2), the decorative layer (B) is formed on the thermoplastic resin layer (C) is formed, and then the side of the decorative layer (B) is faced to one selected from the group consisting of an acrylic resin film material (A), an acrylic resin laminate film and a photocurable acrylic resin film or sheet before lamination.

When conducting lamination after preforming one selected from the group consisting of an acrylic resin film material (A), an acrylic resin laminate film and a photocurable acrylic resin film or sheet as described in (3), the decorative layer (B) is formed on one selected from the group consisting of an acrylic resin film material (A), an acrylic resin laminate film and a photocurable acrylic resin film or sheet, and then the side of the decorative layer (B) is faced to the thermoplastic resin layer (C) before lamination.

One side of the acrylic resin film material (A), the thermoplastic resin layer (C) or the like can be, as necessary, subjected to surface treatment with, for example, corona, ozone, plasma, ionizing radiation, a bichromate, an anchor and a primer, for improving adhesiveness between the thermoplastic resin layer (C) and the decorative layer (B), between the acrylic resin film material (A) and the thermoplastic resin layer (C), and the like.

There are no particular restrictions to a position where the colored layer (F) is disposed. However, it is preferably disposed a position where it is in contact with the decorative layer (B), e.g., between the decorative layer (B) and one selected from the group consisting of an acrylic resin film material (A), an acrylic resin laminate film and a photocurable acrylic resin film or sheet.

An appearance having various color tones can be obtained with the same decorative layer (B) by disposing a transparent colored layer (F) between one selected from the group consisting of an acrylic resin film material (A), an acrylic resin laminate film and a photocurable acrylic resin film or sheet and the decorative layer (B).

For example, when forming the decorative layer (B) by printing, a laminate film or sheet having a design with various color tones can be easily prepared without changing a plate or an ink in the printing process. Particularly, when using a metallic print layer or metal layer as a decorative layer (B), it is preferable to form a transparent colored layer (F) because it can provide a metallic appearance with various color tones such as silver-metallic, gold-metallic and blue-metallic.

By disposing the colored layer (F) between the decorative layer (B) and the thermoplastic resin layer (C), an appearance having various background color tones can be obtained with the same decorative layer (B).

For example, when forming the decorative layer (B) by printing, the color of the colored layer (F) can be used as a background color to allow only a pattern with a color other than the background color to be printed, so that a laminate film or sheet having a design with different color tones can be easily prepared without changing a plate or ink in the printing process. Particularly, when using a transparent metallic decorative layer as the decorative layer (B), disposing the colored layer (F) is preferable because it can provide a metallic appearance with various color tones such as silver-metallic, gold-metallic and blue-metallic.

An adhesion layer (D) may be, as necessary, formed. For example, it can be disposed on the side of the thermoplastic resin layer (C) contacting with the base (E) between the colored layer (F) or the decorative layer (B) and the thermoplastic resin layer (C).

A laminate molded item of this invention is characterized in that it is prepared by laminating one selected from the group consisting of an acrylic resin film material (A), an acrylic resin laminate film and a photocurable acrylic resin film or sheet, on a base (E) by, for example, melt lamination.

A resin to be the base (E) may be any known resin with no restrictions to its type. Examples of such a resin include olefin resins such as polyethylene resins, polypropylene resins, polybutene resins, polymethylpentene resins, ethylene-propylene copolymer resins, ethylene-propylene-butene copolymer resins and olefinic thermoplastic elastomers; and conventional thermoplastic or thermosetting resins such as polystyrene resins, ABS (acrylonitrile/butadiene/styrene copolymer) resins, AS (acrylonitrile/styrene copolymer) resins, acrylic resins, urethane resins, unsaturated polyester resins and epoxy resins. It may be selected from conventional engineering resins such as polyphenylene oxide-polystyrene resins, polycarbonate resins, polyacetal resins, polycarbonate-modified polyphenylene ether resins and polyethylene terephthalate resins; and super-engineering resins such as polysulfone resins, polyphenylenesulfide resins, polyphenylene oxide resins, polyetherimide resins, polyimide resins, liquid-crystal polyester resins and polyallyl heat-resisting resins. Furthermore, it may be selected from complex resins and various modified resins containing reinforcing materials such as glass fibers and inorganic fillers (e.g., talc, calcium carbonate, silica and mica); and a modifier such as a rubber component.

Among others, preferred are those which can be melted and glued to one selected from the group consisting of an acrylic resin film material (A), an acrylic resin laminate film and a photocurable acrylic resin film or sheet, or the thermoplastic resin layer (C) of a laminate film or sheet. Examples thereof include ABS resins, AS resins, polystyrene resins, polycarbonate resins, vinyl chloride resins, acrylic resins, polyester resins and resins comprising these as main components. In the light of adhesiveness, it is preferably selected from ABS resins, AS resins, polycarbonate resins, vinyl chloride resins and resins comprising these as main components, particularly preferably ABS resins, polycarbonate resins and resins comprising these as main components.

However, by using the adhesion layer (D), even for a base resin which is not heat-sealable such as a polyolefin resin, one selected from the group consisting of an acrylic resin film material (A), an acrylic resin laminate film, a photocurable acrylic resin film or sheet and a laminate film or sheet can be glued to the base (E) during molding.

When the laminate molded item of this invention is formed as a two-dimensional laminate item, a known method such as hot lamination can be used to a heat-sealable base. For example, a base (E) which is not heat-sealable, such as wood boards such as a single wooden board, a plywood, a particle board and a medium density fiber (MDF) board; woody boards such as a woody fiber board; and metals such as iron and aluminum, can be laminated via the adhesion layer (D).

For forming it as a three-dimensional laminate item, in-mold molding is preferable because a known method such as insert- or in-mold molding can be used and productivity is improved.

In in-mold molding, one selected from the group consisting of an acrylic resin film material (A), an acrylic resin laminate film, a photocurable acrylic resin film or sheet and a laminate film or sheet is heated, and then vacuum-molded in a mold in which the system can be vacuumed. In the light of work efficiency and economy, the method is preferable because molding a film and injection molding can be effected in one step.

When conducting in-mold molding using a known acrylic resin film material having a decorative layer (B), the decorative layer may be lost around a gate, depending on the shape of the mold and the injection molding conditions. Gates are generally classified into unrestricted gates where a resin path is not narrowed in the gate and restricted gates where the path is narrowed. Representative examples of the latter include a pinpoint gate, a side gate and a submarine gate. In such a gate shape, although a residual stress is reduced near the gate, a resin passing through the gate may be warmed and an injected resin pressure per a unit area applied to the surface of an acrylic resin film material near the gate may be increased, leading to loss of the decorative layer (B). However, by using an acrylic resin film material (A) of this invention, loss of the decorative layer (B) can be reduced in comparison with the case where a well-known acrylic resin film material is used.

It is preferable to conduct in-mold- or insert molding using a laminate film or sheet comprising the thermoplastic resin layer (C), because the presence of the thermoplastic resin layer (C) allows loss of the decorative layer (B) to be further reduced.

A heating temperature during in-mold molding is desirably equal to or higher than a softening temperature of one selected from the group consisting of an acrylic resin film material (A), an acrylic resin laminate film, a photocurable acrylic resin film or sheet and a laminate film or sheet. Specifically, depending on thermal properties of a film or the shape of a molded item, it is generally 70° C. or higher. A too high temperature tends to lead to deterioration in a surface appearance or mold releasability. It is generally 170° C. or lower, also depending on thermal properties of a film or the shape of a molded item. Furthermore, in the light of an energy efficiency, a pre-heating temperature in vacuum molding is preferably as lower as possible. Specifically, it is preferably 135° C. or lower. For a film which can be formed even at a low pre-heating temperature, a pre-heating time can be reduced instead of lowering a pre-heating temperature. Thus, recyclability of the vacuum molding can be improved, resulting in higher industrial utility.

Thus, when endowing a film with a three-dimensional shape by vacuum molding, one selected from the group consisting of an acrylic resin film material (A), an acrylic resin laminate film, a photocurable acrylic resin film or sheet and a laminate film or sheet is very advantageous because of its good high-temperature ductility.

When conducting vacuum molding using an acrylic resin film material (A) formed by sandwiching between a plurality of rolls or belts selected from metal rolls, non-metal rolls and metal belts and using the acrylic resin film material (A) comprising a decorative layer (B) with higher brightness (e.g., metallic tone), fish eyes in the acrylic resin film material (A) may cause appearance defects. The term, "appearance defect" as used herein refers to a defect where the surface of a vacuum molded item looks concave in contrast to printing defects. Here, a laminate film or sheet comprising the thermoplastic resin layer (C) can be suitably reduce occurrence of such appearance defects.

The base (E) to be injection-molded may be, independently of its type, any injection-moldable resin. It is preferable to approximate a shrinkage coefficient of the molded resin after molding to that of the above film or sheet because problems such as curving of an insert molded item and peeling of a film or sheet can be eliminated.

When using a laminate film or sheet of this invention to a construction application, the laminate film or sheet can be laminated, in addition to insert- or in-mold molding, by wrapping, V-cutting or the like.

Wrapping is a process where while feeding a laminate film or sheet to a cylindrical base (e.g., cylinder or polygonal cylinder) via an adhesion layer (D) in a longitudinal direction of the base, the laminate film or sheet is continuously pressed on a plurality of sides of the cylinder by a plurality of rollers with different directions to form a laminate molded item.

V-cutting is a process where first a laminate film or sheet is laminated to a plate base via an adhesion layer (D); in the surface of the plate base opposite to the laminate film or sheet, a groove with a V- or U-shape cross-section is formed such that it reaches an interface between the laminate film or sheet and the plate base; applying an adhesive into the groove; and the groove is bent to provide a box or cylinder shape of laminate molded item.

The laminate film or sheet comprising the acrylic resin film material (A) of this invention can be used to reduce whitening of the acrylic film during wrapping or V-cutting.

For a laminate molded item prepared using the photocurable acrylic resin film or sheet of this invention, the photocurable resin composition in the surface of the laminate molded item is photocured by light irradiation. The irradiating light may be electron beam, ultraviolet rays, γ-ray or the like. The irradiation conditions may be determined depending on photocuring properties of the photocurable resin composition (Z) layer, but an irradiation dose is generally about 500 to 10,000 $mJ/cm^2$. Thus, the photocurable resin composition (Z) is cured to give a laminate molded item comprising a hard coating film on its surface.

One selected from the group consisting of an acrylic resin film material (A), an acrylic resin laminate film, a photocurable acrylic resin film or sheet, a laminate film or sheet and a laminate molded item can be, as necessary, subjected to surface treatment for endowing it with various functions.

Examples of surface treatment for function endowment include printing processes such as silk printing and ink-jet printing; metal vapor deposition for metallic tone or antireflection; sputtering; wet plating; surface hardening for improving surface hardness; water-repellent finishing; forming of a photocatalyst layer; antistatic finishing for preventing dust adhesion or cutting electromagnetic wave; forming an antireflection layer; and anti-dazzling treatment.

A laminate molded item prepared by laminating one selected from the group consisting of an acrylic resin film material (A), an acrylic resin laminate film, a photocurable acrylic resin film or sheet and a laminate film or sheet of this invention is particularly suitable to vehicle applications and construction applications. Specifically, it can be suitably used in, for example, automobile interior applications such as an instrument panel, a console box, a meter cover, a door lock pesel, a steering wheel, a power winder switch base, a center cluster and a dash board; automobile exterior applications such as a weather strip, a bumper, a bumper guard, a side mud guard, a body panel, a spoiler, a front grille, a strut mount, a wheel cap, a center pillar, a door mirror, a center ornament, a side mall, a door mall, a window mall etc., a window, a head lamp cover, a tail lamp cover and windshield parts; a front panel, a button, an emblem and a surface decorative material for an AV device or furniture product; a housing, a display window and a button of a cell phone; furniture exterior materials; construction interior materials such as a wall, a ceiling and a floor; construction exterior materials such as an external wall (e.g., siding), a fence, a roof, a gate and a verge-board; surface decorative materials for furnitures such as a window frame, a door, a handrail, a door sill and a head jamb; optical members such as various displays, lenses, mirrors, goggles and window glasses; interior and exterior applications in various vehicles other than automobile such as an electric train, an airplane and a boat; various packaging containers and materials such as a bottle, a cosmetic container and an accessory case; miscellaneous goods such as a premium and a small article; and other various applications.

One selected from the group consisting of an acrylic resin film material (A), an acrylic resin laminate film, a photocurable acrylic resin film or sheet and a laminate film or sheet of this invention meets the required performance of molding whitening resistance, surface hardness, heat resistance, transparency or matting performance, and can be used in drastically extended applications. Particularly, it exhibits good molding whitening resistance in insert- and in-mold molding. Thus, the acrylic resin film material (A) of this invention can be used to eliminate the necessity of the step of removing a protruding film manually instead of punching or removing whitening by re-heating the whitened part which places restrictions on a design, and therefore extremely useful in industrial applications.

EXAMPLES

This invention will be further detailed with reference to, but not limited to, Examples. In these examples, "part(s)" means "part(s) by weight" and "%" is "wt %". In the examples, the abbreviations have the following meanings.

Methyl methacrylate: MMA,
Methyl acrylate: MA,
n-Butyl acrylate: n-BA,
Styrene: St,
1,3-Butyreneglycol dimethacrylate: 1,3-BD,
Allyl methacrylate: AMA,
Cumene hydroperoxide: CHP,
t-Butyl hydroperoxide: t-BH,
t-Hexyl hydroperoxide: t-HH,
n-Octylmercaptan: n-OM,
Ethylenediamine tetraacetate disodium salt: EDTA,
2-Hydroxyethyl methacrylate: HEMA,
Lauroyl peroxide: LPO.

Determination and Evaluation of Physical Properties

The methods described below were used for determining and evaluating physical properties for a multilayer structure polymer (I), a thermoplastic polymer (II), a hydroxy-containing polymer (V-1) and a thermoplastic polymer (VII-1); gel contents for a resin composition (III) and a resin composition (IV); as well as physical properties for the acrylic resin film materials (A) and the laminate molded items obtained in Examples 1 to 61 and Comparative Examples 1 to 28.

Evaluation of a laminate molded item was conducted for a laminate molded item prepared for evaluation of molding whitening resistance although Examples 24 to 27 and Comparative Examples 13 and 14 were evaluated using a laminate molded item prepared as described herein.

(1) A Weight-Average Particle Size of a Multilayer Structure Polymer (I)

Determined for a polymer latex of a multilayer structure polymer (I) prepared by emulsion polymerization, by dynamic light scattering using a light scattering photometer DLS-700 (trade name) from Otsuka Electronics Co., Ltd.

(2) Gel Contents of a Multilayer Structure Polymer (I), a Resin Composition (III) and a Resin Composition (IV)

A given amount (pre-extraction weight) of a multilayer structure polymer (I) (a coagulated powder obtained after polymerization), a resin composition (III) (a pellet obtained after extrusion) or a resin composition (IV) (a pellet obtained after extrusion) was extracted with acetone under reflux, the resulting mixture was centrifuged, a material undissolved in acetone was dried, the weight of the material was measured to obtain a post-extraction weight, from which a gel content was calculated in accordance with the following equation.

$$\text{Gel content}(\%) = \text{post-extraction weight}(g)/\text{pre-extraction weight}(g) \times 100$$

(3) Glass-Transition Temperatures (Tg) of a Multilayer Structure Polymer (I) and a Hydroxy-Containing Polymer (V)

Calculated using a value described in Polymer H and Book (J. Brandrup, Interscience, 1989) in accordance with FOX's equation.

(4) A Reduced Viscosity of a Thermoplastic Polymer (II), an Intrinsic Viscosity of a Hydroxy-Containing Polymer (V) and a Reduced Viscosity of a Thermoplastic Polymer (VII)

Determined for a solution of 0.1 g of the polymer in 100 mL of chloroform at 25° C.

(5) Haze Values of an Acrylic Resin Film Material (a) Before and after a Tensile Test, and a Haze Value of an Insert Laminate Molded Item A tensile test of the acrylic resin film material (A) was conducted for a test piece with a width of 20 mm and a film thickness of 125 μm, using Strograph T (trade name) from Toyo Seiki Seisaku-sho, LTD., under Condition a; initial inter-chuck distance: 25 mm, speed: 50 mm/min, temperature: 23° C. and end-point inter-chuck distance: 33 mm, or Condition b; initial inter-chuck distance: 25 mm, speed: 300 mm/min, temperature: 15° C. and end-point inter-chuck distance: 33 mm, in accordance with the test method under JIS K7127.

Haze values were determined by test pieces before and after the above tensile test in accordance with the test method under JIS K7136. An acrylic resin film material (A) with a haze of more than 40% was also evaluated in accordance with the same test method.

Insert molded items of Examples 24 to 27 and Comparative Examples 13 and 14 were also subjected to measurement in according to the test method under JIS K7136.

(6) Surface Gloss of an Acrylic Resin Film Material (A)

A surface gloss at 60° of the side not contacting a mirror roll during film forming was determined, using a gloss meter (Type GM-26D (trade name) from Murakami Color Research Laboratory).

(7) HDTs (Heat Distortion Temperature) of an Acrylic Resin Film Material (A)

A resin composition pellet was molded by injection molding into a test piece for heat distortion temperature determination in accordance with ASTM D648, and was annealed at 60° C. for 4 hours. The test piece was used to determine an HDT with a lower load (0.45 MPa) in accordance with ASTM D648.

(8) Molding Whitening Resistances and Print Status Near a Gate During in-Mold Molding for an Acrylic Resin Film Material (A), an Acrylic Resin Laminate Film and a Photocurable Acrylic Resin Film A decorative layer (B) with wood grain or jet-black tone was formed in an acrylic resin film material (A), an acrylic resin laminate film, or a photocurable acrylic resin film or sheet obtained, by gravure printing.

Using a mold having a 1 cm$^2$ square concave with a depth of 1 mm in its bottom of the cavity side (at the position of 3 cm laterally from the central gate) which was able to be vacuum, in-mold molding was conducted with an in-mold molding apparatus which is a combination of an injection molding apparatus Type J85ELII (trade name, Japan Steel Works, Ltd.) and Hot Pack System (trade name, Nissha Printing Co., Ltd.).

The exact shape of the molded item was a box shape with the dimensions of 150 mm (length)×120 mm (width)×2 mm (thickness)×10 mm (depth). In the mold, three gates were placed, one at the center of the molded item and two at the positions of 40 mm above and below the central gate (a vertical direction of the molded item). A gate had a shape of pinpoint gate with a diameter of 1 mm.

Vacuum molding of a film comprising the decorative layer (B) was conducted by heating it under the conditions of heater temperature: 260° C., heating time: 15 sec. and distance between the heater and the film: 15 mm, and in a direction such that a non-decorative layer became in contact with the mold.

In injection molding subsequently conducted within the same mold, a base resin was injected from the side of the decorative layer under the conditions of cylinder temperature: 250° C., injection speed: 30%, injection pressure: 43% and mold temperature: 60° C. The base resin used was a heat-resistant ABS resin (UMG ABS Inc., trade name "Bulksam™25B").

For the laminate molded item obtained, the 1 cm$^2$ square concave was observed and evaluated as follows. Status of the print as the decorative layer (B) near the gate was also observed and evaluated in accordance with the following criteria.

Whitening
○: film whitening was not observed.
Δ: weak film whitening was observed.
x: strong film whitening was observed.
*When a matting film was used (Examples 7 to 16, Comparative Examples 4 and 5)
○: film whitening was not observed.
x: film whitening was observed.

Cracks
○: no film cracks were observed.
x: film cracks were observed.
Print Status Near the Gate
○: the print was not deleted.
x: the print was deleted.

(9) A Molding Whitening Resistance of a Laminate Film

A laminate film obtained was placed in a mold which was able to be vacuumed such that the side of the acrylic resin film material (A) was in the cavity side. It was heated at 140° C. for 1 min and was vacuum molded. Then, an unwanted part was trimmed. On the bottom of a mold in the cavity side which had a 1 cm$^2$ square concave with a depth of 1 mm (at a position of 3 cm laterally from the central gate) was placed the laminate film after vacuum molding, such that the side of acrylic resin film material is in the cavity side. On the side of the thermoplastic resin film in the laminate film was injection-molded an ABS resin (UMG ABS Inc., trade name "Diapet ABS Bulksam™25") to be a base, and then insert molding was conducted to provide a laminate molded item.

The exact shape of the molded item was a box with the dimensions of 150 mm (length)×120 mm (width)×2 mm (thickness)×10 mm (depth). In the mold, three gates were placed, one at the center of the molded item and two at the positions of 40 mm above and below the central gate (a vertical direction of the molded item). A gate had a shape of pinpoint gate with a diameter of 1 mm.

Injection molding was conducted using an injection molding apparatus Type J85ELII (trade name, Japan Steel Works, Ltd.) under the conditions of cylinder temperature: 250° C., injection speed: 30%, injection pressure: 43% and mold temperature: 60° C.

For the laminate molded item obtained, the 1 cm$^2$ square concave was observed and evaluated in accordance with the criteria as described in (8).

(10) Heat-Aging Resistance Test for a Laminate Molded Item

Appearance of a molded item after heating at 80° C. for 400 hours was evaluated in accordance with the following criteria.
○: no changes were observed.
x: whitening and/or tarnish were observed.

For a molded item prepared using a matting film (Examples 7 to 16, Comparative Examples 4 and 5), its appearance after heating at 100° C. for 400 hours was evaluated in accordance with the following criteria.
○: unmatting was not observed.
x: unmatting was observed.

(11) Pencil Hardness of an Acrylic Resin Film and a Laminate Molded Item

Determined in accordance with JIS K5400.

(12) Excoriation Resistance of a Laminate Molded Item and a Construction Laminate Film While applying a load of 0.049 MPa to a five-ply gauze, it was excoriated by shuttling it 200 times between a stroke of 100 mm at a speed of 30 times/min, and then a laminate molded item or laminate film was evaluated for appearance.
○: excoriation was not observed.
Δ: excoriation was observed but whitening was not observed therein.
x: excoriation with whitening was observed.

For a laminate molded item prepared using a matting film (Examples 7 to 16, 52 to 61, Comparative Examples 4, 5, 25 to 28), appearance after 100-shuttle excoriating was evaluated in accordance with the following criteria.
○: excoriation was not observed.
Δ: weak excoriation was observed.
x: strong excoriation was observed.

(13) Aromatic Substance Resistance of a Laminate Molded Item

A polyethylene cylinder with an inner diameter of 38 mm and a height of 15 mm was placed on the surface of a molded item. It was tightly pressed on a test piece using a crimping tool. Into the opening was injected 5 mL of an automobile aromatic substance (Dia Chemical Co. Ltd., trade name "Grace Mate Poppy Citrus"). After sealing the opening with a glass plate, it was placed in an incubator maintained at 55° C. and left for 4 hours. After the crimping tool was removed, the test piece was washed with water and air-dried. The surface of the test part was observed and evaluated in accordance with the following criteria.

○: no changes were observed.
x: a crystalline material was precipitated.

(14) Appearance of a Laminate Molded Item

Appearance of woodgrain or jet-black pattern print in a molded item was visibly evaluated in accordance with the following criteria.

○: a print was clearly visible.
Δ: a print looked slightly whitened.
x: a print looked whitened.

(15) A Film Thickness of a Photocurable Acrylic Resin Film

A cross section of a photocurable acrylic resin film was observed with a transmission electron microscope JEM 100S (trade name, JEOL Ltd.) and thicknesses of a photocurable resin composition (Z) layer and an acrylic resin film material (A) layer were determined.

(16) Abrasion Resistance of an Laminate Molded Item Obtained from a Photocurable Acrylic Resin Film After a Taber abrasion test (a load of 500 g to one side, using a CS-10F (trade name) abrasion ring; a test was conducted under the conditions of rotation rate: 60 rpm, the number of test runs: 100 and 500), a haze value was determined. Then, a value as calculated as (haze value after the test)-(haze value before the test) was given as an abrasion resistance (%).

(17) Adhesiveness of an Insert Molded Item

Evaluated by a lattice tape method in accordance with JIS K5400.

(18) A Bend Elastic Constant of a Resin Composition (III)

Determined using Strograph T from Toyo Seiki Seisakusho, LTD., under the conditions of inter-supporting-point distance: 100 mm and bending rate: 3 mm/min in accordance with the test method under ASTM D790.

A pellet of each resin composition (III) was molded into a test piece for determination of a heat distortion temperature by injection molding in accordance with ASTM D648, and the test piece was used for measurement.

(19) Molding Whitening Resistance of a Construction Laminate Film

Appearance of a laminate molded item surface during wrapping for preparing the laminate molded item is evaluated in accordance with the following criteria.

Whitening
○: film whitening was not observed.
Δ: weak film whitening was observed.
x: strong film whitening was observed.

Cracks
○: no film cracks were observed.
x: film cracks were observed.

(20) Matte-Reduction Resistance of a Construction Laminate Film

Appearance of a laminate film after maintaining it at a surface of 90° C. for 24 hours is evaluated in accordance with the following criteria.

○: unmatting was not observed.
x: unmatting was observed.

(21) Bending Whitening Resistance (an Indicator for Molding Whitening Resistance) of an Acrylic Resin Film Material (A)

Whitening status when bending by 180° at a relatively higher speed an acrylic resin film material (A) with a thickness of 125 μm under an atmosphere of 20° C. is evaluated in accordance with the following criteria.

⊚: whitening was not observed.
○: slight whitening was observed.
Δ: a little whitening was observed.
x: whitening was observed.
x x: cracks were observed.

(22) Film-Formability of an Acrylic Resin Film Material (A)

Status when an acrylic resin film material (A) with a film thickness of 125 μm is formed by T-die casting is evaluated in accordance with the following criteria.

○: a film was able to be formed without breakage of the film for 5 hours or longer.
Δ: a film was broken several times in 5 hours.

(23) A Whole Light Transmittance of an Acrylic Resin Film Material (A)

Evaluated in accordance with JIS K6714.

(24) Matte-Reduction Resistance of a Laminate Molded Item

Using a mold having a matted surface, an acrylic resin film material (A) with a thickness of 125 μm and a vinyl chloride plate with a thickness of 3 mm were press-molded to prepare a laminate molded item, which was then heated at 85° C. for 15 hours. Its appearance is evaluated in accordance with the following criteria.

○: unmatting was not observed.
x: unmatting was observed.

(25) Hair-Dressing Resistance of a Laminate Molded Item

On the surface of an acrylic resin layer side in a laminate molded item was evenly applied with a finger Bravas hair liquid (trade name; Shiseido Co., Ltd.) as a hair dressing in an amount of 2 g per 105 cm$^2$. A flannel slightly smaller than the test piece was placed on the piece, which was then left in an oven at 80° C. After one week, it was removed, washed with water (a small amount of a neutral detergent can be added) and air-dried. Its surface status was visually observed and evaluated for whitening and occurrence of irregularity in accordance with the following criteria.

Whitening
○: whitening was not observed.
x: some whitening was observed.

Irregularity
○: irregularity was little observed.
x: irregularity was observed over the whole surface.

1. Preparation of a Multilayer Structure Polymer (I-1)

In a vessel equipped with a stirrer were charged 10.8 parts of deionized water, and then a monomer component consisting of 0.3 parts of MMA, 4.5 parts of n-BA, 0.2 parts of 1,3-BD, 0.05 parts of AMA and 0.025 parts of CHP. The mixture was stirred and mixed at room temperature. With stirring, 1.3 parts of an emulsifier (Toho Chemical Industry Co. Ltd., trade name "Phosphanol RS610NA") was added to the vessel, and the mixture was further stirred for 20 min to prepare an emulsion.

Next, in a polymerization vessel equipped with a reflux condenser was charged 139.2 parts of deionized water, which was then warmed to 75° C. Into the polymerization vessel was in one portion added a mixture prepared by adding 0.20 parts of sodium formaldehydesulfoxylate, 0.0001 parts of ferrous sulfate and 0.0003 parts of EDTA to 5 parts of ion-exchanged water. Then, while stirring under nitrogen, the prepared emulsion was added dropwise to the polymerization vessel over 8 min, and the reaction was continued for further 15 min to complete polymerization for an innermost layer polymer inner layer (I-1-A$_1$). Subsequently, a monomer component consisting of 9.6 parts of MMA, 14.4 parts of n-BA, 1.0 part of 1,3-BD and 0.25 parts of AMA together with 0.016 parts of CHP was added dropwise to the polymerization vessel over 90 min, and the reaction was continued for further 60 min to form an innermost layer polymer (I-1-A) comprising an innermost layer polymer outer layer (I-1-A$_2$). The innermost layer polymer inner layer (I-1-A$_1$) alone had a Tg of −48° C., and the innermost layer polymer outer layer (I-1-A$_2$) alone had a Tg of −10° C.

Next, a monomer component consisting of 6 parts of MMA, 4 parts of MA and 0.075 parts of AMA together with 0.0125 parts of CHP were added dropwise to the polymerization vessel over 45 min, and the reaction was continued for further 60 min to form an intermediate layer polymer (I-1-B). The intermediate layer polymer (I-1-B) alone had a Tg of 60° C.

Then, a monomer component consisting of 57 parts of MMA, 3 parts of MA, 0.264 parts of n-OM and 0.075 parts of t-BH was added dropwise to the polymerization vessel over 140 min, and the reaction was continued for further 60 min to form an outermost layer polymer (I-1-C) and thus to prepare a polymer latex of a multilayer structure polymer (I-1). The outermost layer polymer (I-1-C) alone had a Tg of 99° C.

A weight-average particle size of the multilayer structure polymer (I-1) after the polymerization was 0.11 μm.

The polymer latex of the multilayer structure polymer (I-1) thus prepared was filtrated through a vibratory filtering device with a SUS-mesh (average mesh: 62 μm) as a filter material, and was salted out from an aqueous solution of 3.5 parts of calcium acetate. The precipitate was washed with water, collected and dried to obtain a powdery multilayer structure polymer (I-1). A gel content of the multilayer structure polymer (I-1) was 70%.

To 1500 mL of acetone filtrated through a 25 μm mesh Nylon mesh was added 214.3 g of the multilayer structure polymer (I-1), and the mixture was stirred for 3 hours to prepare a dispersion of the multilayer structure polymer (I-1) in acetone. Then, the dispersion was filtrated through a 32 μm mesh Nylon mesh, and together with the Nylon mesh, was sonicated in chloroform for 15 min to wash the trapped material on the mesh with chloroform. Then, to 150 mL of acetone filtrated through a 25 μm mesh Nylon mesh was added the trapped material washed by sonication together with the Nylon mesh, and the mixture was sonicated for 15 min. The Nylon mesh was removed to obtain 150 ml of a dispersion of the trapped material on the mesh in acetone. Then, for 70 mL of the dispersion, the number of particles with a diameter of 55 μm was measured at 25° C. using an automatic liquid-borne particle counter (Rion Co. Ltd., Type KL-01), and it was 10 particles.

2. Preparation of a Multilayer Structure Polymer (I-2)

An innermost layer polymer (I-2-A) comprising an innermost layer polymer inner layer (I-2-A$_1$) and an innermost layer polymer outer layer (I-2-A$_2$) was prepared as described for the innermost layer polymer (I-1-A) comprising the innermost layer polymer inner layer (I-1-A$_1$) and the innermost layer polymer outer layer (I-1-A$_2$) in the multilayer structure polymer (I-1). The innermost layer polymer inner layer (I-2-A$_1$) alone had a Tg of −48° C., and the innermost layer polymer outer layer (I-2-A$_2$) alone had a Tg of −10° C.

Then an intermediate layer polymer (I-2-B) was formed as described for the intermediate layer polymer (I-1-B) in the multilayer structure polymer (I-1). The intermediate layer polymer (I-2-B) alone had a Tg of 60° C.

Next, to the polymerization vessel was added dropwise a monomer component consisting of 59.4 parts of MMA, 0.6 parts of MA, 0.264 parts of n-OM and 0.075 parts of t-BH over 140 min, and the reaction was continued for further 60 min to form an outermost layer polymer (I-2-C) and thus to obtain a polymer latex of a multilayer structure polymer (I-2). The outermost layer polymer (I-2-C) alone had a Tg of 104° C.

A weight-average particle size of the multilayer structure polymer (I-2) determined after polymerization was 0.11 μm.

The polymer latex of the multilayer structure polymer (I-2) thus obtained was filtrated through a vibratory filtering device with a SUS-mesh (average mesh: 62 μm) as a filter material, and was salted out from an aqueous solution of 3.5 parts of calcium acetate, washed with water, collected and dried to obtain a powdery multilayer structure polymer (I-2). A gel content of the multilayer structure polymer (I-2) was 70%.

As described for the multilayer structure polymer (I-1), the number of particles with a diameter of 55 μm for the multilayer structure polymer (I-2) obtained was determined, and was 11 particles.

3. Preparation of a Multilayer Structure Polymer (I-3)

In a vessel equipped with a stirrer were charged 8.5 parts of deionized water, and then a monomer component consisting of 0.3 parts of MMA, 4.5 parts of n-BA, 0.2 parts of 1,3-BD, 0.05 parts of AMA and 0.025 parts of CHP. The mixture was stirred and mixed at room temperature. With stirring, 1.3 parts of an emulsifier (Toho Chemical Industry Co. Ltd., trade name "Phosphanol RS610NA") was added to the vessel, and the mixture was further stirred for 20 min to prepare an emulsion.

Next, in a polymerization vessel equipped with a reflux condenser was charged 186.5 parts of deionized water, which was then warmed to 70° C. Into the polymerization vessel was in one portion added a mixture prepared by adding 0.20 parts of sodium formaldehydesulfoxylate, 0.0001 parts of ferrous sulfate and 0.0003 parts of EDTA to 5 parts of ion-exchanged water. The, while stirring under nitrogen, the prepared emulsion was added dropwise to the polymerization vessel over 8 min, and the reaction was continued for further 15 min to complete polymerization for an innermost layer polymer inner layer (I-3-A$_1$). Subsequently, a monomer component consisting of 1.5 parts of MMA, 22.5 parts of n-BA, 1.0 part of 1,3-BD and 0.25 parts of AMA together with 0.016 parts of CHP was added dropwise to the polymerization vessel over 90 min, and the reaction was continued for further 60 min to form an innermost layer polymer (I-3-A) comprising an innermost layer polymer outer layer (I-3-A$_2$). The innermost layer polymer inner layer (I-3-A$_1$) alone had a Tg of −48° C., and the innermost layer polymer outer layer (I-3-A$_2$) alone had a Tg of −48° C.

Next, a monomer component consisting of 6 parts of MMA, 4 parts of n-BA and 0.075 parts of AMA together with 0.0125 parts of CHP were added dropwise to the polymerization vessel over 45 min, and the reaction was continued for further 60 min to form an intermediate layer polymer (I-3-B). The intermediate layer polymer (I-3-B) alone had a Tg of 20° C.

Then, a monomer component consisting of 55.2 parts of MMA, 4.8 parts of n-BA, 0.19 parts of n-OM and 0.08 parts of t-BH was added dropwise to the polymerization vessel over 140 min, and the reaction was continued for further 60 min to form an outermost layer polymer (I-3-C) and thus to prepare a polymer latex of a multilayer structure polymer (I-3). The outermost layer polymer (I-3-C) alone had a Tg of 84° C.

A weight-average particle size of the multilayer structure polymer (I-3) after the polymerization was 0.12 μm.

The polymer latex of the multilayer structure polymer (I-3) thus prepared was filtrated through a vibratory filtering device with a SUS-mesh (average mesh: 62 μm) as a filter material, and was salted out from an aqueous solution of 3 parts of calcium acetate. The precipitate was washed with water, collected and dried to obtain a powdery multilayer structure polymer (I-3).

A gel content of the multilayer structure polymer (I-3) was 60%.

4. Preparation of a Multilayer Structure Polymer (I-4)

Under a nitrogen atmosphere, 310 parts of deionized water was charged in a reaction vessel equipped with a reflux condenser, and was warmed to 80° C. Then, to the vessel was added material (a) described below, and with stirring, was continuously added material (b) described below for an innermost layer polymer (I-4-A). Polymerization was continued for further 120 min to obtain a latex of an innermost layer polymer (I-4-A). The innermost layer polymer (I-4-A) alone had a Tg of −35° C.

Then, to the latex were added 10 parts of deionized water and 0.15 parts of sodium formaldehydesulfoxylate, and the mixture was left for 15 min. Then, with stirring at 80° C. under a nitrogen atmosphere, to the mixture was continuously added material (c) described below for an outermost layer polymer (I-4-C) over 100 min, and the mixture was subjected to polymerization at 80° C. for further 60 min to form an outermost layer polymer (I-4-C) and thus to obtain a polymer latex of a multilayer structure polymer (I-4). The outermost layer polymer (I-4-C) alone had a Tg of 99° C.

A weight-average particle size of the multilayer structure polymer (I-4) thus obtained was 0.12 μm.

The polymer latex of the multilayer structure polymer (I-4) thus obtained was subjected to coagulation with calcium acetate, aggregation and solidification and then filtrated, washed with water and dried to provide a multilayer structure polymer (I-4).

(a) a partially neutralized mixture of 40% of mono(polyoxyethylenenonylphenyl ether)phosphoric acid and 60% of di(polyoxyethylenenonylphenyl ether)phosphoric acid with sodium hydroxide: 0.5 parts,
  sodium carbonate: 0.1 parts,
  sodium formaldehydesulfoxylate: 0.5 parts,
  ferrous sulfate: 0.00024 parts, and
  EDTA: 0.00072 parts.
(b) n-BA: 81.0 parts,
  St: 19.0 parts,
  AMA: 1.0 part,
  t-BH: 0.25 parts, and
  a partially neutralized mixture of 40% of mono(polyoxyethylenenonylphenyl ether)phoshoric acid and 60% of di(polyoxyethylenenonylphenyl ether)phosphoric acid with sodium hydroxide: 1.1 parts.
(c) MMA: 57.0 parts,
  MA: 3.0 parts,
  n-OM: 0.2 parts, and
  t-BH: 0.1 parts.

5. Preparation of a Multilayer Structure Polymer (I-5)

Under a nitrogen atmosphere, 244 parts of deionized water was added to a reaction vessel equipped with a reflux condenser, and warmed to 80° C. Then, material (d) described below was added, 1/15 of material (e) described below for an innermost layer polymer inner layer (I-5-$A_1$) was added with stirring, and the mixture was left for 15 min. Then, the remaining material (e) was continuously added with an increment of 8%/hr of the monomer component [material (e)] to water, and the mixture was left for 60 min to obtain a latex of an innermost layer polymer inner layer (I-5-$A_1$). The innermost layer polymer inner layer (I-5-$A_1$) alone had a Tg of 24° C.

Next, to the latex was added 0.6 parts of sodium formaldehydesulfoxylate, and the mixture was left for 15 min. With stirring at 80° C. under a nitrogen atmosphere, to the mixture was continuously added material (f) described below for an innermost layer polymer outer layer (I-5-$A_2$) with an increment of 4%/hr of the monomer component [material (f)] to water, and the mixture was left for 120 min to effect polymerization for an innermost layer polymer outer layer (I-5-$A_2$) and thus to obtain a latex of an innermost layer polymer (I-5-A). The innermost layer polymer outer layer (I-5-$A_2$) alone had a Tg of −38° C.

Next, to the latex was added 0.4 parts of sodium formaldehydesulfoxylate, and the mixture was left for 15 min. With stirring at 80° C. under a nitrogen atmosphere, to the mixture was continuously added material (g) described below for an outermost layer polymer (I-5-C) with an increment of 10%/hr of the monomer component [material (g)] to water, and the mixture was left for 60 min to effect polymerization for an outermost layer polymer (I-5-C) and thus to obtain a polymer latex of a multilayer structure polymer (I-5). The outermost layer polymer (I-5-C) alone had a Tg of 99° C.

The multilayer structure polymer (I-5) thus obtained had a weight-average particle size of 0.28 μm.

The polymer latex of the multilayer structure polymer (I-5) thus obtained was subjected to coagulation with calcium acetate, aggregation and solidification and then filtrated, washed with water and dried to provide a multilayer structure polymer (I-5).

(d) sodium formaldehydesulfoxylate: 0.6 parts,
  ferrous sulfate: 0.00012 parts, and
  EDTA: 0.0003 parts.
(e) MMA: 22.0 parts,
  n-BA: 15.0 parts,
  St: 3.0 parts,
  AMA: 0.4 parts,
  1,3-BD: 0.14 parts,
  t-BH: 0.18 parts, and
  a partially neutralized mixture of 40% of mono(polyoxyethylenenonylphenyl ether)phoshoric acid and 60% of di(polyoxyethylenenonylphenyl ether)phosphoric acid with sodium hydroxide: 1.0 part.
(f) n-BA: 50.0 parts,
  St: 10.0 parts,
  AMA: OA parts,
  1,3-BD: 0.14 parts,
  t-HH: 0.2 parts, and
  a partially neutralized mixture of 40% of mono(polyoxyethylenenonylphenyl ether)phoshoric acid and 60% of di(polyoxyethylenenonylphenyl ether)phosphoric acid with sodium hydroxide: 1.0 part.
(g) MMA: 57.0 parts,
  MA: 3.0 parts,
  n-OM: 0.3 parts, and
  t-BH: 0.06 parts.

6. Preparation of a Hydroxy-Containing Polymer (V-1)

The mixture of the following components was placed in a reaction vessel equipped with a stirrer, a reflux condenser and an inlet for nitrogen gas;
  MA: 1 part,
  MMA: 79 parts,
  HEMA: 20 parts,
  N-OM: 0.14 parts,
  LPO: 0.5 parts, A copolymer of methyl methacrylate/a methacrylic acid salt/sulfonic acid salt of ethyl methacrylate: 0.05 parts,
Sodium sulfate: 0.5 parts, and
Ion-exchanged water: 250 parts.

After adequately replacing the atmosphere in the vessel with nitrogen gas, the mixture was heated with stirring to 75° C., and was subjected to polymerization under a nitrogen gas stream. After 2 hours, the mixture was warmed to 90° C. and left for further 45 min to complete the polymerization. Then, the polymer beads obtained were dehydrated and dried to obtain a hydroxy-containing polymer (V-1).

The hydroxy-containing polymer (V-1) thus obtained had an intrinsic viscosity of 0.076 L/g and a glass-transition temperature of 93° C.

7. Preparation of a Thermoplastic Polymer (VII-1)

To a nitrogen-replaced reaction vessel was placed 200 parts of ion-exchanged water, and then were added 1 part of an emulsifier (Kao Corporation, trade name "Latemul ASK") and 0.15 parts of potassium persulfate.

Then, to the mixture were added 40 parts of MMA, 2 parts of n-BA and 0.004 parts of n-OM. The mixture was stirred under a nitrogen atmosphere at 65° C. for 3 hours to complete the polymerization.

Next, to the mixture was added dropwise a monomer component consisting of 44 parts of MMA and 14 parts of n-BA over 2 hours, and the mixture was left for 2 hours to complete the polymerization.

The polymer latex of the thermoplastic polymer (VII-1) thus obtained was added to a 0.25% aqueous solution of sulfuric acid to acid-precipitate the polymer, which was then dehydrated, washed with water and dried to collect a powdery thermoplastic polymer (VII-1).

The thermoplastic polymer (VII-1) obtained had a reduced viscosity of 0.38 L/g.

8. Preparation of a Multilayer Structure Polymer (I-6)

At 75° C. under a nitrogen atmosphere, to a reaction vessel were added with stirring materials (h) and (i) described below over 8 min. The mixture was left for 60 min to obtain an innermost layer polymer inner layer (I-6-$A_1$). The innermost layer polymer inner layer (I-6-$A_1$) had a Tg of –37° C. With stirring at 75° C. under a nitrogen atmosphere, to the mixture was added dropwise material (j) described below over 120 min, and the mixture was left for 60 min for completing the polymerization to form an innermost layer polymer outer layer (I-6-$A_2$). The innermost layer polymer outer layer (I-6-$A_2$) had a Tg of –49° C.

Subsequently, material (k) described below was added dropwise at 75° C. under a nitrogen atmosphere over 45 min, and the mixture was left for 60 min for completing the polymerization to form an intermediate layer (I-6-B). The intermediate layer (I-6-B) alone had a Tg of –10° C.

Finally, material (l) described below was added dropwise with stirring at 75° C. under a nitrogen atmosphere over 90 min. At the end of addition, the mixture was stirred at 75° C. for 60 min to complete the reaction for forming the outermost layer polymer layer (I-6-C). The outermost layer polymer layer (I-6-C) alone had a Tg of 68° C.

The multilayer structure polymer (I-6) thus obtained had an average particle size of 0.11 μm.

The polymer latex of the multilayer structure polymer (I-6) thus obtained was filtrated through a vibratory filtering device equipped with an SUS-mesh (average mesh: 62 μm) as a filter material. Then, the polymer was salted out from an aqueous solution of 3.5 parts of calcium acetate, and was then washed with water, collected and dried to obtain a powdery multilayer structure polymer (I-6). The multilayer structure polymer (I-6) had a gel content of 75%.

(h) deionized water: 200 parts,
sodium formaldehydesulfoxylate: 0.2 parts,
ferrous sulfate: 0.0001 parts, and
EDTA: 0.0003 parts.
(i) MMA: 1.6 parts,
n-BA: 8.0 parts, 1,3-BD: 0.4 parts,
AMA: 0.1 parts,
CHP: 0.05 parts, and
Phosphanol RS610NA (trade name, from Toho Chemical Industry Co. Ltd.): 0.9 parts.
(j) MMA: 2 parts,
n-BA: 37 parts,
1,3-BD: 1 part,
AMA: 0.5 parts, and
CHP: 0.5 parts.
(k) MMA: 4 parts,
n-BA: 6 parts,
AMA: 0.1 parts, and
CHP: 0.05 parts.
(l) MMA: 34 parts,
n-BA: 6 parts,
t-BH: 0.5 parts, and
n-OM: 0.13 parts.

9. Preparation of Thermoplastic Resin Having a Radical Polymerizable Unsaturated group in its Side Chain (z-1)

Fifty parts of methyl ethyl ketone was placed in a 1 L four-necked flask equipped with a nitrogen inlet, a stirrer, a condenser and a thermometer, and was warmed to 80° C. Under a nitrogen atmosphere, to it was added dropwise a mixture of 79.9 parts of methyl methacrylate, 20.1 parts of glycidyl methacrylate and 0.5 parts of azobisisobutyronitrile over 3 hours. Then, a mixture of 80 parts of methyl ethyl ketone (boiling point: 79.6° C.) and 0.2 parts of azobisisobutyronitrile was added to initiate polymerization. After 4 hours, to the mixture were added 74.4 parts of methyl ethyl ketone, 0.5 parts of hydroquinone monomethyl ether, 2.5 parts of triphenylphosphine and 10.1 parts of acrylic acid. While introducing air, the mixture was stirred at 80° C. for 30 hours. Then, it was cooled and the reactant was removed from the flask to obtain a solution of a thermoplastic resin having a radical polymerizable unsaturated group in its side chain (z-1).

The thermoplastic resin having a radical polymerizable unsaturated group in its side chain (z-1) showed a monomer conversion of 99.5% or more, a solid polymer amount of about 35 wt %, a number average molecular weight of about 30,000, a glass-transition temperature of about 105° C. and an average double bond equivalent of 788 g/mol.

10. Preparation of a Colloidal Silica (Inorganic Particle (a-3))

In a flask equipped with a stirrer, a condenser and a thermometer were placed 1 part of IPA-ST (a colloidal silica sol dispersed in isopropanol (Nissan Chemical Industries Ltd., silica particle size=15 nm), 0.1 parts of KBM503 (γ-methacryloyloxy propyltrimethoxysilane (Shin-Etsu Chemical Co., Ltd., molecular weight=248) and 0.3 parts of water, as molar parts converted to a solid. A water bath temperature was raised to 75° C. while stirring the mixture, which was then reacted at the temperature for 2 hours to provide a colloidal silica dispersed in isopropanol whose surface was treated with the silane compound. The cycle of evaporation of isopropanol and then addition of toluene (boiling point: 110.6° C.) was repeated to completely replacing isopropanol with toluene for providing a colloidal silica dispersed in toluene whose surface was treated with the silane compound.

11. Preparation of a Photocurable Resin Solution

By stirring with a propeller type mixer, a photocurable resin solution was prepared, which consisted of 100 parts of the thermoplastic resin having a radical polymerizable unsaturated group in its side chain (z-1), 3 parts of 1-hydroxycyclohexyl phenyl ketone (photoinitiator (z-2)) and 66 parts of the colloidal silica (inorganic particle (a-3)), as molar parts by weight converted to a solid.

12. Preparation of a Multilayer Structure Polymer (I-7)

In a polymerization vessel equipped with a condenser was placed 150 parts of deionized water, which was then warmed to 75° C. To the polymerization vessel was added in one portion a mixture prepared by adding 0.20 parts of sodium formaldehydesulfoxylate, 0.0001 parts of ferrous sulfate and 0.0003 parts of EDTA to 5 parts of ion-exchanged water. Then, with stirring under nitrogen, to the mixture was added ⅙ of a monomer component consisting of 6 parts of MMA, 22.5 parts of n-BA, 1.2 parts of 1,3-BD, 0.3 parts of AMA, 0.041 parts of CHP and 1.3 parts of an emulsifier (Toho Chemical Industry Co. Ltd., Phosphanol RS610NA (trade name)), and the mixture was left for 15 min. Then, the remaining monomer component was continuously added over 90 min. It was then left for 60 min to obtain a latex of an innermost layer polymer (I-7-A). The innermost layer polymer (I-7-A) alone had a Tg of –33° C.

Subsequently, to the polymerization vessel was added dropwise a monomer component consisting of 5.96 parts of MMA, 3.97 parts of MA and 0.07 parts of AMA together with 0.0125 parts of CHP over 45 min, and the reaction was continued for further 60 min to form an intermediate layer polymer (I-7-B). The intermediate layer polymer (I-7-B) alone had a Tg of 60° C.

Next, to the polymerization vessel was added dropwise a monomer mixture consisting of 57 parts of MMA, 3 parts of MA, 0.264 parts of n-OM and 0.075 parts of t-BH over 140 min, and the reaction was continued for further 60 min to form an outermost layer polymer (I-7-C), and thus to give a polymer latex of a multilayer structure polymer (I-7). The outermost layer polymer (I-7-C) alone had a Tg of 99° C.

After the polymerization, it had a weight-average particle size of 0.11 μm.

The polymer latex of the multilayer structure polymer (I-7) thus obtained was filtrated through a vibratory filtering device equipped with an SUS-mesh (average mesh: 62 μm) as a filter material, and then was salted out from an aqueous solution of 3.5 parts of calcium acetate, washed with water, collected and dried to obtain a powdery multilayer structure polymer (I-7). The multilayer structure polymer (I-7) had a gel content of 68%.

13. Preparation of Multilayer Structure Polymers (I-8) to (I-16)

Multilayer structure polymers (I-8) and (I-9) in which each layer had a monomer component in Table 1 were prepared as described for the preparation of the multilayer structure polymer (I-7).

Multilayer structure polymers (I-10) to (I-12) in which each layer had a monomer component in Table 1 were prepared as described for the preparation of the multilayer structure polymer (I-1).

Multilayer structure polymers (I-13) to (I-16) in which each layer had a monomer component in Table 1 were prepared as described for the preparation of the multilayer structure polymer (I-3). Here, the polymers (I-15) and (I-16) were prepared by completing polymerization for the innermost layer polymer (I-A) at a monomer dropping rate for each polymer as was in the preparation conditions for (I-3) and then effecting polymerization for the outermost layer polymer (I-C).

Table 1 shows Tgs of the polymers constituting the individual layers.

TABLE 1

| Monomer components for individual layers | | | Multilayer structure polymer (I) | | | | | | | | | | |
|---|---|---|---|---|---|---|---|---|---|---|---|---|---|
| | | | I-1 | I-3 | I-7 | I-8 | I-9 | I-10 | I-11 | I-12 | I-13 | I-14 | I-15 | I-16 |
| Innermost layer polymer (A) | 1st layer (inner layer) | (part) | 30 | 30 | 30 | 30 | 30 | 30 | 30 | 30 | 30 | 30 | 40 | 30 |
| | | (part) | 5 | 5 | 30 | 30 | 30 | 5 | 5 | 5 | 5 | 5 | 5 | 5 |
| | | MMA (%) | 6 | 6 | 20 | 33 | 40 | 6 | 6 | 6 | 6 | 6 | 6 | 6 |
| | | n-BA (%) | 89 | 89 | 75 | 62 | 55 | 89 | 89 | 89 | 89 | 89 | 89 | 89 |
| | | 1,3-BD (%) | 4 | 4 | 4 | 4 | 4 | 4 | 4 | 4 | 4 | 4 | 4 | 4 |
| | | AMA (%) | 1 | 1 | 1 | 1 | 1 | 1 | 1 | 1 | 1 | 1 | 1 | 1 |
| | | Tg (° C.) | −48 | −48 | −33 | −16 | −7 | −48 | −48 | −48 | −48 | −48 | −48 | −48 |
| | 2nd layer (outer layer) | (part) | 25 | 25 | — | — | — | 25 | 25 | 25 | 25 | 25 | 35 | 25 |
| | | MMA (%) | 38 | 6 | — | — | — | 38 | 38 | 38 | 38 | 38 | 38 | 38 |
| | | n-BA (%) | 57 | 89 | — | — | — | 57 | 57 | 57 | 57 | 57 | 57 | 57 |
| | | 1,3-BD (%) | 4 | 4 | — | — | — | 4 | 4 | 4 | 4 | 4 | 4 | 4 |
| | | AMA (%) | 1 | 1 | — | — | — | 1 | 1 | 1 | 1 | 1 | 1 | 1 |
| | | Tg (° C.) | −10 | −48 | — | — | — | −10 | −10 | −10 | −10 | −10 | −10 | −10 |
| Intermediate layer polymer (B) | | (part) | 10 | 10 | 10 | 10 | 10 | 10 | 10 | 10 | 10 | 10 | — | — |
| | | MMA (%) | 59.6 | 59.6 | 59.6 | 59.6 | 59.6 | 39.7 | 74.5 | 59.6 | 59.6 | 99.3 | — | — |
| | | MA (%) | 39.7 | — | 39.7 | 39.7 | 39.7 | 59.6 | 24.8 | 39.7 | — | — | — | — |
| | | n-BA (%) | — | 39.7 | — | — | — | — | — | — | 39.7 | — | — | — |
| | | AMA (%) | 0.7 | 0.7 | 0.7 | 0.7 | 0.7 | 0.7 | 0.7 | 0.7 | 0.7 | 0.7 | — | — |
| | | Tg (° C.) | 60 | 20 | 60 | 60 | 60 | 42 | 76 | 60 | 20 | 105 | — | — |
| Outermost layer polymer (C) | | (part) | 60 | 60 | 60 | 60 | 60 | 60 | 60 | 60 | 60 | 60 | 60 | 70 |
| | | MMA (%) | 95 | 92 | 95 | 95 | 95 | 95 | 95 | 85 | 95 | 95 | 95 | 95 |
| | | MA (%) | 5 | — | 5 | 5 | 5 | 5 | 5 | 15 | 5 | 5 | 5 | 5 |
| | | n-BA (%) | — | 8 | — | — | — | — | — | — | — | — | — | — |
| | | Tg (° C.) | 99 | 84 | 99 | 99 | 99 | 99 | 99 | 87 | 99 | 99 | 99 | 99 |

Example 1

To 100 parts of the multilayer structure polymer (I-1) were added, as additives, 2.7 parts of "Tinuvin 234" (trade name, Ciba Specialty Chemicals), 0.1 parts of "ADEKA STAB AO-50" (trade name, Asahi Denka Co., Ltd.) and 0.3 parts of "ADEKA STAB LA-57" (trade name, Asahi Denka Co., Ltd.), and the mixture was mixed by Henschell mixer. The mixture [resin composition (III-1)] was placed in a degassing type extruder (Ikegai Iron Works, PCM-30 (trade name)) at 230° C., and then kneaded to give a pellet.

The pellet prepared as described above was dried at 80° C. for a whole day and night, and formed into an acrylic resin film material (A) with a thickness of 125 μm using a 40 mm φ non-bent screw type extruder (L/D=26) equipped with a T-die with a width of 300 mm, under the conditions of cylinder temperature: 180 to 240° C. and T-die temperature: 240° C. A decorative layer (B) was satisfactorily formed with less printing defects.

Example 2

A mixture [resin composition (III-2)] was prepared and an acrylic resin film material (A) was formed as described in Example 1, substituting 90 parts of the multilayer structure polymer (I-1) and 10 parts of a thermoplastic polymer (II-1) [MMA/MA copolymer (MMA/MA=99/1 (by weight), reduced viscosity: $\eta sp/c$=0.06 L/g)] for 100 parts of the multilayer structure polymer (I-1). A decorative layer (B) was satisfactorily formed with less printing defects.

Example 3

A mixture [resin composition (III-3)] was prepared and an acrylic resin film material (A) was formed as described in Example 1, substituting 75 parts of the multilayer structure polymer (I-1) and 25 parts of the thermoplastic polymer (II-1) for 100 parts of the multilayer structure polymer (I-1). A decorative layer (B) was satisfactorily formed with less printing defects.

Example 4

A mixture [resin composition (III-4)] was prepared and an acrylic resin film material (A) was formed as described in Example 1, substituting 90 parts of the multilayer structure polymer (I-2) and 10 parts of the thermoplastic polymer (II-1) for 100 parts of the multilayer structure polymer (I-1). A decorative layer (B) was satisfactorily formed with less printing defects.

Example 5

A mixture [resin composition (III-5)] was prepared and an acrylic resin film material (A) was formed as described in Example 3, substituting 2.1 parts of "ADEKA STAB LA-31" (trade name, Asahi Denka Co., Ltd.) for 2.7 parts of "Tinuvin 234" (trade name, Ciba Specialty Chemicals) as one of the additives. A decorative layer (B) was satisfactorily formed with less printing defects.

Example 6

A pellet of a mixture [resin composition (III-6)] was prepared as described in Example 3, except that 1.4 parts of "Tinuvin 234" (trade name, Ciba Specialty Chemicals), 0.1 parts of "ADEKA STAB AO-50" (trade name, Asahi Denka Co., Ltd.) and 0.3 parts of "ADEKA STAB LA-67" (trade name, Asahi Denka Co., Ltd.) were added as additives to 75 parts of the multilayer structure polymer (I-1) and 25 parts of the thermoplastic polymer (II-1). Then, a film was formed as described in Example 3, except that the pellet of the mixture [resin composition (III-6)] was used, and during film forming, a molten acrylic resin film material extruded under the condition of T-die slit width: 0.5 mm was passed between two metal cooling rolls, the resin was sandwiched without a bank (resin deposit) to be plane-transferred without rolling and then it was wound with a paper cover by a winder to prepare an acrylic resin film material (A) with a thickness of 125 μm. A decorative layer (B) was satisfactorily formed with less printing defects.

Comparative Example 1

To 100 parts of the multilayer structure polymer (I-3) were added, as additives, 2.1 parts of "ADEKA STAB LA-31" (trade name, Asahi Denka Co., Ltd.), 0.1 parts of "ADEKA STAB AO-50" (trade name, Asahi Denka Co., Ltd.) and 0.3 parts of "ADEKA STAB LA-57" (trade name, Asahi Denka Co., Ltd.), and the mixture was mixed using Henschell mixer. The mixture [resin composition (III-7)] was placed in a degassing type extruder (Ikegai Iron Works, PCM-30 (trade name)) at 230° C., and then kneaded to give a pellet. Then, an acrylic resin film material (A) was formed as described in Example 1, except that the pellet of the mixture [resin composition (III-7)] was used.

Comparative Example 2

A mixture [resin composition (III-8)] was prepared and an acrylic resin film material (A) was formed as described in Comparative Example 1, substituting 32 parts of the multilayer structure polymer (I-4) and 68 parts of the thermoplastic polymer (II-1) for 100 parts of the multilayer structure polymer (I-3).

Comparative Example 3

A mixture [resin composition (III-9)] was prepared and an acrylic resin film material (A) was formed as described in Comparative Example 1, substituting 16 parts of the multilayer structure polymer (I-5) and 84 parts of the thermoplastic polymer (II-1) for 100 parts of the multilayer structure polymer (I-3).

Example 7

A mixture of 100 parts of the multilayer structure polymer (I-1), 10 parts of the hydroxy-containing polymer (V-1) and as additives, 2.7 parts of "Tinuvin 234" (trade name, Ciba Specialty Chemicals), 0.1 parts of "ADEKA STAB AO-50" (trade name, Asahi Denka Co., Ltd.) and 0.3 parts of "ADEKA STAB LA-57" (trade name, Asahi Denka Co., Ltd.) was mixed by Henschell mixer. The mixture [resin composition (IV-1)] was placed in a degassing type extruder (Ikegai Iron Works, PCM-30 (trade name)) at 230° C., and then kneaded to give a pellet.

The pellet thus obtained was dried at 80° C. for a whole day and night, and formed into an acrylic resin film material (A) with a thickness of 125 μm using a 40 mm φ non-bent screw type extruder (L/D=26) equipped with a T-die with a width of 300 mm, under the conditions of cylinder temperature: 180 to 240° C. and T-die temperature: 240° C.

Example 8

A mixture [resin composition (IV-2)] was prepared and an acrylic resin film material (A) was formed as described in Example 7, substituting 90 parts of the multilayer structure polymer (I-1) and 10 parts of the thermoplastic polymer (II-1) used in Example 2 for 100 parts of the multilayer structure polymer (I-1).

Example 9

A mixture [resin composition (IV-3)] was prepared and an acrylic resin film material (A) was formed as described in Example 7, substituting 75 parts of the multilayer structure polymer (I-1) and 25 parts of the thermoplastic polymer (II-1) used in Example 2 for 100 parts of the multilayer structure polymer (I-1).

Example 10

A mixture [resin composition (IV-4)] was prepared and an acrylic resin film material (A) was formed as described in Example 8, using, as additives, 2.7 parts of "Tinuvin 234" (trade name, Ciba Specialty Chemicals), 0.1 parts of "ADEKA STAB AO-50" (trade name, Asahi Denka Co., Ltd.), 0.3 parts of "ADEKA STAB LA-57" (trade name, Asahi Denka Co., Ltd.) and 0.4 parts of "ADEKA STAB 260" (trade name, Asahi Denka Co., Ltd.).

Example 11

A pellet was prepared as described in Example 8.
The pellet was dried at 80° C. for a whole day and a night, and then melt-extruded through a T-die using a 40 mm ϕ non-bent screw type extruder (L/D=26) equipped with the T-die with a width of 300 mm under the conditions of cylinder temperature: 180 to 240° C. and T-die temperature: 240° C. The resin was sandwiched between a mirror roll for cooling (a chromium-plated roll with a surface roughness of 0.2 S) whose temperature was controlled at 75° C. and a silicone rubber roll containing 50 parts of alumina with an average particle size of 40 μm to form a film of an acrylic resin film material (A) with a thickness of 125 μm. When using the film of Example 11, no printing defects were observed.

Example 12

A mixture [resin composition (IV-5)] was prepared and an acrylic resin film material (A) was formed as described in Example 9, using, as additives, 2.1 parts of "ADEKA STAB LA-31" (trade name, Asahi Denka Co., Ltd.), 0.1 parts of "ADEKA STAB AO-50" (trade name, Asahi Denka Co., Ltd.) and 0.3 parts of "ADEKA STAB LA-57" (trade name, Asahi Denka Co., Ltd.).

Example 13

A mixture of 70 parts of the multilayer structure polymer (I-1), 20 parts of the thermoplastic polymer (II-2) [MMA/MA copolymer (MMA/MA=90/10 (by weight), reduced viscosity ηsp/c=0.056 L/g)], 10 parts of hydroxy-containing polymer (V-1) and as additives, 3 parts of the thermoplastic polymer (VII-1), 1.4 parts of "Tinuvin 234" (trade name, Ciba Specialty Chemicals), 0.1 parts of "ADEKA STAB AO-60" (trade name, Asahi Denka Co., Ltd.), 0.3 parts of "ADEKA STAB LA-67" (trade name, Asahi Denka Co., Ltd.) and 0.3 parts of "JP333E" (trade name, Johoku Chemical Co. Ltd.) was mixed using Henschell mixer. The mixture [resin composition (IV-6)] was placed in a degassing type extruder (Ikegai Iron Works, PCM-30 (trade name)) at 230° C., and kneaded into a pellet. Then, an acrylic resin film material (A) was formed as described in Example 11, except the pellet of the mixture [resin composition (IV-6)] was used. When using the film of Example 13, no printing defects were observed.

Example 14

A mixture [resin composition (IV-7)] was prepared and an acrylic resin film material (A) was formed as described in Example 13, except that a mixing rate of the multilayer structure polymer (I-1) and the thermoplastic polymer (II-2) was 65 parts of the multilayer structure polymer (I-1) and 25 parts of the thermoplastic polymer (II-2). When using the film of Example 14, no printing defects were observed.

Example 15

Using an ABS resin (UMG ABS Inc., trade name "Diapet ABS SW7") as a thermoplastic resin layer (C), melt extrusion was effected via a T-die using a 40 mm ϕ non-bent screw type extruder (L/D=26) with a 400-mesh screen mesh equipped with the T-die with a width of 300 mm under the conditions of cylinder temperature: 180° C. to 220° C. and T-die temperature: 230° C. The extruded resin was formed into a thermoplastic resin film (C) with a thickness of 125 μm through three polishing rolls whose temperature was controlled at 75° C.
Next, on the surface of the acrylic resin film material (A) prepared in Example 13 which had been in contact with the mirror roll, a silver metallic tone was printed to form a decorative layer (B). The printed acrylic resin film material (A) was thermally laminated on the above thermoplastic resin film via an embossed roll, such that the thermoplastic resin film layer became in contact with the decorative layer.

Example 16

A laminate film was formed as described in Example 15, except that the acrylic resin film material (A) prepared in Example 8 was used.

Comparative Example 4

An acrylic resin film material (A) was formed as described in Example 7, using a mixture [resin composition (IV-8)] of 100 parts of the multilayer structure polymer (I-3), 10 parts of the hydroxy-containing polymer (V-1) and as additives, 2.1 parts of "ADEKA STAB LA-31" (trade name, Asahi Denka Co., Ltd.), 0.1 parts of "ADEKA STAB A0-50" (trade name, Asahi Denka Co., Ltd.) and 0.3 parts of "ADEKA STAB LA-57" (trade name, Asahi Denka Co., Ltd.).

Comparative Example 5

An acrylic resin film material (A) was formed as described in Example 7, using a mixture [resin composition (IV-9)] of 16 parts of the multilayer structure polymer (I-5), 84 parts of the thermoplastic polymer (II-1), 10 parts of the hydroxy-containing polymer (V-1) and as additives, 2.1 parts of "ADEKA STAB LA-31" (trade name, Asahi Denka Co., Ltd.), 0.1 parts of "ADEKA STAB AO-50" (trade name, Asahi Denka Co., Ltd.) and 0.3 parts of "ADEKA STAB LA-57" (trade name, Asahi Denka Co., Ltd.).

Example 17

An acrylic resin laminate film was formed using the pellet obtained in Example 1 (resin composition (III-1)) as an acrylic resin film material (A) and the pellet obtained in Comparative Example 3 (resin composition (III-9), although 2.7 parts of "Tinuvin 234" (trade name, Ciba Specialty Chemicals) was substituted for 2.1 parts of "ADEKA STAB LA31" (trade name, Asahi Denka Co., Ltd.)) as an acrylic resin film material (A'-a).
Specifically, the pellets were dried at 80° C. for a whole day and a night, and were co-extruded using a 65 mm ϕ non-bent screw uniaxial extruder, a 40 mm ϕ non-bent screw uniaxial extruder and a multi-manifold type dice with a width of 300 mm, respectively, under the conditions of cylinder temperature: 180 to 240° C. and T-die temperature: 240° C. to prepare an acrylic resin laminate film with a total thickness of 125 μm, in which the acrylic resin film material (A'-a) in the surface layer had a thickness of 10 μm and the acrylic resin film material (A) in the layer underneath the surface layer had a thickness of 115 μm. The acrylic resin film material (A) and the acrylic resin film material (A'-a) were extruded using a 65 mm φ and a 40 mm φ extruders, respectively.

Examples 18 to 20

An acrylic resin laminate film was formed as described in Example 17, using the pellets prepared in Examples 2 to 4 (resin compositions (III-2) to (III-4)) as an acrylic resin film material (A).

Example 21

An acrylic resin laminate film was formed as described in Example 18, except that the multilayer structure polymer (I-1) and the thermoplastic polymer (II-1) were mixed in a rate shown in Table 7 and that the pellet prepared as described in Example 1 (resin composition (II-A'-1)) was used as an acrylic resin film material (A'-a).

Example 22

An acrylic resin laminate film was formed as described in Example 18, using an acrylic resin "Acrypet MD" (trade name, Mitsubishi Rayon Co. Ltd.) as an acrylic resin film material (A'-a). The acrylic resin film material (A'-a) exhibited a pencil hardness of 3H when it alone was formed into a film with a thickness of 125 μm.

Example 23

An acrylic resin laminate film was formed as described in Example 17, substituting a vinylidene fluoride polymer "HYLAR460" (trade name, Solvay Solexis Inc.) as a fluororesin film material (A") for the acrylic resin film material (A'-a).

Comparative Example 6

The process in Example 17 was conducted, except that the pellet prepared in Comparative Example 3 (resin composition (III-9), although 2.7 parts of "Tinuvin 234" (trade name, Ciba Specialty Chemicals) was substituted for 2.1 parts of "ADEKA STAB LA31" (trade name, Asahi Denka Co., Ltd.)) as an acrylic resin film material (A'-a); and the pellet prepared in Comparative Example 1 (resin composition (III-7)) as an acrylic resin film material (A'-b) was used and each layer had a thickness shown in Table 8. The acrylic resin film material (A'-b) and the acrylic resin film material (A'-a) were extruded using a 65 mm φ and a 40 mm φ extruders, respectively.

Comparative Example 7

The process of Example 1 was conducted, except that the multilayer structure polymer (I-6) and the thermoplastic polymer (II-3) [MMA/n-BA copolymer (MMA/n-BA=77/23 (by weight), reduced viscosity ηsp/c=0.08 L/g)] were mixed with a rate shown in Table 7; to the mixture were added, as additives, 1.5 parts of "ADEKA STAB LA-31" (trade name, Asahi Denka Co., Ltd.), 0.1 parts of "ADEKA STAB AO-50" (trade name, Asahi Denka Co., Ltd.), 0.3 parts of "ADEKA STAB LA-57" (trade name, Asahi Denka Co., Ltd.) and 2 parts of "polyethyleneglycol PEG20000" (trade name, Sanyo Chemical Industries, Ltd.); and then the mixture was mixed using Henschell mixer, to prepare a pellet for an acrylic resin film material (A'-b) (resin composition (II-A'-2)). The process of Comparative Example 6 was conducted, except that the pellet was used.

Comparative Example 8

The process of Comparative Example 6 was conducted, except that the pellet prepared in Comparative Example 2 (resin composition (III-8)) was used as an acrylic resin film material (A'-b).

Comparative Example 9

A pellet for an acrylic resin film material (A'-b) (resin composition (II-A'-3)) was prepared as described in Example 1, except that the multilayer structure polymer (I-4) and the thermoplastic polymer (II-3) were mixed in a rate shown in Table 7.

The process of Comparative Example 6 was conducted, except that this pellet was used as an acrylic resin film material (A'-b).

Comparative Example 10

The process of Comparative Example 3 was conducted, except that an acrylic resin film material with a thickness of 125 μm was formed using the pellet prepared in Comparative Example 3 (resin composition (III-9), although 2.7 parts of "Tinuvin 234" (trade name, Ciba Specialty Chemicals).

Comparative Example 11

An acrylic resin laminate film was formed as described in Comparative Example 6, except that an acrylic resin "Acrypet MD" (trade name, Mitsubishi Rayon Co. Ltd.) was used as an acrylic resin film material (A'-a).

Comparative Example 12

An acrylic resin laminate film was formed as described in Comparative Example 6, substituting a vinylidene fluoride polymer "HYLAR460" (trade name, Solvay Solexis Inc.) as a fluororesin film material (A") for the acrylic resin film material (A'-a).

Example 24

A photocurable resin solution was applied on the acrylic resin film material (A) prepared in Example 1 with an application width of 250 mm by a Comma roll coater. Then, it was passed through a tunnel type drying oven (width: 800 mm, height: 100 mm, length: 8 m; divided into four drying zones (one zone had a length of 2 m) and hot air was fed as a countercurrent flow to the movement of the sheet) set at the temperature condition shown in Table 2 at a rate of 10 m/min for evaporating the solvent to form a photocurable resin (Z) layer. Table 2 also shows a residual time in each drying zone.

TABLE 2

|  | Drying zone 1 | Drying zone 2 | Drying zone 3 | Drying zone 4 |
|---|---|---|---|---|
| Temperature (° C.) | 50 | 60 | 80 | 100 |
| Residual time (sec) | 12 | 12 | 12 | 12 |

Then, it was slitted into a width of 200 mm and then wound on an ABS core as a roll with a length of 20 m.

The photocurable acrylic resin film was placed in a mold such that the photocurable resin composition faced the internal wall of the mold. The photocurable acrylic resin film was pre-heated by an infrared heater at 350° C. for 10 sec. Then, while being vacuumed, it was further heated to make the photocurable acrylic resin film follow the mold shape. This mold had a shape of truncated pyramid with a truncated surface size of 100 mm×100 mm, a bottom size of 108 mm×117 mm, a depth of 10 mm and curvature radii at the edges in the truncated surface of 3, 5, 7 and 10 mm, respectively. Mold followingness was visually evaluated and all edges satisfactorily followed.

Next, insert molding was effected using a polycarbonate resin as a molding resin under the conditions of molding temperature: 280 to 300° C. and mold temperature: 40 to 60° C., to prepare a laminate molded item in which the photocurable acrylic resin film tightly adhering to the surface of the molded item.

Then, the photocurable resin composition was cured by irradiating it with UV rays at about 700 mJ/cm$^2$ using an UV irradiator and the physical properties of the surface of the laminate molded item were evaluated.

Example 25

The process of Example 24 was conducted except that the acrylic resin film material (A) prepared in Example 2 was used.

Example 26

The process of Example 24 was conducted except that the acrylic resin film material (A) prepared in Example 3 was used.

Example 27

The process of Example 24 was conducted except that the acrylic resin film material (A) prepared in Example 4 was used.

Example 28

Using an ABS resin (UMG ABS Inc., trade name "Diapet ABS SW7") as a thermoplastic resin layer (C), melt extrusion was effected via a T-die using a 40 mm φ non-bent screw type extruder (L/D=26) with a 400-mesh screen mesh equipped with the 300 mm T-die under the conditions of cylinder temperature: 180° C. to 220° C. and T-die temperature: 230° C. The extruded resin was formed into a thermoplastic resin film with a thickness of 200 μm through three polishing rolls whose temperature was controlled at 75° C.

A silver metallic decorative layer (B) was formed on the side of the acrylic resin film material (A) in the photocurable acrylic resin film obtained in Example 26 by gravure printing. A thermoplastic resin film was thermally laminated on the side of the decorative layer (B) in this photocurable acrylic resin film to obtain a photocurable laminate film.

Using the photocurable laminate film, insert molding was conducted as described in (9) in the section of "Determination and evaluation of physical properties" to prepare a laminate molded item.

Subsequently, the photocurable resin composition was cured by irradiating it with UV rays at about 700 mJ/cm$^2$ using an UV irradiator to prepare a laminate molded item.

The laminate molded item obtained had a print pattern and exhibited a good design.

Comparative Example 13

The process of Example 24 was conducted, except that the acrylic resin film material (A) obtained in Comparative Example 2 was used.

Comparative Example 14

The process of Example 24 was conducted, except that the acrylic resin film material (A) obtained in Comparative Example 3 was used.

Example 29

A woodgrain and a jet-black patterns were formed as a decorative layer (B) on the acrylic resin film material (A) prepared in Example 1 by gravure printing. Finally, it was placed via a heat roll such that the decorative layer (B) comes in contact with the thermoplastic resin film (C) prepared in Example 15, and then thermally laminated to obtain a laminate film.

Examples 30 to 33

The process of Example 29 was conducted, except that the acrylic resin film materials (A) prepared in Examples 2 to 5 were used.

Example 34

A woodgrain and a jet-black patterns were formed as a decorative layer (B) on the thermoplastic resin film (C) prepared in Example 15 by gravure printing. Finally, it was placed via a heat roll such that the decorative layer (B) comes in contact with the acrylic resin film material (A) prepared in Example 3, and then thermally laminated to obtain a laminate film.

Example 35

The process of Example 31 was conducted, except that a laminate molded item was prepared by in-mold molding as described in (8) in the section of "Determination and evaluation of physical properties".

Example 36

The process of Example 29 was conducted, except that the acrylic resin film material (A) prepared in Example 6 was used.

The decorative layer (B) was satisfactorily formed without any printing defect.

Comparative Examples 15 to 17

The process of Example 29 was conducted, except that the acrylic resin film materials (A) prepared in Comparative Examples 1 to 3 were used.

Example 37

A decorative layer (B) (woodgrain and jet-black pattern) was formed on the surface of a colored random polypropylene resin film (Riken Vinyl Industry Co. Ltd.) with a thickness of 90 μm as a thermoplastic resin layer (C), by gravure printing using two-liquid-curable type urethane resin ink "Lamister" (trade name, Toyo Ink Mfg. Co., Ltd.) containing 3 wt % of an isocyanate curing agent in a polyester polyol vehicle. Then, on the print surface was applied an acryl-polyester-vinyl chloroacetate hot-gluing resin by gravure coating such that an application amount is 1.5 g/m² after drying, to form an adhesive layer (D). Then, on the adhesive layer was thermally laminated the acrylic resin film material (A) as prepared in Example 1 with a thickness of 50 μm as a surface protective layer under at a film surface temperature of 120° C. The film was embossed with a pipe pattern by a metal emboss roll at a surface temperature of 180° C. to provide a construction laminate film. Then, the construction laminate film was spray-coated with an aqueous two-liquid urethane adhesive as an adhesive (D) in an application amount of 10 g/m² after drying. It was laminated on a dried polyester resin three-dimensional base having a curvature radius of 0.5 R at a construction laminate film temperature of 80° C. to provide a three-dimensional laminate molded item.

Examples 38 to 40

The process of Example 37 was conducted, except that the acrylic resin film materials (A) with a thickness of 50 μm prepared as described in Examples 2 to 4 were used.

Comparative Examples 18 to 20

The process of Example 37 was conducted, except that the acrylic resin film materials (A) with a thickness of 50 μm prepared as described in Comparative Examples 1 to 3 were used.

Example 41

The process of Example 1 was conducted, substituting the multilayer structure polymer (I-7) for the multilayer structure polymer (I-1).

Examples 42 to 46

The process of Example 41 was conducted, substituting each of the multilayer structure polymers (I-8) to (I-12) for the multilayer structure polymer (1-7).

Examples 47 and 48

The process of Example 2 was conducted, except that a mixing ratio of the multilayer structure polymer (I-1) and the thermoplastic polymer (II-1) was changed as shown in Table 12.

Examples 49 and 50

The process of Example 3 was conducted, substituting each of 2.5 parts of "Tinuvin 329" (trade name, Ciba Specialty Chemicals) (Example 49) and 1.0 part of "Tinuvin 1577" (trade name, Ciba Specialty Chemicals) (Example 50) for 2.7 parts of "Tinuvin 234" (trade name, Ciba Specialty Chemicals) as one of the additives.

Example 51

The process of Example 6 was conducted, omitting "ADEKA STAB LA-67" (trade name, Asahi Denka Co., Ltd.) as one of the additives.

Comparative Examples 21 to 24

The process of Example 1 was conducted, substituting the multilayer structure polymers (I-13) to (I-16) for the multilayer structure polymer (I-1).

Examples 52 to 59

The processes of Examples 41 and 48 were conducted, except that 10 parts of the hydroxy-containing polymer (V-1) was further added during blending.

Examples 60 and 61

The process of Example 13 was conducted, except that with an amount shown in Table 15, the hydroxy-containing polymer (V-1) was replaced with "Eposter MA1004" (trade name, Nippon Shokubai Co., Ltd.) as a PMMA crosslinking particle and 0.3 parts of "JP333E" (trade name, Johoku Chemical Co. Ltd.) was absent.

Comparative Examples 25 to 28

The processes of Comparative Examples 21 to 24 were conducted, except that 10 parts of the hydroxy-containing polymer (V-1) was further added during blending.

Table 3 shows the compositions and the gel contents of the resin components in the resin compositions (III) [resin compositions (III-1 to 9)] used in Examples 1 to 6 and Comparative Examples 1 to 3. Table 4 shows the evaluation results for the acrylic resin film materials (A) and the laminate molded items obtained.

TABLE 3

| | Resin composition (III) | Amount of a multilayer structure polymer (part) | | | | | Amount of a thermoplastic polymer (II-1) (part) | Gel content of a resin composition (III) (%) |
|---|---|---|---|---|---|---|---|---|
| | | I-1 | I-2 | I-3 | I-4 | I-5 | | |
| Example 1 | III-1 | 100 | | | | | | 70 |
| Example 2 | III-2 | 90 | | | | | 10 | 63 |
| Example 3 | III-3 | 75 | | | | | 25 | 52.5 |
| Example 4 | III-4 | | | 90 | | | 10 | 63 |
| Example 5 | III-5 | | | 75 | | | 25 | 52.5 |

TABLE 3-continued

| | Resin composition | Amount of a multilayer structure polymer (part) | | | | | Amount of a thermoplastic polymer (II-1) | Gel content of a resin composition (III) |
|---|---|---|---|---|---|---|---|---|
| | (III) | I-1 | I-2 | I-3 | I-4 | I-5 | (part) | (%) |
| Example 6 | III-6 | 75 | | | | | 25 | 52 |
| Comp. Exam. 1 | III-7 | | 100 | | | | | 60 |
| Comp. Exam. 2 | III-8 | | | 32 | | | 68 | 27 |
| Comp. Exam. 3 | III-9 | | | | 16 | | 84 | 14 |

TABLE 4

| | Evaluation results for an acrylic resin film material (A) | | | | | | Evaluation results for a laminate molded item | |
|---|---|---|---|---|---|---|---|---|
| | | Tensile | Before test | | After test | | | |
| | Pencil hardness | test conditions | Gloss (%) | Haze (%) | Gloss (%) | Haze differ. (%) | HDT (° C.) | Pencil hardness | Excoriation resistance |
| Exam. 1 | HB | a | 151 | 0.5 | 0.5 | 0 | 83 | HB | Δ |
| | | b | | | 1.4 | 0.9 | | | |
| Exam. 2 | F | a | 153 | 0.5 | 0.6 | 0.1 | 87 | F | ○ |
| | | b | | | 1.5 | 1.0 | | | |
| Exam. 3 | H | a | 153 | 0.5 | 4.4 | 3.9 | 90 | H | ○ |
| | | b | | | 14.6 | 14.1 | | | |
| Exam. 4 | H | a | 153 | 0.5 | 0.8 | 0.3 | 92 | H | ○ |
| | | b | | | 2.3 | 1.8 | | | |
| Exam. 5 | H | a | 153 | 0.5 | 4.5 | 4.0 | 90 | H | ○ |
| | | b | | | 14.4 | 13.9 | | | |
| Exam. 6 | H | a | 153 | 0.4 | 4.3 | 3.9 | 90 | H | ○ |
| | | b | | | 14.5 | 14.1 | | | |
| Comp. Exam. 1 | 4B | a | 143 | 0.7 | 0.9 | 0.2 | 79 | 4B | X |
| | | b | | | 5.3 | 4.6 | | | |
| Comp. Exam. 2 | HB | a | 150 | 0.6 | 37.2 | 36.6 | 92 | HB | Δ |
| | | b | | | 68.4 | 67.8 | | | |
| Comp. Exam. 3 | 2H | a | 140 | 2.2 | 98.7 | 96.5 | 100 | 2H | ○ |
| | | b | | | Not measurable due to film breakage | | | | |

| | Evaluation results for a laminate molded item | | | | | | | | | |
|---|---|---|---|---|---|---|---|---|---|---|
| | Molding whitening resistance | | | | | | | | | |
| | Woodgrain | | | Jet-black | | | Heat- | Aromatic | Appearance | |
| | Whitening | Crack | Gate print status | Whitening | Crack | Gate print status | aging resistance | substance resistance | Wood-grain | Jet-black |
| Exam. 1 | ○ | ○ | ○ | ○ | ○ | ○ | ○ | ○ | ○ | Δ |
| Exam. 2 | ○ | ○ | ○ | ○ | ○ | ○ | ○ | ○ | ○ | Δ |
| Exam. 3 | ○ | ○ | ○ | Δ | ○ | ○ | ○ | ○ | ○ | Δ |
| Exam. 4 | ○ | ○ | ○ | ○ | ○ | ○ | ○ | ○ | ○ | Δ |
| Exam. 5 | ○ | ○ | ○ | Δ | ○ | ○ | ○ | X | ○ | Δ |
| Exam. 6 | ○ | ○ | ○ | Δ | ○ | ○ | ○ | ○ | ○ | ○ |
| Comp. Exam. 1 | ○ | ○ | X | ○ | ○ | X | X | X | Δ | X |
| Comp. Exam. 2 | X | ○ | X | X | ○ | X | ○ | X | Δ | X |
| Comp. Exam. 3 | X | X | X | X | X | X | ○ | X | X | X |

Tensile test conditions:
a: width: 20 mm, film thickness: 125 μm, initial inter-chuck distance: 25 mm, end-point inter-chuck distance: 33 mm, speed: 50 mm/min, temperature: 23° C.
b: width: 20 mm, film thickness: 125 μm, initial inter-chuck distance: 25 mm, end-point inter-chuck distance: 33 mm, speed: 300 mm/min, temperature: 15° C.

Table 5 shows the compositions and the gel contents of the resin components in the resin compositions (IV) [resin compositions (IV-1 to IV-9)] used in Examples 7 to 16 and Comparative Examples 4 and 5. Table 6 shows the evaluation results for the acrylic resin film materials (A) and the laminate molded items obtained.

TABLE 5

| | Resin composition (IV) | Amount of a multilayer structure polymer (part) I-1 | Amount of a multilayer structure polymer (part) I-3 | Amount of a multilayer structure polymer (part) I-5 | Amount of a thermoplastic polymer (II-1) (part) | Amount of a thermoplastic polymer (II-2) (part) | Hydroxy-containing polymer (V) | Gel content of a resin composition (IV) (%) |
|---|---|---|---|---|---|---|---|---|
| Example 7 | IV-1 | 100 | | | | | 10 | 64 |
| Example 8 | IV-2 | 90 | | | 10 | | 10 | 57 |
| Example 9 | IV-3 | 75 | | | 25 | | 10 | 48 |
| Example 10 | IV-4 | 90 | | | 10 | | 10 | 58 |
| Example 11 | IV-2 | 90 | | | 10 | | 10 | 58 |
| Example 12 | IV-5 | 75 | | | 25 | | 10 | 48 |
| Example 13 | IV-6 | 70 | | | | 20 | 10 | 47 |
| Example 14 | IV-7 | 65 | | | | 25 | 10 | 43 |
| Example 15 | IV-6 | 70 | | | | 20 | 10 | 47 |
| Example 16 | IV-2 | 90 | | | 10 | | 10 | 57 |
| Comp. Exam. 4 | IV-8 | | 100 | | | | 10 | 54 |
| Comp. Exam. 5 | IV-9 | | | 16 | 84 | | 10 | 13 |

TABLE 6

| | Acrylic resin film material (A) | | | | | | | Evaluation results for a laminate molded item | | | | | |
|---|---|---|---|---|---|---|---|---|---|---|---|---|---|
| | | | Before test | | After test | | | | Molding whitening resistance | | | | |
| | | | | | Haze | | | | | Woodgrain | | | |
| | Pencil hardness | Tensile test conditions | Gloss (%) | Haze (%) | Gloss (%) | Differ. (%) | HDT (° C.) | Pencil hardness | Excoriation resistance | Whitening | Crack | Gate print status | Heat-aging resistance | Aromatic substance resistance |
| Exam. 7 | HB | a | 18 | 50 | 51 | 1 | 83 | HB | Δ | ○ | ○ | ○ | ○ | ○ |
| Exam. 8 | F | a | 22 | 38 | 41 | 3 | 87 | F | ○ | ○ | ○ | ○ | ○ | ○ |
| Exam. 9 | H | a | 29 | 29 | 40 | 11 | 90 | H | ○ | ○ | ○ | ○ | ○ | ○ |
| Exam. 10 | F | a | 19 | 45 | 48 | 3 | 87 | F | ○ | ○ | ○ | ○ | ○ | ○ |
| Exam. 11 | F | a | 9 | 77 | 79 | 2 | 87 | F | ○ | ○ | ○ | ○ | ○ | ○ |
| Exam. 12 | H | a | 29 | 29 | 40 | 11 | 90 | H | ○ | ○ | ○ | ○ | ○ | X |
| Exam. 13 | H | a | 20 | 44 | 53 | 9 | 87 | H | ○ | ○ | ○ | ○ | ○ | ○ |
| Exam. 14 | H | a | 24 | 35 | 57 | 12 | 85 | H | ○ | ○ | ○ | ○ | ○ | ○ |
| Exam. 15 | H | a | 20 | 44 | 53 | 9 | 87 | H | ○ | ○ | ○ | ○ | ○ | ○ |
| Exam. 16 | F | a | 22 | 38 | 41 | 3 | 87 | F | ○ | ○ | ○ | ○ | ○ | ○ |
| Comp. Exam. 4 | 4B | a | 17 | 54 | 57 | 3 | 79 | 4B | X | ○ | ○ | X | X | X |
| Comp. Exam. 5 | 2H | a | 20 | 43 | 98 | 55 | 100 | 2H | ○ | X | X | X | ○ | X |

Tensile test conditions:
a: width: 20 mm, film thickness: 125 μm, initial inter-chuck distance: 25 mm, end-point inter-chuck distance: 33 mm, speed: 50 mm/min, temperature: 23° C.
Molding whitening resistance: evaluated a silver metallic decorative pattern for Examples 15 and 16.

Table 7 shows the resin component compositions, the gel contents and the bend elastic constants of the resin compositions (III-1 to III-4) and (III-7 to III-9) and of the resin compositions (III-A'-1 to III-A'-3), as well as the evaluation results of the acrylic resin film materials (A) prepared using thereof. Table 8 shows the types of the film materials used for the acrylic resin laminate films and the evaluation results of the laminate molded items prepared.

TABLE 7

| Resin composition (III) | Amount of a multilayer structure polymer (I) (part) | | | | | | Amount of a thermoplastic polymer (part) | | Gel content (%) | Bend elastic constant (GPa) | Pencil hardness | Tensile test conditions | Evaluation results as an acrylic resin film material (A) | | | | HDT (°C) |
|---|---|---|---|---|---|---|---|---|---|---|---|---|---|---|---|---|---|
| | | | | | | | | | | | | | Before test | | After test | | |
| | I-1 | I-2 | I-3 | I-4 | I-5 | I-6 | II-1 | II-3 | | | | | Gloss (%) | Haze (%) | Haze (%) | Haze differ. (%) | |
| III-1 | 100 | | | | | | | | 70 | 1.7 | HB | a | 151 | 0.5 | 0.5 | 0 | 83 |
| | | | | | | | | | | | | b | | | 1.4 | 0.9 | |
| III-2 | 90 | | | | | | 10 | | 63 | 1.8 | F | a | 153 | 0.5 | 0.6 | 0.1 | 87 |
| | | | | | | | | | | | | b | | | 1.5 | 1 | |
| III-3 | 75 | | | | | | 25 | | 52.5 | 1.9 | H | a | 153 | 0.5 | 4.4 | 3.9 | 90 |
| | | | | | | | | | | | | b | | | 14.6 | 14.1 | |
| III-4 | | 90 | | | | | 10 | | 63 | 1.8 | H | a | 153 | 0.5 | 0.8 | 0.3 | 92 |
| | | | | | | | | | | | | b | | | 2.3 | 1.8 | |
| III-7 | | | 100 | | | | | | 60 | 1.4 | 4B | a | 143 | 0.7 | 0.9 | 0.2 | 79 |
| | | | | | | | | | | | | b | | | 5.3 | 4.6 | |
| III-8 | | | | 32 | | | 68 | | 27 | 2.5 | HB | a | 150 | 0.6 | 37.2 | 36.6 | 92 |
| | | | | | | | | | | | | b | | | 68.4 | 67.8 | |
| III-9 | | | | | 16 | | 84 | | 14 | 2.9 | 2H | a | 140 | 2.2 | 98.7 | 96.5 | 100 |
| | | | | | | | | | | | | b | | | Not measurable due to film breakage | | |
| III-A'-1 | 33 | | | | | | 67 | | 23 | 2.9 | 2H | a | 155 | 0.5 | 51.3 | 50.8 | 98 |
| | | | | | | | | | | | | b | | | Not measurable due to film breakage | | |
| III-A'-2 | | | | | 80 | | 20 | | 60 | 1.1 | 5B | a | 144 | 1.0 | 1.3 | 0.3 | 70 |
| | | | | | | | | | | | | b | | | 5.9 | 4.9 | |
| III-A'-3 | | | | | | 65 | 35 | | 55 | 1.1 | 4B | a | 148 | 0.8 | 39.6 | 38.8 | 72 |
| | | | | | | | | | | | | b | | | 73.4 | 72.6 | |

Tensile test conditions:
a: width: 20 mm, film thickness: 125 μm, initial inter-chuck distance: 25 mm, end-point inter-chuck distance: 33 mm, speed: 50 mm/min, temperature: 23° C.
b: width: 20 mm, film thickness: 125 μm, initial inter-chuck distance: 25 mm, end-point inter-chuck distance: 33 mm, speed: 300 mm/min, temperature: 15° C.
Evaluation of an acrylic resin film material (A): conducted for a film formed to a thickness of 125 μm.

TABLE 8

| | | Acrylic resin film material (A) | | Acrylic resin film material (A') | | | | Fluororesin film material | |
|---|---|---|---|---|---|---|---|---|---|
| | | | | (A'-a) | | (A'-b) | | (A")*1 | |
| | | Resin composition (III) | Thickness (μm) | Resin composition (III) or trade name | Thickness (μm) | Resin composition (III) | Thickness (μm) | Trade name | Thickness (μm) |
| Exam. | 17 | III-1 | 115 | III-9*2 | 10 | | | | |
| | 18 | III-2 | 115 | III-9*2 | 10 | | | | |
| | 19 | III-3 | 115 | III-9*2 | 10 | | | | |
| | 20 | III-4 | 115 | III-9*2 | 10 | | | | |
| | 21 | III-2 | 115 | III-A'-1 | 10 | | | | |
| | 22 | III-2 | 115 | Mitsubishi Rayon "Acrypet MD", pencil hardness: 3H | 10 | | | | |
| | 23 | III-1 | 115 | | | | | Solvay Solexis, "HYLAR460", pencil hardness: 4B | 10 |
| Comp. Exam. | 6 | | | III-9*2 | 10 | III-7 | 115 | | |
| | 7 | | | III-9*2 | 10 | III-A'-2 | 115 | | |
| | 8 | | | III-9*2 | 10 | III-8 | 115 | | |
| | 9 | | | III-9*2 | 10 | III-A'-3 | 115 | | |
| | 10 | | | III-9*2 | 125 | | | | |
| | 11 | | | Mitsubishi Rayon "Acrypet MD", pencil hardness: 3H | 10 | III-7 | 115 | | |

TABLE 8-continued

| | | | | | | |
|---|---|---|---|---|---|---|
| 12 | | | III-7 | 115 | Solvay Solexis, "HYLAR460", pencil hardness: 4B | 10 |

| | | Evaluation results of a laminate molded item | | | | | |
|---|---|---|---|---|---|---|---|
| | | Molding whitening resistance | | | | Pencil hardness | Excoriation resistance | Heat-aging resistance |
| | | Woodgrain | | Jet-black | | | | |
| | | Whitening | Crack | Whitening | Crack | | | |
| Exam. | 17 | ○ | ○ | Δ | ○ | F | ○ | ○ |
| | 18 | ○ | ○ | Δ | ○ | H | ○ | ○ |
| | 19 | ○ | ○ | X | ○ | 2H | ○ | ○ |
| | 20 | ○ | ○ | Δ | ○ | 2H | ○ | ○ |
| | 21 | ○ | ○ | ○ | ○ | H | ○ | ○ |
| | 22 | ○ | X | ○ | X | 2H | ○ | ○ |
| | 23 | ○ | ○ | ○ | ○ | 2B | ○ | ○ |
| Comp. Exam. | 6 | ○ | ○ | Δ | ○ | 2B | Δ | X |
| | 7 | ○ | ○ | Δ | ○ | 3B | X | X |
| | 8 | X | ○ | X | ○ | F | ○ | ○ |
| | 9 | X | ○ | X | ○ | 2B | Δ | X |
| | 10 | X | X | X | X | 2H | ○ | ○ |
| | 11 | ○ | X | ○ | X | B | Δ | X |
| | 12 | ○ | ○ | ○ | ○ | 4B | X | X |

*[1] used in place of an acrylic resin film material(A'-a).
*[2] 2.1 parts of "ADEKA STAB LA31" (trade name, Asahi Denka Co., Ltd.) was replaced with 2.7 parts of "Tinuvin 234" (trade name, Ciba Specialty Chemicals).

Table 9 shows the evaluation results of the acrylic resin film materials (A), the photocurable acrylic resin films and the laminate molded items prepared in Examples 24 to 28 and Comparative Examples 13 and 14.

TABLE 9

| | | Evaluation results for an acrylic resin film material (A) | | | | | | Evaluation results for a photocurable acrylic resin film Molding whitening resistance | | | |
|---|---|---|---|---|---|---|---|---|---|---|---|
| | | Tensile test conditions | Before test Haze (%) | After test | | Pencil hardness | HDT (°C.) | Woodgrain | | Jet-black | |
| | | | | Haze (%) | Haze differ. (%) | | | Whitening | Crack | Whitening | Crack |
| Exam. 24 | | a | 0.5 | 0.5 | 0 | HB | 83 | ○ | ○ | ○ | ○ |
| | | b | | 1.4 | 0.9 | | | | | | |
| Exam. 25 | | a | 0.5 | 0.6 | 0.1 | F | 87 | ○ | ○ | ○ | ○ |
| | | b | | 1.5 | 1.0 | | | | | | |
| Exam. 26 | | a | 0.5 | 4.4 | 3.9 | H | 90 | ○ | ○ | Δ | ○ |
| | | b | | 14.6 | 14.1 | | | | | | |
| Exam. 27 | | a | 0.5 | 0.8 | 0.3 | H | 92 | ○ | ○ | ○ | ○ |
| | | b | | 2.3 | 1.8 | | | | | | |
| Exam. 28 | | a | 0.5 | 4.4 | 3.9 | H | 90 | ○ | ○ | — | — |
| | | b | | 14.6 | 14.1 | | | | | | |
| Comp. Exam. 13 | | a | 0.6 | 37.2 | 36.6 | HB | 92 | X | ○ | X | ○ |
| | | b | | 68.4 | 67.8 | | | | | | |
| Comp. Exam. 14 | | a | 2.2 | 98.7 | 96.5 | 2H | 100 | X | X | X | X |
| | | b | | Not measurable due to film breakage | | | | | | | |

| | | Evaluation results for a photocurable acrylic resin film | | Evaluation results of a laminate molded item | | | | |
|---|---|---|---|---|---|---|---|---|
| | | Film thickness (μm) | | | | Abrasion resistance (%) | | |
| | | Photo-curable resin (Z) layer | Acrylic resin film (A) layer | Haze (%) | Pencil hardness | 100 times | 500 times | Adhesiveness |
| Exam. 24 | | 6 | 95 | 0.7 | HB | 12 | 24 | ○ |
| Exam. 25 | | 7 | 108 | 0.7 | F | 11 | 19 | ○ |
| Exam. 26 | | 7 | 115 | 0.7 | H | 10 | 17 | ○ |

TABLE 9-continued

| | | | | | | | |
|---|---|---|---|---|---|---|---|
| Exam. 27 | 8 | 119 | 0.7 | H | 9 | 16 | ○ |
| Exam. 28 | 7 | 115 | — | H | — | — | ○ |
| Comp. Exam. 13 | 7 | 118 | 0.7 | HB | 10 | 17 | ○ |
| Comp. Exam. 14 | 8 | 125 | 0.7 | 2H | 9 | 15 | ○ |

Tensile test conditions:

a: width: 20 mm, film thickness: 125 μm, initial inter-chuck distance: 25 mm, end-point inter-chuck distance: 33 mm, speed: 50 mm/min, temperature: 23° C.

b: width: 20 mm, film thickness: 125 μm, initial inter-chuck distance: 25 mm, end-point inter-chuck distance: 33 mm, speed: 300 mm/min, temperature: 15° C.

Molding whitening resistance: evaluated a silver metallic decorative pattern for Example 28.

Evaluation of an acrylic resin film material (A): conducted for a film formed to a thickness of 125 μm.

Table 10 shows the evaluation results of the acrylic resin film materials (A), the laminate films and the laminate molded items prepared in Examples 29 to 36 and Comparative Examples 15 to 17.

TABLE 10

| | Tensile Test conditions | Evaluation results for an acrylic resin film material (A) | | | | Evaluation results for a laminate film Molding whitening resistance | | | | Evaluation results of a laminate molded item | | | |
|---|---|---|---|---|---|---|---|---|---|---|---|---|---|
| | | Before test | | After test | | Woodgrain | | Jet-black | | | | | Aromatic |
| | | Gloss (%) | Haze (%) | Haze (%) | Haze differ. (%) | HDT (° C.) | Whitening | Crack | Whitening | Crack | Pencil hardness | Excoriation resistance | Heat-aging resistance | substance resistance |
| Exam. 29 | a | 151 | 0.5 | 0.5 | 0 | 83 | ○ | ○ | ○ | ○ | HB | Δ | ○ | ○ |
| | b | | | 1.4 | 0.9 | | | | | | | | | |
| Exam. 30 | a | 153 | 0.5 | 0.6 | 0.1 | 87 | ○ | ○ | ○ | ○ | F | ○ | ○ | ○ |
| | b | | | 1.5 | 1 | | | | | | | | | |
| Exam. 31 | a | 153 | 0.5 | 4.4 | 3.9 | 90 | ○ | ○ | Δ | ○ | H | ○ | ○ | ○ |
| | b | | | 14.6 | 14.1 | | | | | | | | | |
| Exam. 32 | a | 153 | 0.5 | 0.8 | 0.3 | 92 | ○ | ○ | ○ | ○ | H | ○ | ○ | ○ |
| | b | | | 2.3 | 1.8 | | | | | | | | | |
| Exam. 33 | a | 153 | 0.5 | 4.5 | 4 | 90 | ○ | ○ | Δ | ○ | H | ○ | ○ | X |
| | b | | | 14.4 | 13.9 | | | | | | | | | |
| Exam. 34 | a | 153 | 0.5 | 4.4 | 3.9 | 90 | ○ | ○ | Δ | ○ | H | ○ | ○ | ○ |
| | b | | | 14.6 | 14.1 | | | | | | | | | |
| Exam. 35 | a | 153 | 0.5 | 4.4 | 3.9 | 90 | ○ | ○ | Δ | ○ | H | ○ | ○ | ○ |
| | b | | | 14.6 | 14.1 | | | | | | | | | |
| Exam. 36 | a | 155 | 0.4 | 4.3 | 3.9 | 90 | ○ | ○ | Δ | ○ | H | ○ | ○ | ○ |
| | b | | | 14.5 | 14.1 | | | | | | | | | |
| Comp. Exam. 15 | a | 143 | 0.7 | 0.9 | 0.2 | 79 | ○ | ○ | ○ | ○ | 4B | X | X | X |
| | b | | | 5.3 | 4.6 | | | | | | | | | |
| Comp. Exam. 16 | a | 150 | 0.6 | 37.2 | 36.6 | 92 | X | ○ | X | ○ | HB | Δ | ○ | X |
| | b | | | 68.4 | 67.8 | | | | | | | | | |
| Comp. Exam. 17 | a | 140 | 2.2 | 98.7 | 96.5 | 100 | X | X | X | X | 2H | ○ | ○ | X |
| | b | | | Not measurable due to film breakage | | | | | | | | | | |

Tensile test conditions:

a: width: 20 mm, film thickness: 125 μm, initial inter-chuck distance: 25 mm, end-point inter-chuck distance: 33 mm, speed: 50 mm/min, temperature: 23° C.

b: width: 20 mm, film thickness: 125 μm, initial inter-chuck distance: 25 mm, end-point inter-chuck distance: 33 mm, speed: 300 mm/min, temperature: 15° C.

Evaluation of an acrylic resin film material (A): conducted for a film formed to a thickness of 125 μm.

Table 11 shows the evaluation results of the acrylic resin film materials (A) and the construction laminate films prepared in Examples 37 to 40 and Comparative Examples 18 to 20.

TABLE 11

| | | Evaluation results for an acrylic resin film material (A) | | | | | | Evaluation results for a construction laminate film | | | | | |
|---|---|---|---|---|---|---|---|---|---|---|---|---|---|
| | | | | After test | | | | Molding whitening resistance | | | | Matte- | |
| | Tensile | Before test | | | Haze | | | Woodgrain | | Jet-black | | reduction | Excoriation |
| | test conditions | Gloss (%) | Haze (%) | Haze (%) | differ. (%) | HDT (° C.) | Pencil hardness | Whitening | Crack | Whitening | Crack | resistance | resistance |
| Exam. 37 | a<br>b | 151 | 0.5 | 0.5<br>1.4 | 0<br>0.9 | 83 | HB | ○ | ○ | ○ | ○ | ○ | Δ |
| Exam. 38 | a<br>b | 153 | 0.5 | 0.6<br>1.5 | 0.1<br>1 | 87 | F | ○ | ○ | ○ | ○ | ○ | ○ |
| Exam. 39 | a<br>b | 153 | 0.5 | 4.4<br>14.6 | 3.9<br>14.1 | 90 | H | ○ | ○ | Δ | ○ | ○ | ○ |
| Exam. 40 | a<br>b | 153 | 0.5 | 0.8<br>2.3 | 0.3<br>1.8 | 92 | H | ○ | ○ | ○ | ○ | ○ | ○ |
| Comp. Exam. 18 | a<br>b | 143 | 0.7 | 0.9<br>5.3 | 0.2<br>4.6 | 79 | 4B | ○ | ○ | ○ | ○ | X | X |
| Comp. Exam. 19 | a<br>b | 150 | 0.6 | 37.2<br>68.4 | 36.6<br>67.8 | 92 | HB | X | ○ | X | ○ | ○ | Δ |
| Comp. Exam. 20 | a<br>b | 140 | 2.2 | 98.7<br>Not measurable due to film breakage | 96.5 | 100 | 2H | X | X | X | X | ○ | ○ |

Tensile test conditions:
a: width: 20 mm, film thickness: 125 μm, initial inter-chuck distance: 25 mm, end-point inter-chuck distance: 33 mm, speed: 50 mm/min, temperature: 23° C.
b: width: 20 mm, film thickness: 125 μm, initial inter-chuck distance: 25 mm, end-point inter-chuck distance: 33 mm, speed: 300 mm/min, temperature: 15° C.
Evaluation of an acrylic resin film material (A): conducted for a film formed to a thickness of 125 μm.

Tables 12 to 14 show the evaluation results of the acrylic resin film materials (A) and the laminate molded items prepared in Examples 1 to 3, 5, 6, 41 to 51 and Comparative Examples 1, 3, 21 to 24.

TABLE 12

| | | | Examples | | | | | | | | | | | | Comparative Examples | | | | |
|---|---|---|---|---|---|---|---|---|---|---|---|---|---|---|---|---|---|---|---|
| | | | 1 | 41 | 42 | 43 | 44 | 45 | 46 | 2 | 3 | 47 | 48 | 1 | 21 | 22 | 23 | 24 |
| Multilayer structure polymer (I) | Type | | I-1 | I-7 | I-8 | I-9 | I-10 | I-11 | I-12 | I-1 | I-1 | I-1 | I-1 | I-3 | I-13 | I-14 | I-15 | I-16 |
| | | (part) | 100 | 100 | 100 | 100 | 100 | 100 | 100 | 90 | 75 | 70 | 55 | 100 | 100 | 100 | 100 | 100 |
| Thermoplastic polymer (II-1) | | (part) | — | — | — | — | — | — | — | 10 | 25 | 30 | 45 | — | — | — | — | — |
| Gel content of a resin composition (III) | | (%) | 70 | 68 | 69 | 70 | 67 | 68 | 69 | 63 | 52.5 | 50 | 38.5 | 60 | 68 | 70 | 68 | 68 |
| Acrylic resin film material (A) | Whole light transmittance | (%) | 92.5 | 92.5 | 92.5 | 92.5 | 92.5 | 92.5 | 92.5 | 92.5 | 92.5 | 92.5 | 92.7 | 92.5 | 92.5 | 92.5 | 92.5 | 92.5 |
| | Haze | (%) | 0.5 | 0.5 | 0.5 | 0.5 | 0.5 | 0.5 | 0.5 | 0.5 | 0.5 | 0.4 | 0.3 | 0.7 | 0.5 | 0.5 | 0.5 | 0.5 |
| | Gloss | (%) | 151 | 151 | 151 | 151 | 151 | 151 | 151 | 153 | 153 | 154 | 155 | 143 | 151 | 151 | 151 | 151 |
| | Film formability | | ○ | ○ | ○ | ○ | ○ | ○ | ○ | ○ | ○ | ○ | ○ | ○ | ○ | Δ | ○ | ○ |
| | Pencil hardness | | HB | B | HB | HB | B | HB | B | F | H | H | 2H | 4B | 3B | F | 3B | F |
| | Bending-whitening resistance | | ◎ | ◎ | ◎ | ◎ | ◎ | ◎ | ◎ | ◎ | ○ | ○ | Δ | ◎ | ◎ | XX | ◎ | X |
| | HDT (° C.) | | 83 | 82 | 83 | 84 | 82 | 85 | 82 | 87 | 90 | 92 | 96 | 79 | 81 | 88 | 79 | 88 |
| Laminate molded item | Excoriation resistance | | Δ | Δ | Δ | Δ | Δ | Δ | Δ | ○ | ○ | ○ | ○ | X | X | ○ | X | ○ |
| | Matte-reduction resistance | | ○ | ○ | ○ | ○ | ○ | ○ | ○ | ○ | ○ | ○ | ○ | X | ○ | ○ | X | ○ |
| | Heat-aging resistance | | ○ | ○ | ○ | ○ | ○ | ○ | ○ | ○ | ○ | ○ | ○ | X | ○ | ○ | X | ○ |

TABLE 13

| | | UV absorbing agent | | Acrylic resin film material (A) | | | | | | Laminate molded item | | Hair dressing resistance | |
|---|---|---|---|---|---|---|---|---|---|---|---|---|---|
| | Type (trade name) | Melting point (° C.) | Whole light transmittance (%) | Haze (%) | Gloss (%) | Film formability | Pencil hardness | Bending whitening resistance | Excoriation resistance | Aromatic substance resistance | Whitening | Irregularity |
| Exam. 3 | Tinuvin 234 | 139 | 92.5 | 0.5 | 153 | ○ | H | ○ | ○ | ○ | ○ | ○ |
| 5 | ADEKA STAB LA-31 | 195 | 92.5 | 0.5 | 153 | ○ | H | ○ | ○ | X | X | ○ |
| 6 | Tinuvin 234 | 139 | 92.5 | 0.5 | 153 | ○ | H | ○ | ○ | ○ | ○ | ○ |
| 49 | Tinuvin 329 | 104 | 92.5 | 0.5 | 153 | ○ | H | ○ | ○ | ○ | ○ | ○ |
| 50 | Tinuvin 1577 | 148 | 92.5 | 0.5 | 153 | ○ | H | ○ | ○ | ○ | ○ | ○ |
| 51 | Tinuvin 234 | 139 | 92.5 | 0.5 | 153 | ○ | H | ○ | ○ | ○ | ○ | X |

In Example 51, the amount of ADEKA STAB LA-67 (trade name, Asahi Denka Co., Ltd.) was 0 wt part.

TABLE 14

| | Acrylic resin film material (A) | | | | | | | | | Laminate molded item | | |
|---|---|---|---|---|---|---|---|---|---|---|---|---|
| | Multilayer structure polymer (I-4) (part) | Thermoplastic Polymer (II-1) (part) | Gel content of a resin composition III (%) | Whole light transmittance (%) | Haze (%) | Gloss (%) | Film formability | Pencil hardness | Bending whitening resistance | HDT (° C.) | Excoriation resistance | Matte-reduction resistance | Heat-aging resistance |
| Comp. Exam. 3 | 16 | 84 | 14 | 92.5 | 2.2 | 140 | ○ | 2H | XX | 100 | ○ | ○ | ○ |

Table 15 shows the compositions and the gel constants of the resin compositions (IV) prepared in Examples 7 to 9 and 52 to 61 and Comparative Examples 4 and 25 to 28, as well as the evaluation results of the acrylic resin film materials (A) and the laminate molded items.

without damage. In the acrylic resin film materials (A) of Examples 1 to 16 showing a difference of 30% or less between haze values as determined in accordance with the testing method of JIS K7136 (haze measurement method) after and before a tensile test where a test piece with a width

TABLE 15

| | | | Examples | | | | | | | | | | | | | Comparative Examples | | | | |
|---|---|---|---|---|---|---|---|---|---|---|---|---|---|---|---|---|---|---|---|---|
| | | | 7 | 52 | 53 | 54 | 55 | 56 | 57 | 8 | 9 | 58 | 59 | 60 | 61 | 4 | 25 | 26 | 27 | 28 |
| Multilayer structure polymer (I) | Type | | I-1 | I-7 | I-8 | I-9 | I-10 | I-11 | I-12 | I-1 | I-1 | I-1 | I-1 | I-1 | I-1 | I-3 | I-13 | I-14 | I-15 | I-16 |
| | | (part) | 100 | 100 | 100 | 100 | 100 | 100 | 100 | 90 | 75 | 70 | 55 | 70 | 70 | 100 | 100 | 100 | 100 | 100 |
| Thermoplastic polymer (II-1) | | (part) | — | — | — | — | — | — | — | 10 | 25 | 30 | 45 | — | — | — | — | — | — | — |
| Thermoplastic polymer (II-2) | | (part) | — | — | — | — | — | — | — | — | — | — | — | 23 | 20 | — | — | — | — | — |
| Hydroxy-containing polymer (V) | | (part) | 10 | 10 | 10 | 10 | 10 | 10 | 10 | 10 | 10 | 10 | 10 | — | — | 10 | 10 | 10 | 10 | 10 |
| PMMA crosslinking particle | | (part) | — | — | — | — | — | — | — | — | — | — | — | 7 | 10 | — | — | — | — | — |
| Gel content of a resin composition (IV) | | (%) | 64 | 62 | 63 | 62 | 60 | 62 | 63 | 57 | 48 | 45 | 35 | 56 | 59 | 54 | 62 | 63 | 61 | 63 |
| Acrylic resin film material (A) | Gloss | (%) | 18 | 18 | 18 | 19 | 17 | 18 | 16 | 22 | 29 | 33 | 25 | 40 | 30 | 17 | 18 | 20 | 17 | 23 |
| | Film formability | | ○ | ○ | ○ | ○ | ○ | ○ | ○ | ○ | ○ | ○ | ○ | ○ | ○ | ○ | ○ | Δ | ○ | ○ |
| | Pencil hardness | | HB | B | HB | HB | B | HB | B | F | H | H | H | H | H | 4B | 3B | F | 3B | F |
| | Bending-whitening resistance | | ◉ | ◉ | ◉ | ○ | ◉ | ○ | ◉ | ◉ | ○ | ○ | Δ | ○ | ○ | ◉ | ◉ | XX | ◉ | X |
| Laminate molded item | Excoriation resistance | | Δ | Δ | Δ | Δ | Δ | Δ | Δ | ○ | ○ | ○ | ○ | ○ | ○ | X | X | ○ | X | ○ |
| | Matte-reduction resistance | | ○ | ○ | ○ | ○ | ○ | ○ | ○ | ○ | ○ | ○ | ○ | ○ | ○ | X | ○ | ○ | ○ | ○ |

The acrylic resin film materials (A) of Examples 1 to 16 with a pencil hardness of 2 B or higher exhibited good excoriation resistance. The acrylic resin film materials (A) of Examples 2 to 6 and 8 to 16 with a pencil hardness of F or higher exhibited particularly good excoriation resistance of 20 mm is pulled under the conditions of an initial inter-chuck distance of 25 mm, a rate of 50 mm/min and a temperature of 23° C. until an end-point inter-chuck distance becomes 33 mm, no problems were observed for molding whitening resistance in woodgrain or jet-black. In the acrylic resin film materials (A) of Examples 1 to 16, no problems were observed for printing status around the gates.

On the other hand, the acrylic resin film materials (A) of Comparative Examples 1 and 4 with a pencil hardness of less than 2 B showed inadequate excoriation resistance and, because of its heat distortion temperature of 79° C., inadequate heat-aging resistance to be industrially useful. The acrylic resin film materials (A) of Comparative Examples 2, 3 and 5 with a haze difference of more than 30% between after and before the tensile test in each test piece showed inadequate molding whitening resistance, resulting in significant molding whitening and deletion of a printing pattern in both woodgrain and jet-black. They are, therefore, not useful in industrial applications.

The laminate molded items of Examples 17 to 40 comprising one of the acrylic resin film materials (A) of Examples 1 to 16 showed good properties.

Furthermore, the acrylic resin film materials (A) and the laminate molded items therewith of Examples 1 to 3, 5, 7 to 9, 41 to 61 prepared with a multilayer structure polymer (I), resin composition (III) or resin composition (IV) of this invention showed good properties.

In Examples 17 to 23, there were prepared acrylic resin multilayer films with good molding whitening resistance, excoriation resistance and heat-aging resistance during woodgrain printing which could not been achieved in any known acrylic resin multilayer film.

INDUSTRIAL APPLICABILITY

A laminate molded item comprising an acrylic resin film material (A) of this invention is particularly suitable for vehicle applications and construction applications. Specifically, it can be suitably used in, for example, automobile interior applications such as an instrument panel, a console box, a meter cover, a door lock pesel, a steering wheel, a power winder switch base, a center cluster and a dash board; automobile exterior applications such as a weather strip, a bumper, a bumper guard, a side mud guard, a body panel, a spoiler, a front grille, a strut mount, a wheel cap, a center pillar, a door mirror, a center ornament, a side mall, a door mall, a window mall etc., a window, a head lamp cover, a tail lamp cover and windshield parts; a front panel, a button, an emblem and a surface decorative material for an AV device or furniture product; a housing, a display window and a button of a cell phone; furniture exterior materials; construction interior materials such as a wall, a ceiling and a floor; construction exterior materials such as an external wall (e.g., siding), a fence, a roof, a gate and a verge-board; surface decorative materials for furnitures such as a window frame, a door, a handrail, a door sill and a head jamb; optical members such as various displays, lenses, mirrors, goggles and window glasses; interior and exterior applications in various vehicles other than automobile such as an electric train, an airplane and a boat; various packaging containers and materials such as a bottle, a cosmetic container and an accessory case; miscellaneous goods such as a premium and a small article; and other various applications.

What is claimed is:

1. A laminate molded item comprising an acrylic resin film material (A) laminated on a base (E), wherein the acrylic resin film material (A) comprises a multilayer structure polymer (I), which comprises
    (1) an innermost layer polymer (I-A),
    (2) an intermediate layer polymer (I-B) with a glass-transition temperature of 25 to 100° C. comprising a composition different from that of the innermost layer polymer (I-A), and
    (3) an outermost layer polymer (I-C),
    wherein the innermost layer polymer (I-A) comprises
    (I-A1) an alkyl acrylate in 50 to 99.9 wt %,
    (I-A2) an alkyl methacrylate in 0 to 49.9 wt %,
    (I-A3) another monomer comprising a copolymerizable double bond in 0 to 20 wt %,
    (I-A4) a multifunctional monomer in 0 to 10 wt %, and
    (I-A5) a graft crosslinker in 0.1 to 10 wt %;
    wherein the intermediate layer polymer (I-B) comprises
    (I-B1) an alkyl acrylate in 9.9 to 90 wt %,
    (I-B2) an alkyl methacrylate in 9.9 to 90 wt %,
    (I-B3) another monomer comprising a copolymerizable double bond in 0 to 20 wt %,
    (I-B4) a multifunctional monomer in 0 to 10 wt %, and
    (I-B5) a graft crosslinker 0.1 to 10 wt %; and
    wherein the outermost layer polymer (I-C) comprises
    (I-C1) an alkyl methacrylate in 80 to 100 wt %,
    (I-C2) an alkyl acrylate in 0 to 20 wt %, and
    (I-C3) another monomer comprising a copolymerizable double bond in 0 to 20 wt %, and
    a thermoplastic polymer (II) comprising an alkyl methacrylate.

2. The laminate molded item as claimed in claim 1 prepared by vacuum- or press molding the acrylic resin film material (A) in an injection mold, and then injection-molding a resin to be the base (E) in the injection mold.

3. The laminate molded item as claimed in claim 1 prepared by vacuum- or press molding the acrylic resin film material (A), and then placing the molding in an injection mold, and injecting-molding a resin to be the base (E) in the injection mold.

4. An acrylic resin laminate film comprising an acrylic resin film material (A) and another fluororesin film material (A"), wherein the acrylic resin film material (A) comprises a multilayer structure polymer (I), which comprises
    (1) an innermost layer polymer (I-A),
    (2) an intermediate layer polymer (I-B) with a glass-transition temperature of 25 to 100° C. comprising a composition different from that of the innermost layer polymer (I-A), and
    (3) an outermost layer polymer (I-C),
    wherein the innermost layer polymer (I-A) comprises
    (I-A1) an alkyl acrylate in 50 to 99.9 wt %,
    (I-A2) an alkyl methacrylate in 0 to 49.9 wt %,
    (I-A3) another monomer comprising a copolymerizable double bond in 0 to 20 wt %,
    (I-A4) a multifunctional monomer in 0 to 10 wt %, and
    (I-A5) a graft crosslinker in 0.1 to 10 wt %;
    wherein the intermediate layer polymer (I-B) comprises
    (I-B1) an alkyl acrylate in 9.9 to 90 wt %,
    (I-B2) an alkyl methacrylate in 9.9 to 90 wt %,
    (I-B3) another monomer comprising a copolymerizable double bond in 0 to 20 wt %,
    (I-B4) a multifunctional monomer in 0 to 10 wt %, and
    (I-B5) a graft crosslinker 0.1 to 10 wt %; and
    wherein the outermost layer polymer (I-C) comprises
    (I-C1) an alkyl methacrylate in 80 to 100 wt %,
    (I-C2) an alkyl acrylate in 0 to 20 wt %, and
    (I-C3) another monomer comprising a copolymerizable double bond in 0 to 20 wt %, and
    a thermoplastic polymer (II) comprising an alkyl methacrylate.

5. A laminate molded item comprising a monolayered acrylic resin film material (A) laminated on a base (E), wherein monolayered acrylic resin film material (A) exhibits a difference of 30% or less between haze values as determined in accordance with the testing method of JIS K7136 (haze measurement method) after and before a tensile test where a test piece with a width of 20 mm is pulled under the conditions of an initial inter-chuck distance of 25 mm, a rate of 50 mm/min and a temperature of 23° C. until an end-point inter-chuck distance becomes 33 mm as well as having a pencil hardness of 2 B or higher as determined in accordance with JIS K5400.

6. The laminate molded item as claimed in claim 5 prepared by vacuum- or press molding the monolayered acrylic resin film material (A) in an injection mold, and then injection-molding a resin to be the base (E) in the injection mold.

* * * * *